United States Patent
Uchida et al.

(10) Patent No.: US 9,119,151 B2
(45) Date of Patent: Aug. 25, 2015

(54) SIGNAL TRANSMISSION DEVICE, COMMUNICATION DEVICE, ELECTRONIC APPARATUS, AND SIGNAL TRANSMISSION METHOD

(75) Inventors: Shigenori Uchida, Kanagawa (JP); Hirofumi Kawamura, Chiba (JP)

(73) Assignee: SONY CORPORATION, Tokyo (JP)

( * ) Notice: Subject to any disclaimer, the term of this patent is extended or adjusted under 35 U.S.C. 154(b) by 369 days.

(21) Appl. No.: 13/429,978

(22) Filed: Mar. 26, 2012

(65) Prior Publication Data

US 2012/0252522 A1    Oct. 4, 2012

(30) Foreign Application Priority Data

Mar. 31, 2011  (JP) .................. 2011-077376

(51) Int. Cl.
*H04B 1/00* (2006.01)
*H04W 52/02* (2009.01)

(52) U.S. Cl.
CPC ................. *H04W 52/0245* (2013.01)

(58) Field of Classification Search
CPC ..... H04W 4/023; H04W 84/18; H04W 88/02; H04W 88/04

USPC .............. 455/69, 522, 11.1, 13.1, 15, 16
See application file for complete search history.

(56) References Cited

U.S. PATENT DOCUMENTS

| | | | | |
|---|---|---|---|---|
| 8,571,005 | B1* | 10/2013 | Vleugels et al. | 370/350 |
| 2004/0203936 | A1* | 10/2004 | Ogino et al. | 455/463 |
| 2009/0238251 | A1* | 9/2009 | Rofougaran | 375/219 |
| 2011/0171991 | A1* | 7/2011 | Liu et al. | 455/522 |
| 2011/0183617 | A1* | 7/2011 | Behzad et al. | 455/41.2 |

FOREIGN PATENT DOCUMENTS

| | | |
|---|---|---|
| JP | 2005-204221 | 7/2005 |
| JP | 2005-223411 | 8/2005 |

* cited by examiner

*Primary Examiner* — Tu X Nguyen
(74) *Attorney, Agent, or Firm* — Oblon, McClelland, Maier & Neustadt, L.L.P.

(57) ABSTRACT

A signal transmission device includes: a communication device that transmits first information and second information, wherein at the time of transmitting the first information, the communication device controls a strength of a transmission signal thereof on the basis of the second information.

17 Claims, 29 Drawing Sheets

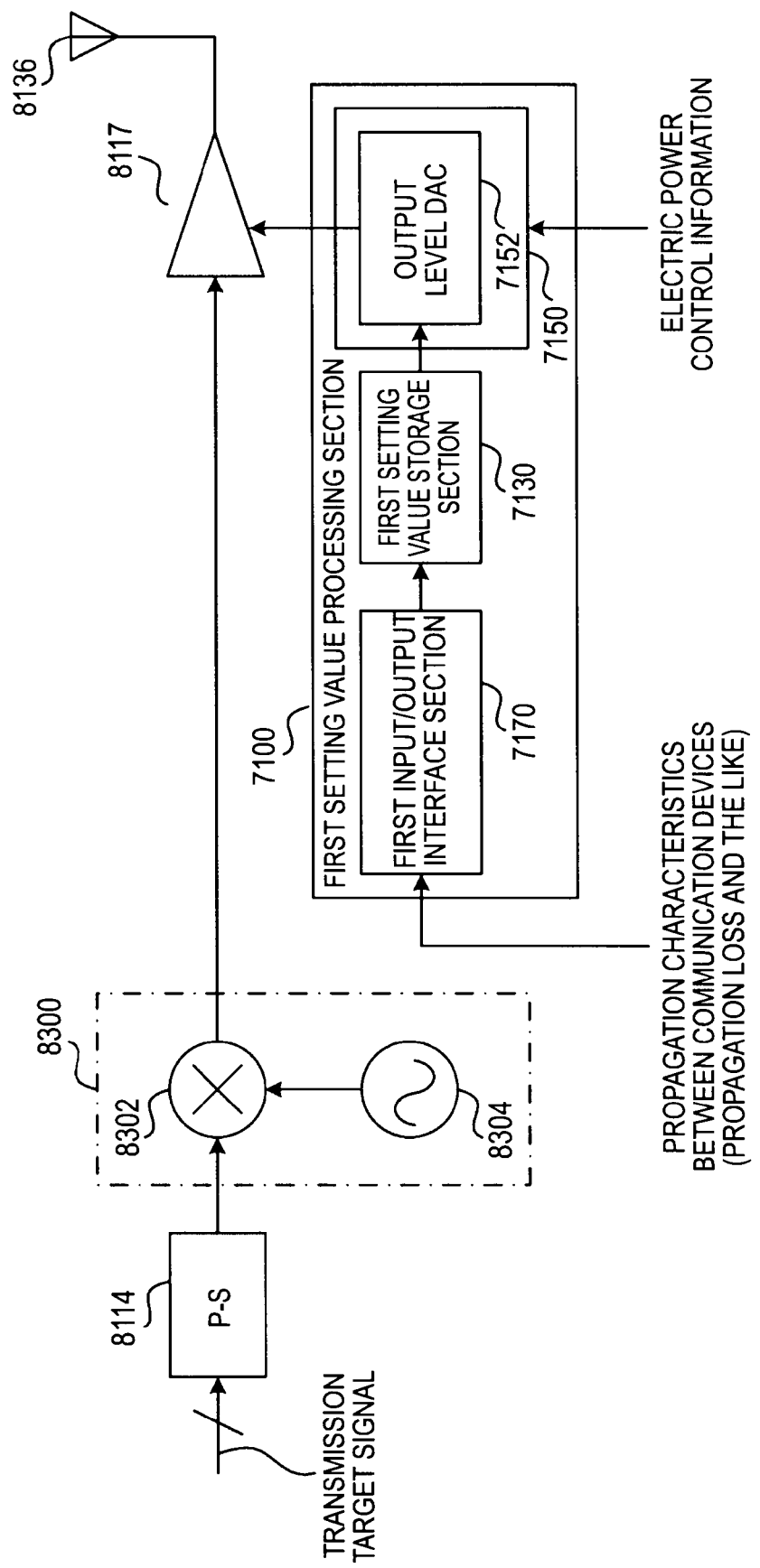

<SIGNAL PROCESSING MODULE>

FIRST EXAMPLE

SECOND EXAMPLE

THIRD EXAMPLE

FOURTH EXAMPLE

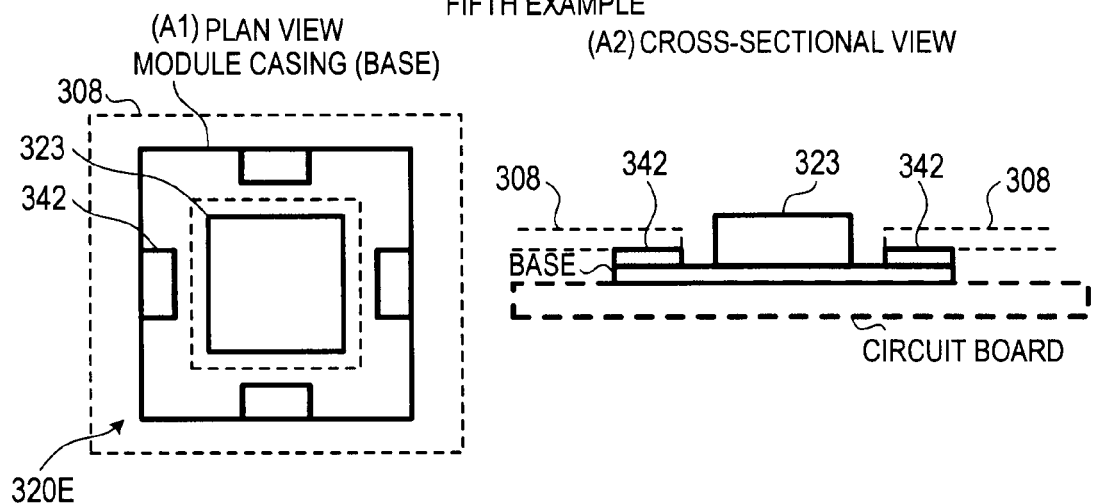
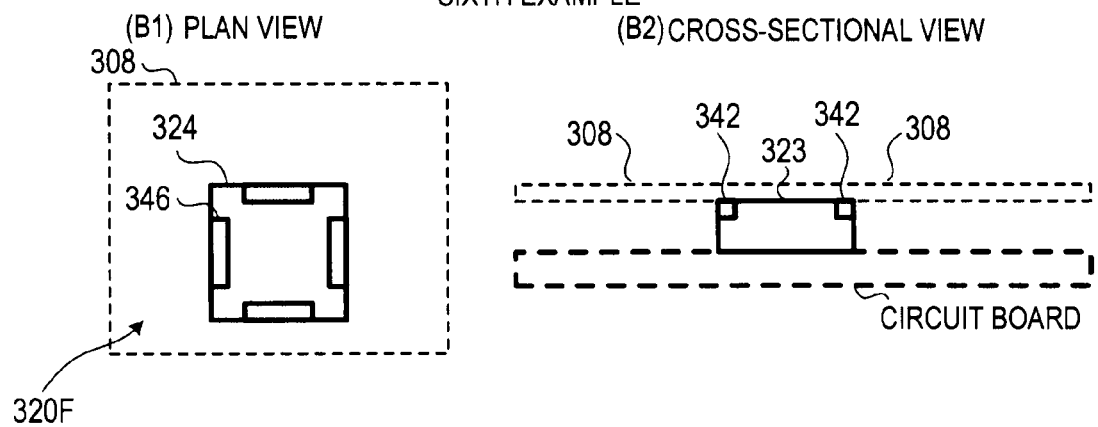
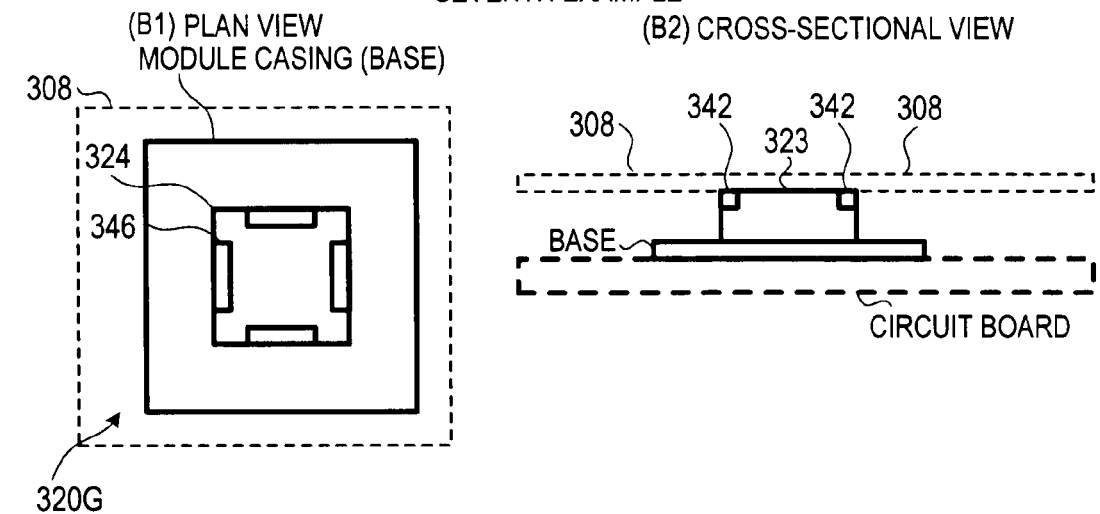

<NODE ARRANGEMENT: FIRST EXAMPLE>

FIRST

SECOND

THIRD

<NODE ARRANGEMENT: SECOND EXAMPLE>
FIG.10A
FIG.10B
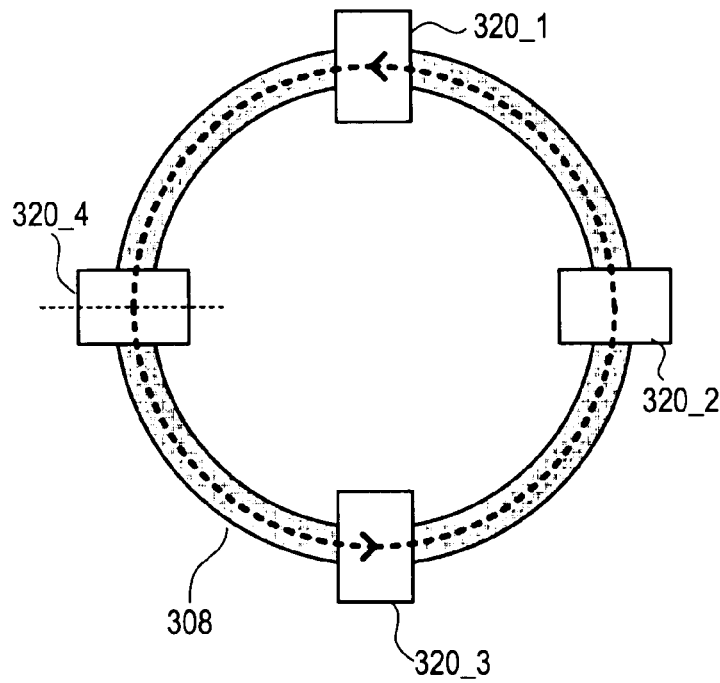
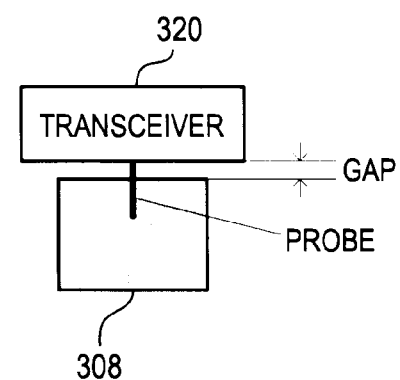
FIG.11
<NODE ARRANGEMENT: THIRD EXAMPLE>
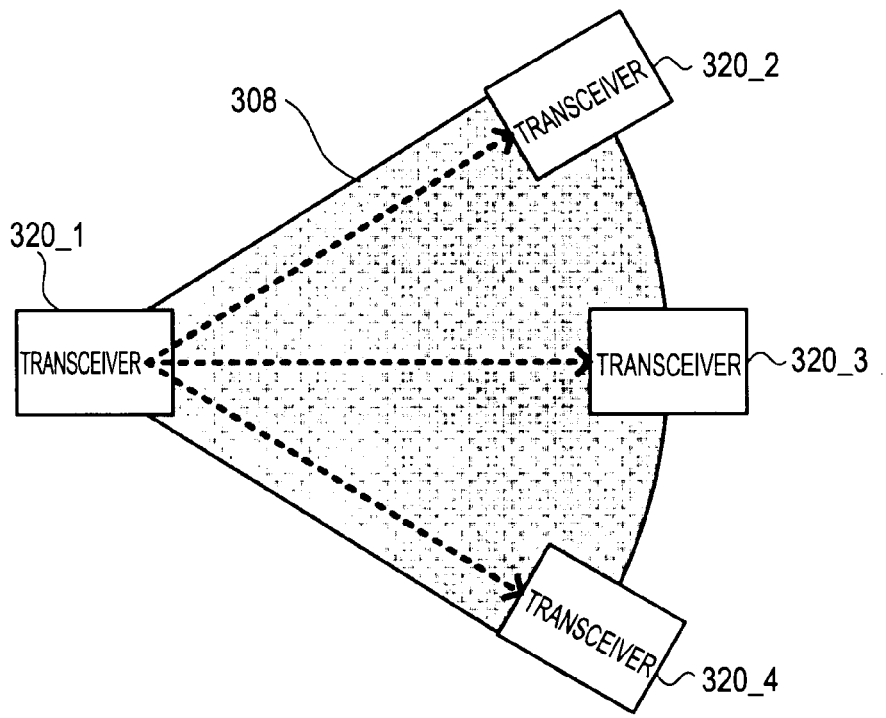

<DIRECTIVITY: HORIZONTAL DIRECTION ON THE SAME PLANE>

LATERAL SIDE VIEW

TOP PLAN VIEW

<DIRECTIVITY: VERTICAL DIRECTION ON THE SAME PLANE>

LATERAL SIDE VIEW

TOP PLAN VIEW

<DIRECTIVITY: VERTICAL DIRECTION ON BOTH SIDES>

TOP PLAN VIEW

LATERAL SIDE VIEW

BOTTOM VIEW

<DIRECTIVITY: HORIZONTAL DIRECTION ON THE SAME PLANE + VERTICAL DIRECTION ON BOTH SIDES>

TOP PLAN VIEW

LATERAL SIDE VIEW

BOTTOM VIEW

<DIRECTIVITY (HORIZONTAL DIRECTION ON THE SAME PLANE) + LINEARLY POLARIZED WAVE>

LATERAL SIDE VIEW

TOP PLAN VIEW

<DIRECTIVITY (VERTICAL DIRECTION ON BOTH SIDES) + CIRCULARLY POLARIZED WAVE>

TOP PLAN VIEW

LATERAL SIDE VIEW

BOTTOM VIEW

<DIRECTIVITY (HORIZONTAL DIRECTION ON THE SAME PLANE) + LINEARLY POLARIZED WAVE + CIRCULARLY POLARIZED WAVE>
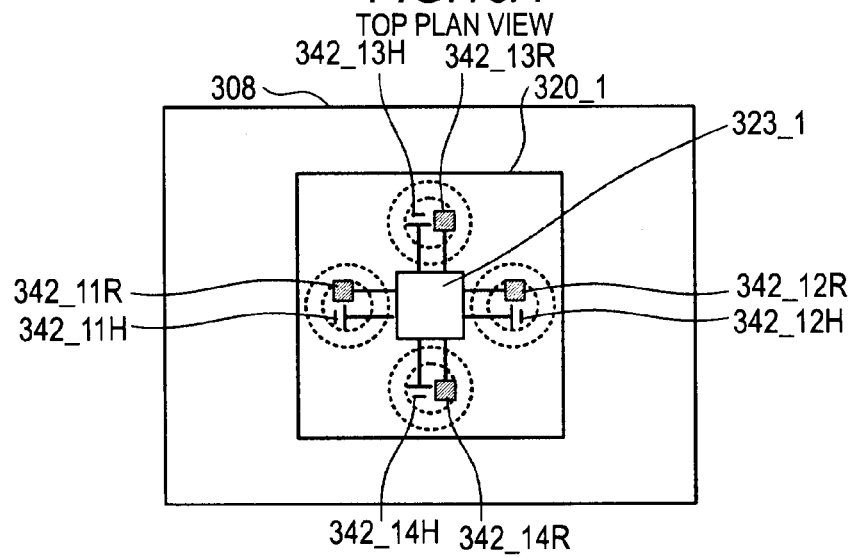
FIG. 18A
TOP PLAN VIEW
FIG. 18B
LATERAL SIDE VIEW
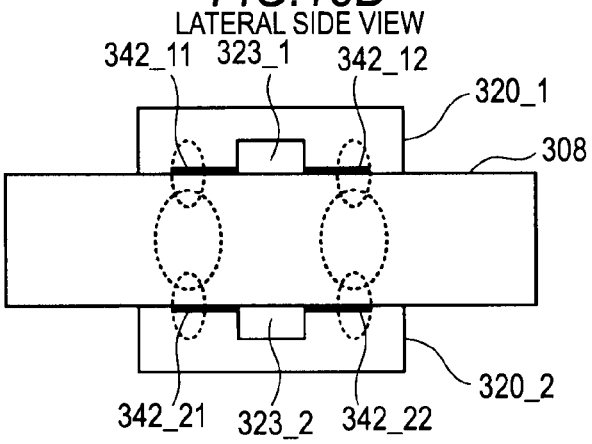
FIG. 18C
BOTTOM VIEW
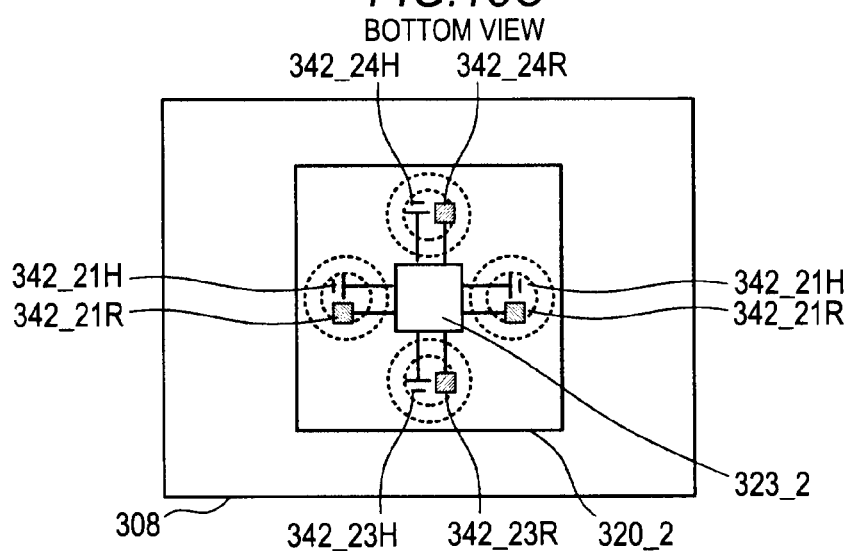

<TWO-POINT TRANSMISSION>

EXAMPLE OF NODE ARRANGEMENT AND PROPAGATION LOSS BETWEEN NODES

<LEVEL DIAGRAM EXAMPLE OF TWO-POINT TRANSMISSION>

PASSAGE CHARACTERISTICS OF TRANSMISSION PATH

<THREE-POINT TRANSMISSION>

EXAMPLE OF NODE ARRANGEMENT AND PROPAGATION LOSS BETWEEN NODES

LEVEL DIAGRAM EXAMPLE OF THREE-POINT TRANSMISSION

<EXAMPLE 1>

EXAMPLE OF NODE ARRANGEMENT AND PROPAGATION LOSS BETWEEN NODES

LEVEL DIAGRAM EXAMPLE OF THREE-POINT TRANSMISSION

<EXAMPLE 1>

FIG.23A EXAMPLE OF PROPAGATION LOSS BETWEEN NODES

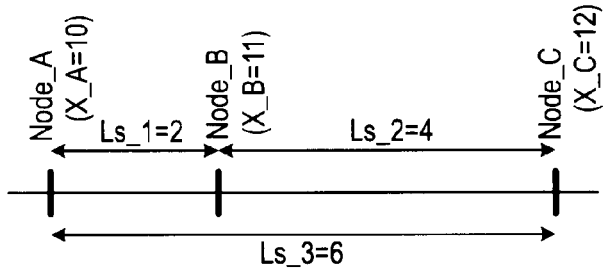

FIG.23B RELATIONSHIP BETWEEN TRANSMISSION POWER AND RECEPTION POWER

α (TX):TRANSMISSION NODE    β (RX):RECEPTION NODE

| α (to β) ⇒M | : α (TX) TRANSMITS SIGNAL TO β (RX) AT TRANSMISSION LEVEL M_αβ |
| α (N) | :RECEPTION LEVEL OF β (RX) RECEIVING TRANSMISSION SIGNAL OF α (TX) IS N_αβ (= M_αβ -Ls_γ) |

※TRANSMISSION POWER IS CONTROLLED TO REACH RECEPTION POWER SETTING VALUE X_γ (UNIT IS NOT SPECIFIED) OF TRANSMISSION TARGET

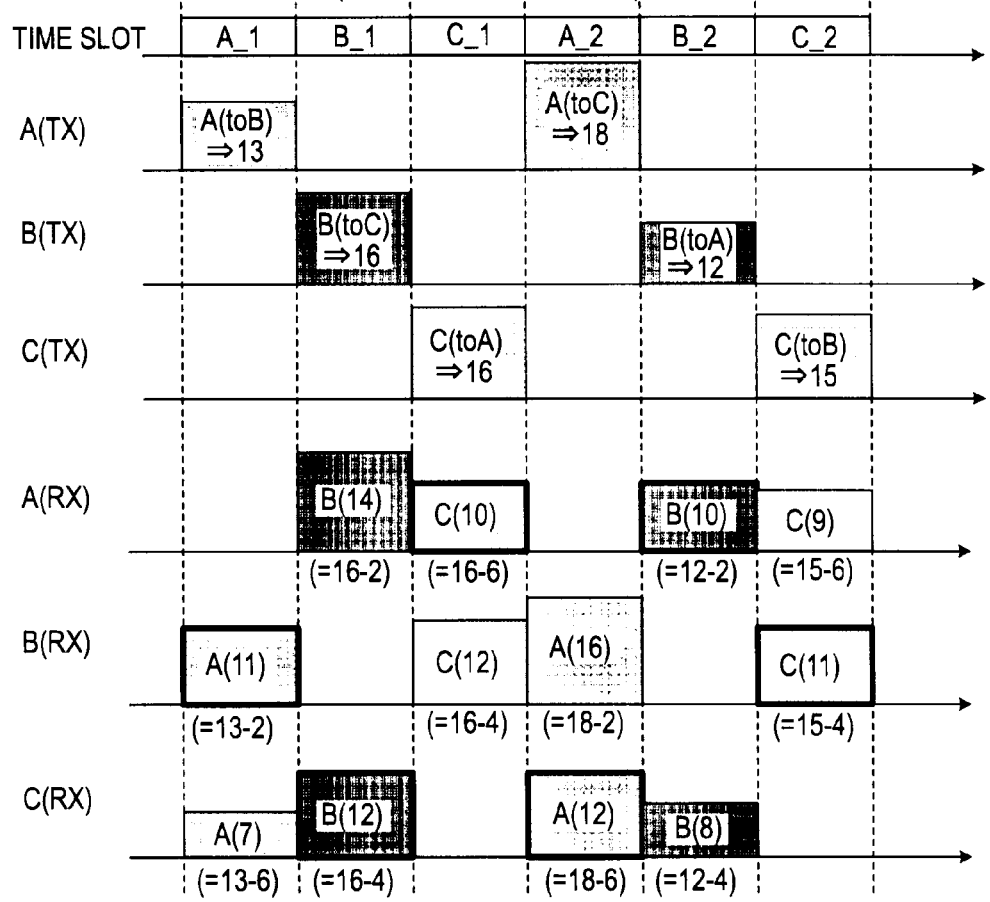

RECEPTION NODE β (RX) DETERMINES THAT DATA HAVING RECEPTION POWER OF RECEPTION POWER SETTING VALUE X_γ ±Th_γ IS SELF-ADDRESSED DATA (THICK LINE FRAME PORTION IN DRAWING

<EXAMPLE 1>

<EXAMPLE 2>

EXAMPLE OF NODE ARRANGEMENT AND PROPAGATION LOSS BETWEEN NODES

LEVEL DIAGRAM EXAMPLE OF THREE-POINT TRANSMISSION
□:TRANSMISSION POWER STRENGTH
○:RECEPTION POWER STRENGTH

FIG. 26A EXAMPLE OF PROPAGATION LOSS BETWEEN NODES
<EXAMPLE 2>
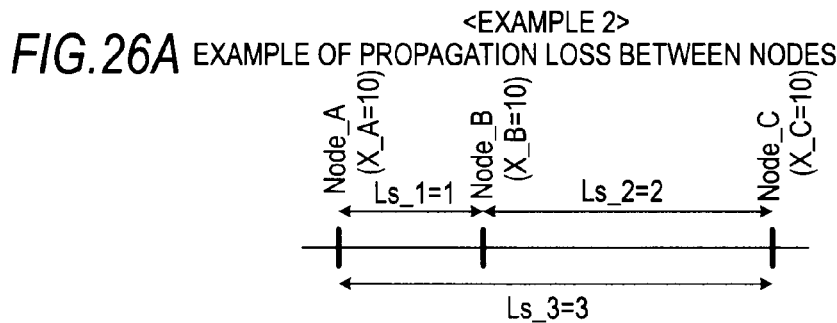
FIG. 26B RELATIONSHIP BETWEEN TRANSMISSION POWER AND RECEPTION POWER
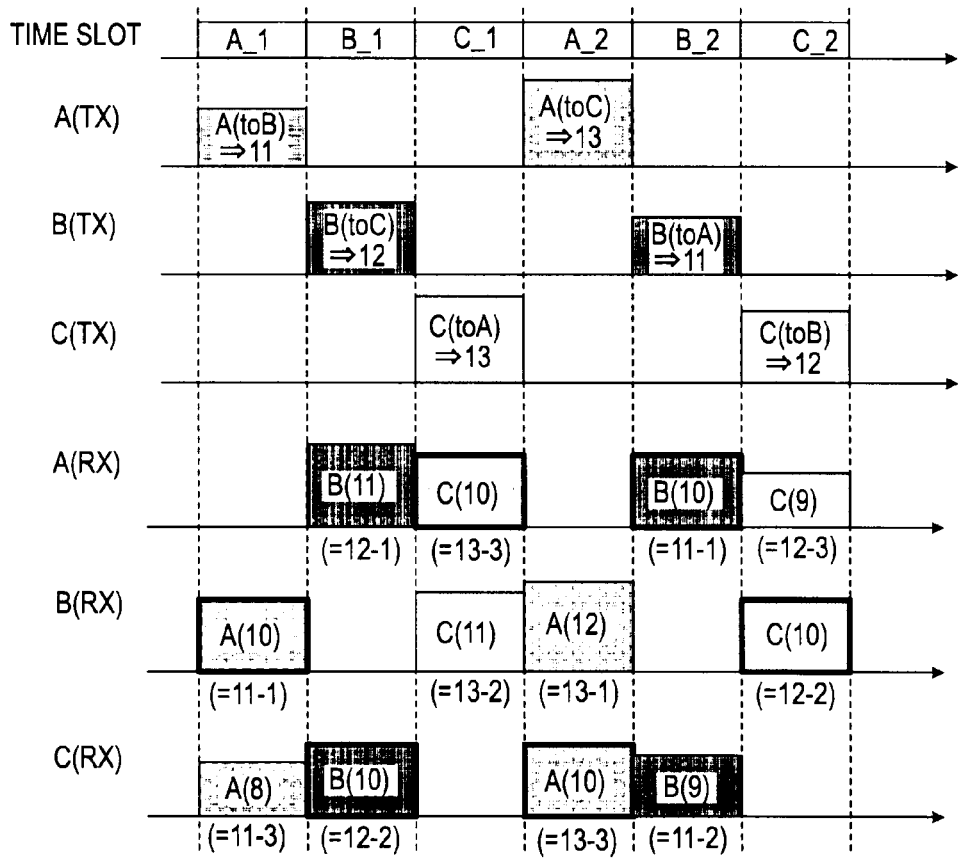
RECEPTION NODE β (RX) DETERMINES THAT DATA HAVING RECEPTION POWER OF RECEPTION POWER SETTING VALUE X(=10)±Th_β IS SELF-ADDRESSED DATA (THICK LINE FRAME PORTION IN DRAWING)

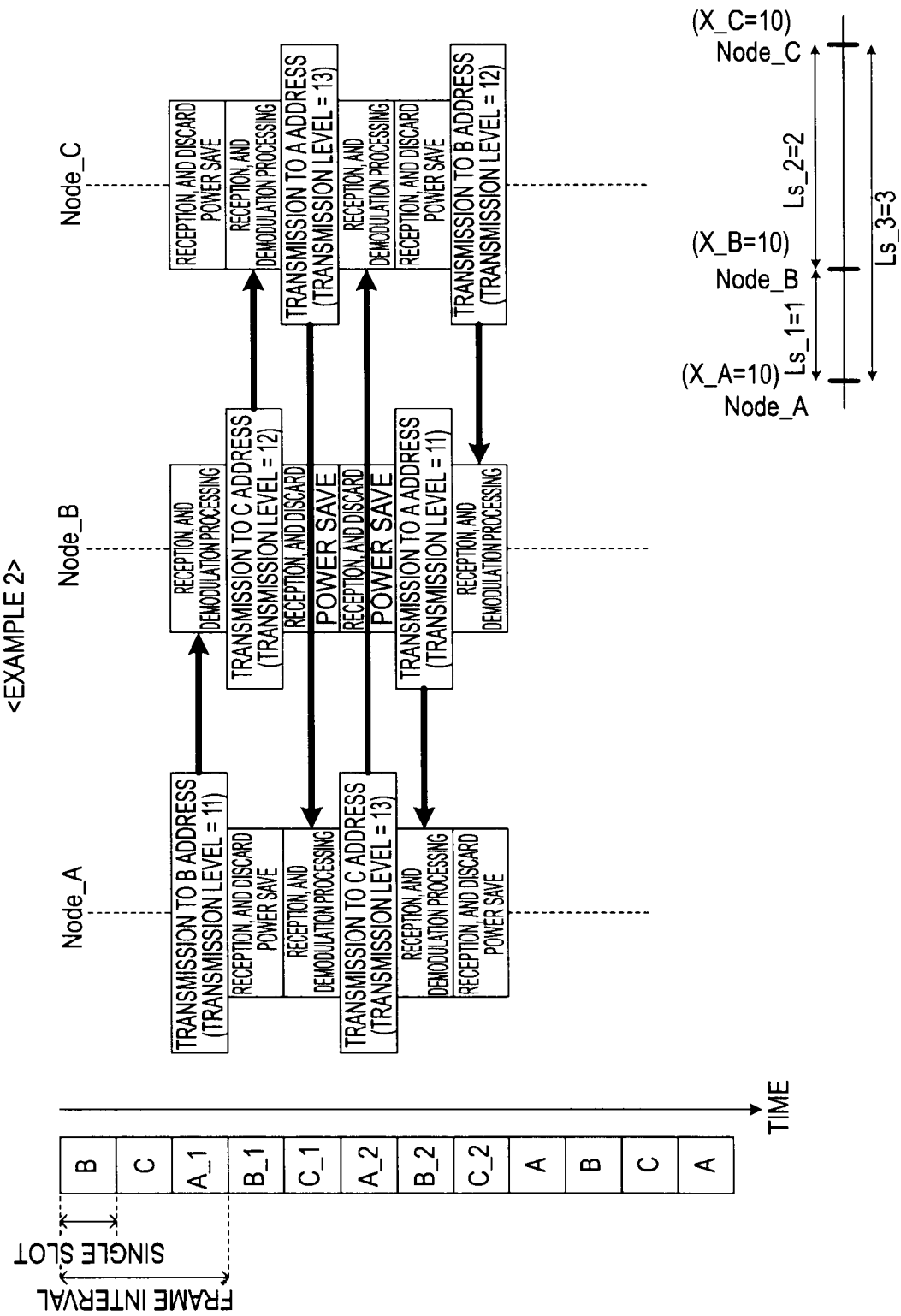
FIG.27 <EXAMPLE 2>

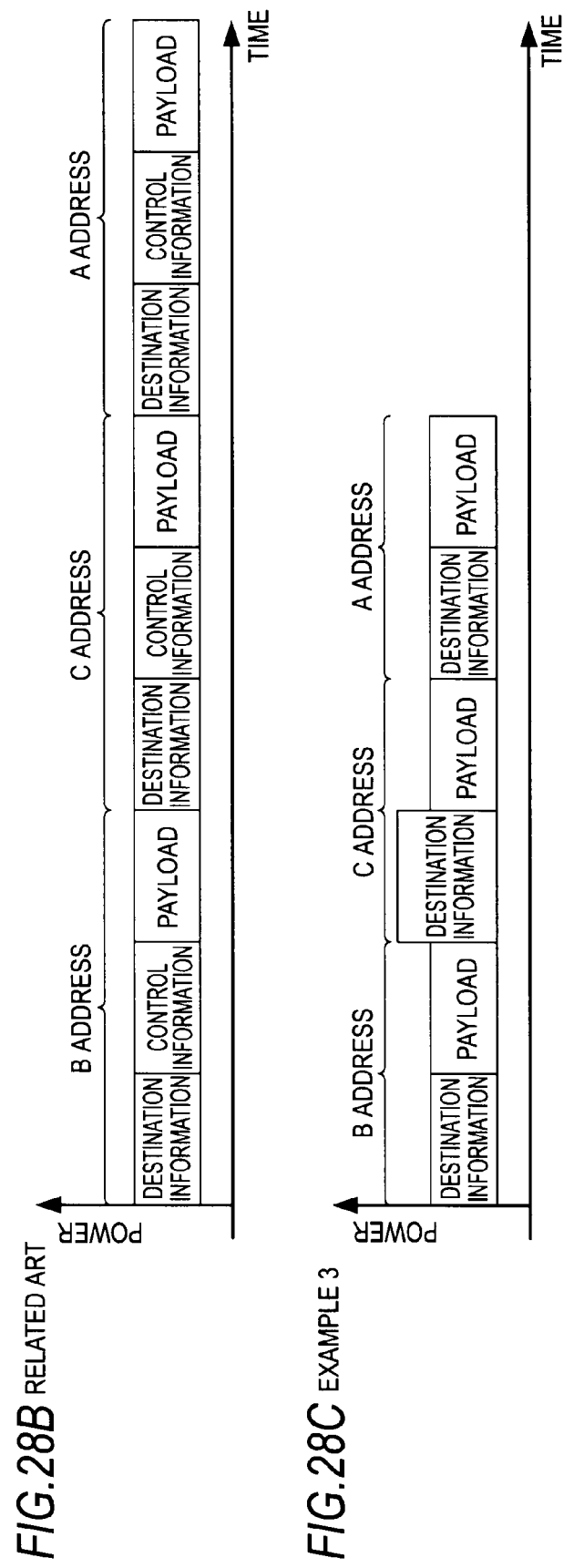
FIG. 28A
FIG. 28B RELATED ART
FIG. 28C EXAMPLE 3

FIG.30A

EXAMPLE OF FRAME LENGTH (COMMON IN EACH NODE)

| LONG FRAME | 1 [ms] |
|---|---|
| SHORT FRAME | 0.2 [ms] |

FIG.30B

EXAMPLE OF POWER SETTING AT THE TIME OF TRANSMISSION

| FROM \ TO | A | | | B | | | C | | |
|---|---|---|---|---|---|---|---|---|---|
| | | | | LONG | SHORT | | LONG | SHORT | |
| A | | | | 12 | 6 | | 16 | 8 | |
| | LONG | SHORT | | | | | LONG | SHORT | |
| B | 12 | 6 | | | | | 14 | 7 | |
| | LONG | SHORT | | LONG | SHORT | | | | |
| C | 16 | 8 | | 14 | 7 | | | | |

FIG.30C

DETERMINATION AT THE TIME OF RECEPTION
(DETERMINATION AS TO WHETHER FRAME IS LONG OR SHORT)
BASED ON POWERS IN TABLE OF (A), EXAMPLE OF LOSS IN Fig. 25(A)

| RECEPTION | FRAME TYPE | LONG | SHORT |
|---|---|---|---|
| A | FROM B TO SELF ADDRESS (B→A) | 11 | 5 |
| | FROM B TO OTHER ADDRESS (B→C) | 13 | 6 |
| | FROM C TO SELF ADDRESS (C→A) | 13 | 5 |
| | FROM C TO OTHER ADDRESS (C→B) | 11 | 4 |
| B | FROM A TO SELF ADDRESS (A→B) | 11 | 5 |
| | FROM A TO OTHER ADDRESS (A→C) | 15 | 7 |
| | FROM C TO SELF ADDRESS (C→B) | 12 | 5 |
| | FROM C TO OTHER ADDRESS (C→A) | 14 | 6 |
| C | FROM A TO SELF ADDRESS (A→C) | 13 | 5 |
| | FROM A TO OTHER ADDRESS (A→B) | 9 | 3 |
| | FROM B TO SELF ADDRESS (B→C) | 12 | 5 |
| | FROM B TO OTHER ADDRESS (B→A) | 10 | 4 |

SIGNAL TRANSMISSION DEVICE, COMMUNICATION DEVICE, ELECTRONIC APPARATUS, AND SIGNAL TRANSMISSION METHOD

FIELD

The present disclosure relates to a signal transmission device, a communication device, an electronic apparatus, and a signal transmission method.

BACKGROUND

Recently, in signal transmission in an electronic apparatus or between electronic apparatuses, there has been demand for a technique of treating large volumes of data or transmitting large volumes of data at a high speed (for example, on a real time basis). In the past, typically, signal transmission is performed through connection of electric wiring lines. As a technique for implementing high-speed signal transmission, for example, LVDS (Low Voltage Differential Signaling) is known. However, in accordance with further increase in amount of transmission data and further increase in speed of transmission recently, increase in power consumption, increase in effect of signal distortion caused by reflection and the like, increase in unnecessary radiation and the like have become problems. For example, the LVDS reaches a limit where a signal such as a video signal (including an imaging signal), a computer image or the like is transmitted at a high speed (on a real time basis) in an apparatus.

As a countermeasure against the problem of the increase in speed of transmission data, it seems a possible idea to increase the number of wiring lines to decrease the transmission speed per one signal line by parallel transmission of signals. However, the countermeasure just described gives rise to an increase in the number of input and output terminals. As a result, complexity of a printed board or a cable wiring scheme, an increase in the size of a semiconductor chip and so forth are necessary. Further, since a large amount of data is transmitted at a high-speed along a wiring system, a problem of electromagnetic field interference occurs.

All of the problems involved in the LVDS or the technique of increasing the number of wiring lines are caused by transmission of a signal through an electric wiring line. Therefore, as a method for solving a problem caused by transmission of a signal along an electric wiring line, for example, JP-A-2005-204221 and JP-A-2005-223411 propose methods of transmitting a transmission target signal (data main part) by eliminating electric wiring lines, that is, by using a technique of the communication processing.

SUMMARY

However, JP-A-2005-204221 and JP-A-2005-223411 disclose methods of transmitting the transmission target signal by using the technique of the communication processing, but do not disclose how to transmit the other information.

Thus, it is desirable to provide a technique capable of transmitting not only the transmission target signal but also the other information by using the communication processing technique.

A first embodiment of the present disclosure is directed to a signal transmission device including a communication device that transmits first information and second information. At the time of transmitting the first information, the communication device controls strength of a transmission signal thereof on the basis of the second information. Each signal transmission device, which is dependent on the signal transmission device according to the first embodiment of the present disclosure, defines a specific example which is additionally advantageous in the signal transmission device according to the first embodiment of the present disclosure.

A second embodiment of the present disclosure is directed to a communication device used in the signal transmission device according to the first embodiment of the present disclosure (including each signal transmission device dependent thereon). The communication device includes: a transmission processing section that performs transmission processing of the first information and the second information; and a control section that controls the strength of the transmission signal on the basis of the second information at the time of transmitting the first information. The respective techniques and methods, which are dependent on the signal transmission device according to the first embodiment, can be similarly applied to the communication device according to the second embodiment of the present disclosure. The configuration thereof defines a specific example which is additionally advantageous in the communication device according to the second embodiment.

A third embodiment of the present disclosure is directed to a communication device used in the signal transmission device according to the first embodiment of the present disclosure (including each signal transmission device dependent thereon). The communication device includes: an information specifying section that specifies the second information on the basis of the strength of the received signal; and a regeneration processing section that performs regeneration processing of the first information on the basis of the second information which is specified by the information specifying section. The respective techniques and methods, which are dependent on the signal transmission device according to the first embodiment, can be similarly applied to the communication device according to the third embodiment of the present disclosure. The configuration thereof defines a specific example which is additionally advantageous in the signal communication device according to the third embodiment.

A fourth embodiment of the present disclosure is directed to an electronic apparatus including: a transmission processing section that performs transmission processing of first information and second information; a signal waveguide that transmits a signal from the transmission processing section to a reception side; and a control section that controls the strength of a transmission signal on the basis of the second information at the time of transmitting the first information. The respective techniques and methods, which are dependent on the signal transmission device according to the first embodiment, can be similarly applied to the electronic apparatus according to the fourth embodiment of the present disclosure. The configuration thereof defines a specific example which is additionally advantageous in the electronic apparatus according to the fourth embodiment.

A fifth embodiment of the present disclosure is directed to an electronic apparatus including: a transmission processing section that performs transmission processing of first information and second information; a signal waveguide that transmits a signal; a control section that controls a strength of the transmission signal on the basis of the second information at the time of transmitting the first information; an information specifying section that specifies the second information on the basis of the strength of the signal received through the signal waveguide; and a regeneration processing section that performs regeneration processing of the first information on the basis of the second information which is specified by the information specifying section. Here, characteristics of propagation between transmission and reception are given, and the control section controls the strength of the transmission signal on the basis of the propagation characteristics. The respective techniques and methods, which are dependent on the signal transmission device according to the first embodiment, can be similarly applied to the electronic apparatus according to the fifth embodiment of the present disclosure. The configuration thereof defines a specific example which is additionally advantageous in the electronic apparatus according to the fifth embodiment.

A sixth embodiment of the present disclosure is directed to a signal transmission method of transmitting first information and second information between communication devices. In the signal transmission method, when the first information is transmitted, strength of a transmission signal thereof is controlled on the basis of the second information. The respective techniques and methods, which are dependent on the signal transmission device according to the first embodiment, can be similarly applied to the signal transmission method according to the sixth embodiment of the present disclosure. The configuration thereof defines a specific example which is additionally advantageous in the signal transmission method according to the sixth embodiment.

In short, in the embodiments of the technology disclosed in the specification, when the transmission target signal (first information) is transmitted from the transmission side to the reception side by using a wireless communication technique, the information (second information) different from the transmission target signal is represented by a strength of the transmission signal, and is transmitted. Accordingly, the signal transmitted to the reception side represents not only the transmission target signal but also the second information.

According to the signal transmission device, the communication device, the electronic apparatus, and the signal transmission method of the embodiments of the present disclosure, it is possible to transmit not only the transmission target signal but also the other information by using the communication processing technique.

BRIEF DESCRIPTION OF THE DRAWINGS

FIG. 6 is a diagram illustrating a transmission power control function;

FIGS. 8A to 8C are diagrams (second) illustrating configuration examples of the signal processing module;

FIGS. 10A and 10B are diagrams (second example) illustrating a basic concept of an example of node arrangement;

FIG. 11 is a diagram (third example) illustrating a basic concept of an example of node arrangement;

FIGS. 18A to 18C are diagrams illustrating separation using linearly polarized waves and circularly polarized waves;

FIGS. 23A and 23B are diagrams illustrating access control in Example 1;

FIGS. 26A and 26B are diagrams illustrating access control in Example 2;

FIG. 27 is a diagram illustrating an operation sequence in transmission/reception processing of the multiple transmission in Example 2;

FIGS. 28A to 28C are diagrams illustrating three-point transmission of Example 3;

FIGS. 30A to 30C are diagrams illustrating a method of specifying a frame length on the basis of a reception level in Example 4.

DETAILED DESCRIPTION

Figure 1:
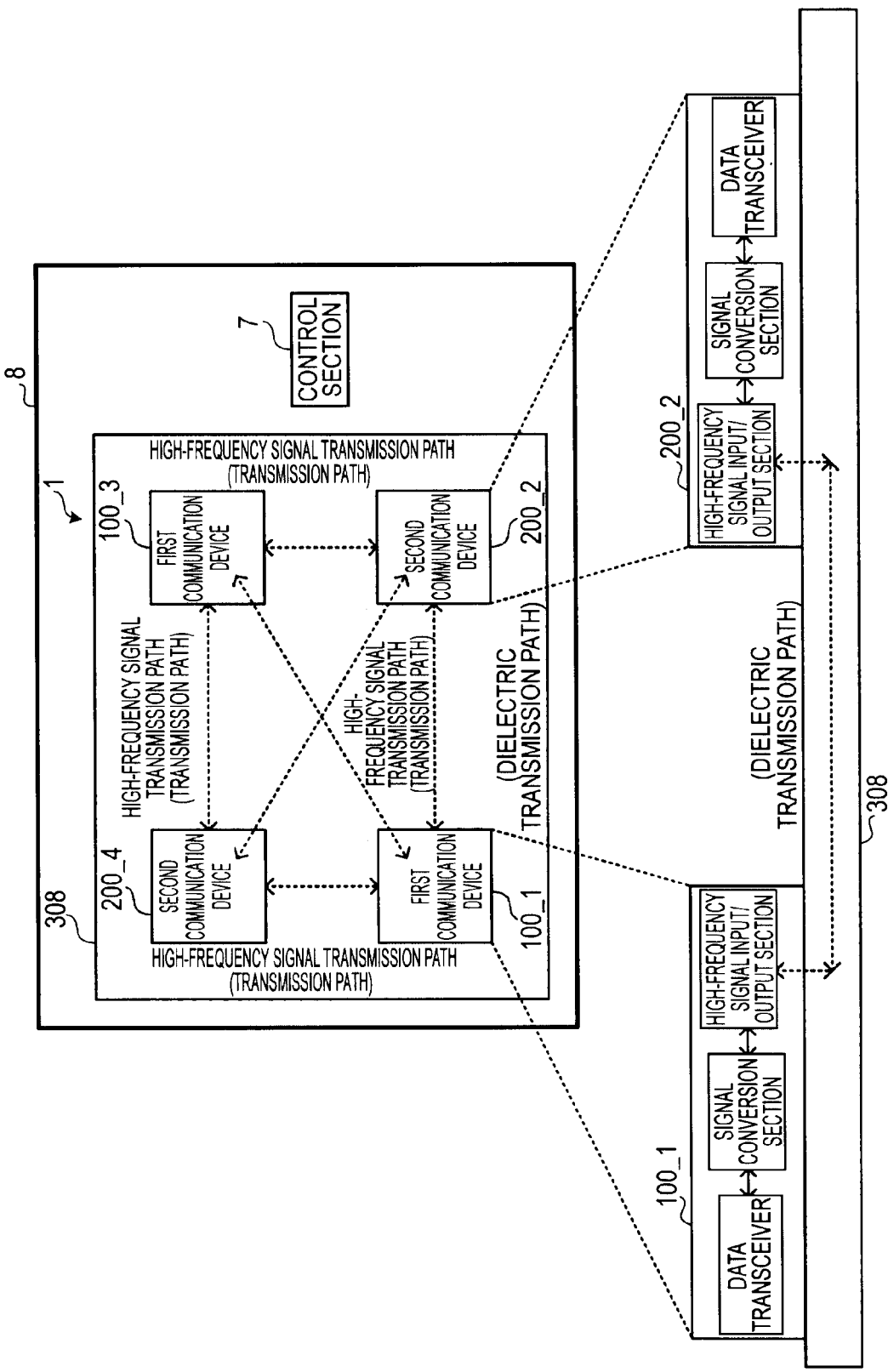
FIG. 1 is a diagram illustrating a brief overview of a signal transmission device and an electronic apparatus.

Hereinafter, referring to the drawings, embodiments of the technology disclosed in the specification will be described in detail. Each functional element will be distinguished between the different embodiments by assigning a letter, "_n" (n is a numeral), or a combined reference sign. In particular, if a description is given without making any distinction, the above reference numerals and signs will be omitted. This is the same for the drawings.

The description will be given in the following order: 1. Brief Overview; 2. Communication Processing System: Basics; 3. Parameter Setting Function; 4. Signal Processing Module; 5. Multiple Transmission: Basics, Basic Concept, Node Arrangement; 6. Multiple Transmission: Separation Using Directivity and Polarized Waves; 7. Multiple Transmission: Information Superposition on Transmission Power; 8. Multiple Transmission: Specific Application Example (Three-Point Transmission); Example 1: Transmission of Destination Information (Reception Electric Power Setting Value Is Individual); Example 2: Transmission of Destination Information (Reception Electric Power Setting Value Is Common); Example 3: Transmission of Frame Information; And Example 4: Transmission of Frame Length Information.

<Brief Overview>

First, a basic matter will be described below. In a signal transmission device, a communication device, an electronic apparatus, and a signal transmission method disclosed in the specification, for example, a high-frequency signal waveguide made of a dielectric substance or a magnetic substance is disposed in a casing, a signal processing module (communication device) having a communication function is mounted on the high-frequency signal waveguide, thereby establishing communication of a high-frequency signal transferred through the high-frequency signal waveguide. In such a manner, high-speed data transmission in communication in an apparatus or communication between apparatuses is implemented by reducing multipath, deterioration in transmission, unwanted radiation, and the like. That is, the high-frequency signal waveguide, which is capable of transmitting electromagnetic waves such as millimeter waves with low loss, is disposed in the apparatus, the signal processing module having the communication function is provided. Thereby, by transferring electromagnetic waves such as millimeter waves through the inside of the high-frequency signal waveguide, data transmission between signal processing modules is implemented. Here, when the relative positions of the signal processing modules are determined, transmission characteristics between transmission and reception such as propagation loss are given. On the basis of this, not only is it possible to perform communication processing by converting the transmission target signal into a high-frequency signal, but also it is possible to transmit second information different from the transmission target signal to the different communication device by representing the information as a strength of the high-frequency signal.

Regarding connection of electric wiring lines, in arrangement of the high-frequency signal waveguide and a coupler (a transfer structure having a transfer function of the high-frequency signal), without specifying a pin arrangement or a contact position like a connector of the electric wiring lines, it is possible to allow error to a considerable extent (several millimeters to several centimeters). In wireless connection, since it is possible to reduce loss of electromagnetic waves, it is possible to reduce the electric power of the transmitter. As a result, it is possible to simplify a configuration of the reception side, and it is possible to suppress interference between radio waves or conversely it is possible to suppress radiation to the outside of the apparatus.

Since the transmission target signal is converted into the high-frequency signal and is transmitted, it is possible to achieve the high-speed transmission. In addition, by using the high-frequency signal waveguide, coupling is favorable, and loss is small, and thus power consumption is small. It is preferable that the signal processing module should be disposed to be close to or be in contact with the high-frequency signal waveguide having the transmission function of the high-frequency signal. In this case, since the connection between transmission and reception is simple, it is possible to perform the connection over a wide range. As a material of the high-frequency signal waveguide, easily available plastic may be used, and a waveguide apparatus and an electronic apparatus may be formed at a low price. Since the high-frequency signal is locked in the high-frequency signal waveguide, the multipath has less effect, and the problem of EMC also has less effect.

For example, in a case of connection (metal wiring line connection) between general electric wiring lines, connection with a transmission medium is fixed at high accuracy through a pad and the like. In this case, allowable communication capacity is restricted by characteristics. Since a problem arises in that, as the number of input/output mechanisms increases, area and costs therefor increase, there is difficulty in increasing the number of the lines. Further, since it is necessary to individually design the wiring lines in accordance with each chip or each module, extra effort is necessary. Meanwhile, in a case of wireless connection applied out of doors, connection with the transmission medium is free from a positional relationship of antenna. However, since radio waves are spatially transmitted, the propagation loss is large, and the communication range is restricted. Further, when the wireless transmission is applied to the communication in an apparatus or between apparatuses, a propagation situation is dependent on an individual casing shape, and thus extra effort is necessary for estimation of the transmission state. Further, a countermeasure is necessary for unwanted radiation, and because of a problem of mutual interference, there is difficulty in increasing the number of the lines, and so on. Accordingly, there are problems to be solved.

In contrast, in the embodiment, the communication device and the high-frequency signal waveguide is able to perform high-capacity communication without the necessity to provide a special mechanism in a connection portion or only with a simple mechanism. For example, by using the high-frequency signal waveguide made of a dielectric material or a magnetic material, it is possible to decrease transmission loss as compared with the case of free space. Further, since the high-frequency signal is locked in the high-frequency signal waveguide and is transmitted, the problems, such as unwanted radiation and reflection caused by members in the apparatus, are corrected, and thus it is also possible to easily perform pluralization of the line (an increase in the number of multi-lanes). Similarly to general communication, time-division multiplexing or frequency-division multiplexing (propagation of plural frequencies in a single waveguide) may be applied, and thus the efficiency in transmission capacity is improved.

The transmission side is provided with a communication device that transmits first information and second information. The first information corresponds to, for example, destination information or frame information. The second information, for example, corresponds to the frame information when the first information is the destination information, and corresponds to the destination information when the first information is the frame information. The transmission-side communication device controls the strength of the transmission signal on the basis of the second information at the time of transmitting the first information to the reception-side communication device. The communication device may transmit third information in addition to the first information and the second information. In this case, at least one of the first information and the second information may include attribute information of the third information. The third information corresponds to, for example, data contents. For example, a module (communication device) having a communication function is disposed at a prescribed position. The communication device converts the first information (transmission target signal) into the high-frequency signal so as to thereby perform communication processing. At the time of the communication processing, on the basis of the second information (which may be hereinafter referred to as "preliminary information") different from the transmission target signal, the strength of the high-frequency signal is set. That is, the preliminary information is represented by the strength of the transmission signal (high-frequency signal), and is transmitted to the different communication device. Not only the transmission signal is used to transmit the transmission target signal, but also the strength information is used to transmit the second information. Preferably, characteristics (such as transmission loss) of propagation between transmission and reception are given, and the strength of the transmission signal is set on the basis of the characteristics of propagation between the communication devices.

It is preferable that the transmission-side communication device (corresponding to the communication device according to the second embodiment of the present disclosure) should include: a transmission processing section that performs transmission processing of the first information and the second information; and a control section that controls a strength of the transmission signal on the basis of the second information at the time of transmitting the first information. The configuration thereof may have been made such that the control section is separated from the transmission-side communication device. The reception-side communication device (corresponding to the communication device according to the third embodiment of the present disclosure) includes: an information specifying section that specifies the second information on the basis of the strength of the received signal; and a regeneration processing section that performs regeneration processing of the first information on the basis of the second information which is specified by the information specifying section.

An electronic apparatus may have the following configuration: a configuration in which the transmission-side communication device is provided (corresponding to that of the electronic apparatus according to the fourth embodiment of the present disclosure); a configuration in which the reception-side communication device is provided; or a configuration in which both transmission-side and reception-side communication devices are provided (corresponding to that of the electronic apparatus according to the fifth embodiment of the present disclosure).

Preferably, both transmission-side and reception-side communication devices are provided. In this case, the electronic apparatus includes: a transmission processing section that performs transmission processing of the first information and the second information; a signal waveguide that transmits a signal; a control section that controls a strength of the transmission signal on the basis of the second information at the time of transmitting the first information; an information specifying section that specifies the second information on the basis of the strength of the signal received through the signal waveguide; and a regeneration processing section that performs regeneration processing of the first information on the basis of the second information which is specified by the information specifying section. Here, the propagation characteristics between transmission and reception are given, and the control section controls the strength of the transmission signal on the basis of the propagation characteristics.

The control section, which performs control such that the strength of the signal is set on the basis of the second information and is transmitted to the different communication device, is provided in any one of the communication devices. However, the control section may be disposed in the communication device, and may be provided separately from the communication device. For example, in the case of the signal transmission in the electronic apparatus, it is possible to adopt a configuration in which the control section is provided separately from each of the transmission-side and reception-side communication devices.

Preferably, the communication device performs the transmission processing in a time-division manner. In other words, it is preferable that the transmission processing timing of each communication device should be defined. It is more preferable that the transmission processing timing of each communication device should be defined in advance. In other words, it is preferable that the transmission order of the respective communication devices and the transmission processing time per one transmission should be defined. The transmission processing timing is defined by a transmission processing order, a time width of each transmission processing, a total number of transmission processing operations for one cycle (that is, a total number of communication devices for one cycle), and the like. The total number can be calculated from the processing order.

Preferably, each communication device performs synchronized processing. Hence, for example, preferably, one communication device starts transmission processing (converts the transmission target signal into the high-frequency signal and performs the transmission processing) of the transmission target signal, which includes the master information for specifying the communication device itself, when receiving no (high-frequency) signal from a different communication device, and the different communication device specifies own transmission processing timing on the basis of the received master information, and starts the transmission processing. As a modified example thereof, the master information is sent separately from the transmission signal. For example, in the case of the signal transmission (in-apparatus transmission) in the electronic apparatus, it is possible to adopt a configuration in which the master information is notified through a system separate from that of the signal transmission between the respective transmission-side and reception-side communication devices.

Alternatively, preferably, one communication device starts transmission processing (converts the transmission target signal into the high-frequency signal and performs the transmission processing) of the transmission target signal, which includes a synchronizing signal for defining the processing timing of the entire system, when receiving no (high-frequency) signal from a different communication device, and the different communication device specifies own transmission processing timing on the basis of the received synchronizing signal and starts the transmission processing. For example, in the case of the signal transmission (in-apparatus transmission) in the electronic apparatus, it is possible to adopt a configuration in which the synchronizing signal is notified through a system separate from that of the signal transmission between the respective transmission-side and reception-side communication devices.

Still alternatively, a central control section (may also serve as a control section that performs control for transmission) may control the entire system. The configuration thereof is very appropriate for the case of the in-apparatus transmission. That is, by providing the central control section which controls the processing timing of the entire system, the central control section notifies a time point, at which the transmission processing of the corresponding communication device is possible, to each communication device, and each communication device performs the transmission processing at the notified time point at which the transmission processing is possible.

For example, at least a part of additional information of a normal communication packet, which is formed of a main part corresponding to a transmission target signal and an additional information part, can be treated as second information. In this case, it is preferable that the second information part of the communication packet should be removed from the additional information part.

When at least a part of the additional information is treated as the second information, for example, the destination information can be treated as the second information. In the reception side, from discrepancy between strengths of the high-frequency signals, it is possible to specify whether or not the received high-frequency signal is addressed to the corresponding reception side itself. In this case, the received signal strength information, which specifies whether or not the received high-frequency signal is addressed to the corresponding reception side itself, is defined as destination information in each (reception-side) communication device. It is preferable that the transmission-side communication device should transmit the high-frequency signal at a strength corresponding to the received signal strength information of the communication device which is the destination of the transmission target signal. It is preferable that the reception-side communication device should regenerate the transmission target signal on the basis of the high-frequency signal appropriate for the received signal strength information which is prescribed for the corresponding communication device itself. Preferably, the communication device is in a low power consumption state for a certain period of time when receiving the high-frequency signal inappropriate for the received signal strength information which is prescribed for the corresponding communication device itself.

The received signal strength information of each communication device may be different for each communication device, and some received signal strength information items may be the same. In the latter case, the received signal strength information items of all the communication devices may be the same.

When the main part of the communication packet formed of the main part and the additional information part includes any one of the transmission target signal and the control information, information for distinguishing the transmission target signal from the control information can be treated as the second information. In this case, it is preferable that the strength of the high-frequency signal at the time of transmitting the transmission target signal should be different from the strength of the high-frequency signal at the time of transmitting the control information. In the reception side, from discrepancy between strengths of the high-frequency signals, it is possible to specify the information (second information) for distinguishing the transmission target signal from the control information.

Information, which represents the length of the communication packet formed of the main part and the additional information part, can be treated as the second information. In this case, it is preferable that, in accordance with the information which represents the length of the communication packet, the strength of the high-frequency signal should be set to different. In the reception side, from discrepancy between strengths of the high-frequency signals, it is possible to specify the information (second information) for distinguishing the length of the communication packet.

[Others]

Preferably, a plurality of communication devices (which may be a form of a module) are disposed on the high-frequency signal waveguide, a plurality of transmission paths are formed, and data is transmitted and received between the communication devices. It is preferable that the communication device should be disposed to obtain a desired transmission band.

It is preferable that the high-frequency signal coupling structure (the input/output section of the high-frequency signal), which makes electromagnetic coupling of the high-frequency signals between the communication device and the high-frequency signal waveguide, should separate the high-frequency signals by using directivity or polarized waves. For example, by using the antenna with directivity in the horizontal direction, the signals are transmitted horizontally with respect to the high-frequency signal waveguide between transmission and reception. Alternatively, by using the antenna with directivity in the vertical direction, the signals are transmitted vertically with respect to the high-frequency signal waveguide between transmission and reception. The signals are combinations between the directivity and the vertically polarized waves, but instead of the vertically polarized waves, or in combination with the vertically polarized waves, circularly polarized waves may be applied.

<Communication Processing System: Basics>

Figure 2:
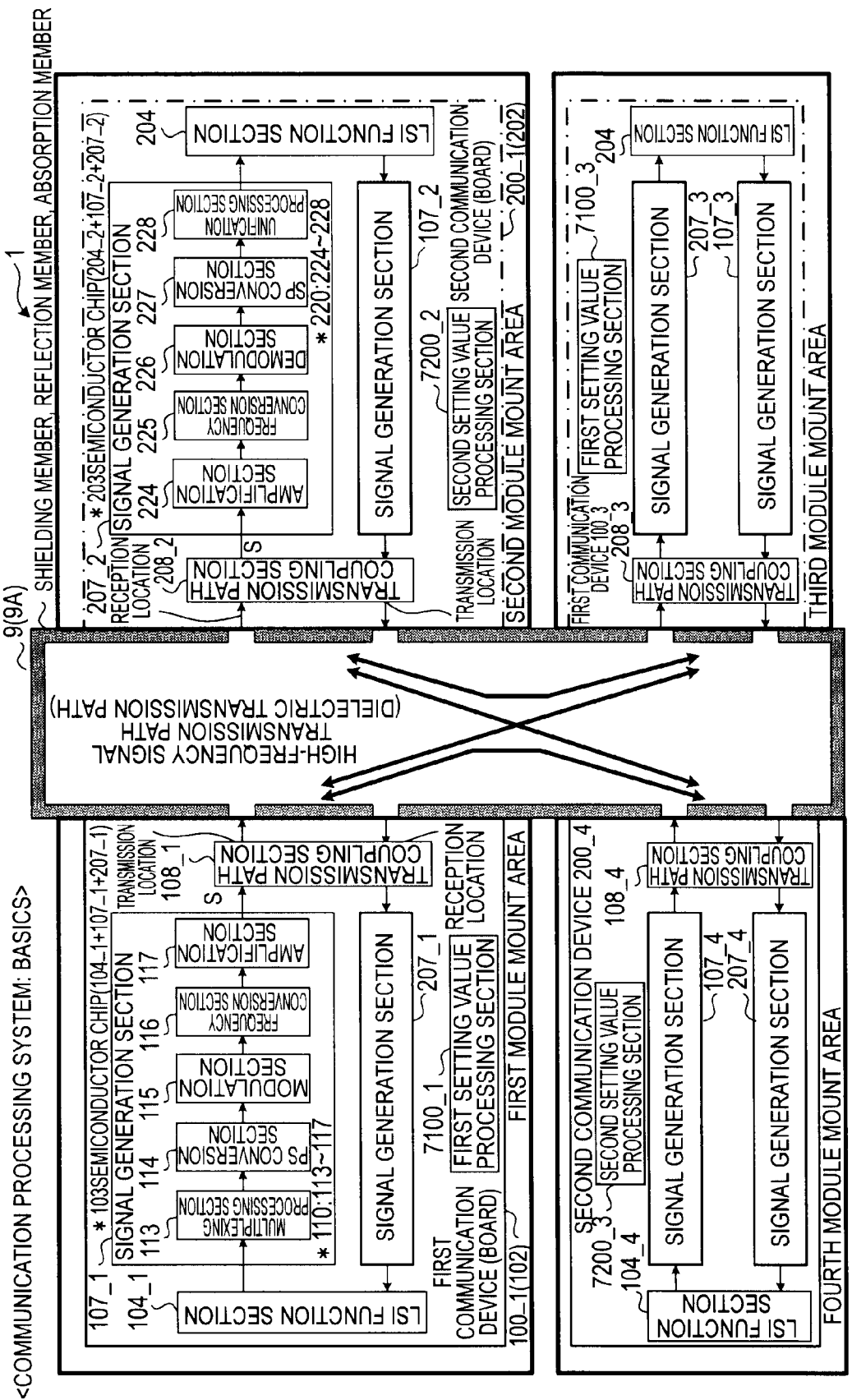
FIG. 2 is a functional block diagram of the signal transmission device.

FIG. 1 to 2 are diagrams illustrating a signal interface of the signal transmission device and the electronic apparatus of the embodiment in view of functional configuration. In other words, the drawings show fundamentals of functional block diagrams focusing on the communication processing in the signal transmission device and the electronic apparatus of the embodiment. Here, FIG. 1 shows a brief overview of the signal transmission device or the electronic apparatus. FIG. 2 is a functional block diagram of the signal transmission device.

As shown in FIG. 1, the signal transmission device 1 and the electronic apparatus 8 include four communication devices (transceiver) (two first communication devices 100 and two second communication devices 200), and those can be electromagnetically coupled with the high-frequency signal waveguide 308. For example, a first communication device 100_1, a second communication device 200_2, a first communication device 100_3, and a second communication device 200_4 are disposed on a high-frequency signal waveguide 308. The first communication device 100_1 and the second communication device 200_2 are provided with, for example, a data transceiving section, a signal conversion section, and a high-frequency signal input/output section. As the high-frequency signal waveguide 308, for example, a dielectric transmission path is used. In the signal transmission device 1 constituted of the high-frequency signal waveguide 308 and a plurality of communication devices disposed on the high-frequency signal waveguide 308, a plurality of transmission paths are formed in the high-frequency signal waveguide 308 between the communication devices, and multiple transmission is performed between the communication devices.

As necessary, a control section 7, which performs control such that the second information different from the transmission target signal is represented by the strength of the high-frequency signal so as to be transmitted on the different communication device, may be provided separately from the communication devices (the first communication device 100 and the second communication device 200). The function of the control section 7 may be provided to each communication device.

FIG. 2 shows details of the functional block diagram of the signal transmission device 1. FIG. 2 shows a transmission system in the first communication device 100_1, and a reception system in the second communication device 200_2. In the signal transmission device 1, the first communication device 100, which is an example of a first wireless device, and the second communication device 200, which is an example of a second wireless device, are coupled with each other through a millimeter wave signal transmission path 9 (an example of the high-frequency signal waveguide 308) and perform signal transmission using the high-frequency signal (for example, a millimeter wave band).

The first communication device 100 is provided with a semiconductor chip 103 compatible with transmission and reception in a millimeter wave band, and the second communication device 200 is provided with a semiconductor chip 203 compatible with transmission and reception in a millimeter wave band. For example, the first communication device 100_1 is provided in a first module mount area, the second communication device 200_2 is provided in a second module mount area, the first communication device 100_3 is provided in a third module mount area, and the second communication device 200_4 is provided in a fourth module mount area.

In the embodiment, only signals, which are demanded to be transmitted at a high speed and in a high capacity, are set as a target of the communication in the millimeter wave band, and other signals, which may be transmitted at a low speed and in a small amount or which can be regarded as DC current such as a power supply, are not set as a target of conversion into a millimeter wave signal. The signals (including a power supply), which are not set as a target of conversion into a millimeter wave signal, are connected in the same manner as the related art. Original electric signals as a target of transmission before conversion into millimeter waves are hereinafter referred to collectively as baseband signals. Each signal generation section to be described later is an example of a millimeter wave signal generation section or an electric signal conversion section.

In the first communication device 100, a transmission path coupling section 108 and a semiconductor chip 103 compatible with transmission and reception in the millimeter wave band are mounted on a board 102. The semiconductor chip 103 is an LSI (Large Scale Integrated Circuit). In the LSI, an LSI functional section 104 as an example of a preceding signal processing section, a signal generation section 107_1 (which converts the transmission target signal into the high-frequency signal and performs transmission processing) for transmission processing, and a signal generation section 207_1 for reception processing are integrated. The LSI functional section 104 is in charge of principal application control of the first communication device 100, and thus includes, for example, a circuit that processes various signals which are desired to be transmitted to the other party, and a circuit that processes various signals which are received from the other party. Although not shown in the drawings, the LSI functional section 104, the signal generation section 107_1, and the signal generation section 207_1 may be respectively formed as separate components, and any two of those may be integrated.

The semiconductor chip 103 is connected with the transmission path coupling section 108. Incidentally, the transmission path coupling section 108 may be built in the semiconductor chip 103. The location (that is, a portion for transmitting a radio signal), at which the transmission path coupling section 108 and the millimeter wave signal transmission path 9 are coupled, is a transmission location or a reception location, and typically an antenna corresponds thereto.

In the second communication device 200, a transmission path coupling section 208 and a semiconductor chip 203 compatible with transmission and reception in the millimeter wave band are mounted on a board 202. The semiconductor chip 203 is connected with the transmission path coupling section 208. Incidentally, the transmission path coupling section 208 may be built in the semiconductor chip 203. The employed transmission path coupling section 208 is the same as the transmission path coupling section 108. The semiconductor chip 203 is an LSI. In the LSI, an LSI functional section 204 as an example of a post signal processing section, a signal generation section 207_2 for reception processing, and a signal generation section 107_2 for transmission processing are integrated. Although not shown in the drawings, the LSI functional section 204, the signal generation section 107_2, and the signal generation section 207_2 may be respectively formed as separate components, and any two of those may be integrated.

The transmission path coupling section 108 and the transmission path coupling section 208 makes electromagnetic coupling of the high-frequency signal (electric signal of the millimeter wave band) with the millimeter wave signal transmission path 9. Thus, for example, an antenna structure having an antenna coupling section, an antenna terminal, an antenna, and the like is applied thereto. Alternatively, each coupling section may be formed as a transmission line itself such as a microstrip line, a strip line, a coplanar line, or a slot line.

The signal generation section 107_1 has a transmission-side signal generation section 110 for converting a signal from the LSI functional section 104 into a millimeter wave signal and controlling signal transmission through the millimeter wave signal transmission path 9. The signal generation section 207_1 has a reception-side signal generation section 220 for controlling signal reception through the millimeter wave signal transmission path 9. The signal generation section 107_2 has a transmission-side signal generation section 110 for converting a signal from the LSI functional section 204 into a millimeter wave signal and controlling signal transmission through the millimeter wave signal transmission path 9. The signal generation section 207_2 has a reception-side signal generation section 220 for controlling signal reception through the millimeter wave signal transmission path 9. The transmission-side signal generation section 110 and the transmission path coupling section 108 constitute a transmission system (transmission section: the communication section on the transmission side). The reception-side signal generation section 220 and the transmission path coupling section 208 constitute a reception system (reception section: the communication section on the reception side).

In order to generate a millimeter wave signal by processing an input signal, the transmission-side signal generation section 110 has a multiplex processing section 113, a parallel-serial conversion section 114 (PS conversion section), a modulation section 115, a frequency conversion section 116, and an amplification section 117. The amplification section 117 is an example of an amplitude adjustment section which adjusts and outputs the magnitude of the input signal. In addition, the modulation section 115 and the frequency conversion section 116 may be integrated into a so-called direct conversion system.

In a case where signals from the LSI functional section 104 include a plurality of types (N1) of signals as a target of communication in the millimeter wave band, the multiplex processing section 113 performs multiplex processing such as time-division multiplexing, frequency-division multiplexing or code-division multiplexing so as to thereby integrate the plurality of types of signals into a signal of one system. For example, the multiplex processing section 113 integrates a plurality of types of signals, for which high-speed transmission or high-capacity transmission are demanded, into a signal of one system as a target of transmission using a millimeter wave.

The parallel-serial conversion section 114 converts parallel signals into a serial data signal, and supplies the serial data signal to the modulation section 115. The modulation section 115 modulates the serial data signal as a transmission target signal, and supplies the modulated signal to the frequency conversion section 116. When the example is not applied, the parallel-serial conversion section 114 can be provided for parallel interface specifications using a plurality of signals for parallel transmission, and is thus not necessary for serial interface specifications.

It basically suffices for the modulation section 115 to modulate at least one of amplitude, frequency, and phase by the transmission object signal, and systems using arbitrary combinations of amplitude, frequency, and phase can be adopted. For example, an analog modulating system includes amplitude modulation (AM) and vector modulation. Vector modulation includes frequency modulation (FM) and phase modulation (PM). A digital modulating system includes for example amplitude shift keying (ASK), frequency shift keying (FSK), phase shift keying (PSK), and amplitude phase shift keying (APSK) that modulates amplitude and phase. Amplitude phase shift keying is typified by quadrature amplitude modulation (QAM). In the embodiment, in particular, a system capable of using a synchronous detection system on the reception side is adopted.

The frequency conversion section 116 generates a millimeter wave electric signal (high-frequency signal) by frequency-converting the transmission object signal after being modulated by the modulation section 115, and then supplies the millimeter wave electric signal to the amplification section 117. The millimeter wave electric signal refers to an electric signal of a certain frequency in a range of approximately 30 GHz to 300 GHz. The word "approximately" is used on the basis of a fact that it suffices for the frequency to be about such a frequency as to provide an effect of millimeter wave communication, with a lower limit not limited to 30 GHz and an upper limit not limited to 300 GHz.

As the frequency conversion section 116, it is possible to adopt various circuit configurations. However, for example, it is preferable to adopt a configuration in which the frequency conversion section 116 includes a frequency mixing circuit (mixer circuit) and a local oscillating circuit. The local oscillating circuit generates a carrier wave (a carrier signal or a reference carrier wave) used for modulation. The frequency mixing circuit generates a transmission signal in the millimeter wave band by multiplying (modulating) the carrier wave in the millimeter wave band which carrier wave is generated by the local oscillating circuit by the signal from the parallel-serial conversion section 114. The frequency mixing circuit then supplies the transmission signal to the amplification section 117.

The amplification section 117 amplifies the millimeter wave electric signal after the frequency conversion, and then supplies the signal to the transmission path coupling section 108. The amplification section 117 is connected to the bidirectional transmission path coupling section 108 through an antenna terminal which is not shown in the drawing. The transmission path coupling section 108 transmits the millimeter wave high-frequency signal generated by the transmission-side signal generation section 110 to the millimeter wave signal transmission path 9. The transmission path coupling section 108 is constituted by an antenna coupling section, for example. The antenna coupling section constitutes an example or a part of the transmission path coupling section 108 (signal coupling section). The antenna coupling section in a narrow sense refers to a part for coupling an electronic circuit within a semiconductor chip to an antenna disposed within the chip or outside the chip, and in a broad sense refers to apart for signal coupling of the semiconductor chip to the millimeter wave signal transmission path 9. For example, the antenna coupling section has at least an antenna structure. The antenna structure refers to a structure in a section for coupling electromagnetically (on the basis of electromagnetic field) with the millimeter wave signal transmission path 9. It suffices for the antenna structure to couple an electric signal in the millimeter wave band with the millimeter wave signal transmission path 9 (in this example, through the high-frequency signal waveguide 308), and the antenna structure does not mean only the antenna itself.

In order to generate an output signal by processing the millimeter wave electric signal received by the transmission path coupling section 208, the reception-side signal generation section 220 has an amplification sections 224, a frequency conversion section 225, a demodulation section 226, a serial-parallel conversion section 227 (SP conversion section), and a unification processing section 228. The amplification section 224 is an example of an amplitude adjustment section which adjusts and outputs the magnitude of the input signal. The frequency conversion section 225 and the demodulation section 226 may be integrated into a so-called direct conversion system. Further, by using an injection synchronizing (injection locking) method, a demodulation carrier signal may be generated. The transmission path coupling section 208 is connected with the reception-side signal generation section 220. The amplification section 224 on the reception side is connected to the transmission path coupling section 208. The amplification section 224 amplifies the millimeter wave electric signal after being received by an antenna, and then supplies the signal to the frequency conversion section 225. The frequency conversion section 225 frequency-converts the millimeter wave electric signal after the amplification, and then supplies the signal after the frequency conversion to the demodulation section 226. The demodulation section 226 obtains a baseband signal by demodulating the signal after the frequency conversion, and then supplies the baseband signal to the serial-parallel conversion section 227.

The serial-parallel conversion section 227 converts serial received data to parallel output data, and then supplies the data to the unification processing section 228. Similarly to the parallel-serial conversion section 114, when the example is not applied, the serial-parallel conversion section 227 is provided for the parallel interface specifications using a plurality of signals for parallel transmission. When original signal transmission between the first communication device 100 and the second communication device 200 is in a serial form, the parallel-serial conversion section 114 and the serial-parallel conversion section 227 may not be provided.

When original signal transmission between the first communication device 100 and the second communication device 200 is in a parallel form, the input signal is subjected to the parallel-serial conversion, and is transmitted to the semiconductor chip 203 side, and the signal received from the semiconductor chip 203 side is subjected to the serial-parallel conversion, thereby reducing the number of signals as targets of millimeter wave conversion.

The unification processing section 228 corresponds to the multiplexing processing section 113. The unification processing section 228 separates the signal, which is integrated into one system, into a plurality of types of signals_n (n is 1 to N). For example, the unification processing section 228 separates the plurality of data signals, which are integrated into the signal of one system, into separate data signals, and then supplies the signals to the LSI functional section 204.

The LSI functional section 204 is in charge of principal application control of the second communication device 200, and thus includes, for example, a circuit that processes various signals which are received from the other party. For example, the LSI functional section 204 includes: an information specifying section that specifies the second information, which is different from the transmission target signal, on the basis of the strength of the received high-frequency signal; and a regeneration processing section that performs regeneration processing of the transmission target signal on the basis of the second information which is specified by the information specifying section.

In a relationship of FIG. 1, for example, the range from the LSI functional section 104 to the parallel-serial conversion section 114 of the signal generation section 107 and the range from the LSI functional section 204 to the serial-parallel conversion section 227 correspond to the data transceiving section. The range from the modulation section 115 to the amplification section 117 or the range from the amplification section 224 to the demodulation section 226 corresponds to the high-frequency signal conversion section. The transmission path coupling section 108 or the transmission path coupling section 208 corresponds to the high-frequency signal input/output section.

[Parameter Setting]

The signal transmission device 1 of the embodiment further has a parameter setting function. For example, the first communication device 100 has a first setting value processing section 7100. The drawing shows an example in which the first setting value processing section 7100 is provided on the board 102. However, the first setting value processing section 7100 may be mounted on a board different from the board 102 on which the semiconductor chip 103 is mounted. Further, the drawing shows an example in which the first setting value processing section 7100 is provided out of the semiconductor chip 103. However, the first setting value processing section 7100 may be built in the semiconductor chip 103. In this case, the first setting value processing section 7100 is mounted on the board 102 the same as the board 102 on which each functional section as a control target is mounted. The second communication device 200 has a second setting value processing section 7200. The drawing shows an example in which the second setting value processing section 7200 is provided on the board 202. However, the second setting value processing section 7200 may be mounted on a board different from the board 202 on which the semiconductor chip 203 is mounted. Further, the drawing shows an example in which the second setting value processing section 7200 is provided out of the semiconductor chip 203. However, the second setting value processing section 7200 may be built in the semiconductor chip 203. In this case, the second setting value processing section 7200 is mounted on the board 202 the same as the board 202 on which each functional section as a control target is mounted. Furthermore, the first setting value processing section 7100 and the second setting value processing section 7200 may be provided separately from the communication devices.

The first setting value processing section 7100 and the second setting value processing section 7200 inputs the setting value for prescribed signal processing to the signal processing section. In particular, in the embodiment, by providing a function corresponding to the control section 7 shown in FIG. 1, control is performed such that the second information, which is different from the transmission target signal, is represented by the strength of the high-frequency signal, and is transmitted to the different communication device. The first setting value processing section 7100 and the second setting value processing section 7200 will be described in detail later.

[Signal Transmission Path]

The millimeter wave signal transmission path 9, which is a propagation path of the millimeter waves, may be configured such that propagation is made through, for example, a space in a casing as a free space transmission path. However, in the embodiment, preferably, the millimeter wave signal transmission path 9 is configured to have a waveguide structure such as a waveguide, a transmission line, a dielectric line, or a dielectric body inside, is configured to lock the electromagnetic waves of the millimeter wave band in the transmission path, and is formed as a high-frequency signal waveguide 308 having an efficient transmission characteristic. For example, it is preferable that the transmission path should be formed as a dielectric transmission path 9A including a dielectric material with an effective relative permittivity in a predetermined range and a dielectric tangent in a predetermined range. The dielectric transmission path 9A may be, for example, a circuit board itself, may be disposed on the board, and may be embedded in the board. Since it is possible to use plastic as the dielectric material, the dielectric transmission path 9A can be formed at low cost. In addition, the millimeter wave signal transmission path 9 (high-frequency signal waveguide 308) may use a magnetic material instead of the dielectric material.

[Compatibility with Simplex Communication]

FIG. 2 shows an example of a configuration compatible with bidirectional communication. However, the signal generation section 107_1 and the signal generation section 207_1 may be set as a pair, or the signal generation section 107_2 and the signal generation section 207_2 may be set as a pair. In this case, the configuration is compatible with unidirectional communication. Incidentally, in the "bidirectional communication" of the configuration shown in FIG. 2, the millimeter wave signal transmission path 9, which is a millimeter wave transmission channel, is compatible with single-core bidirectional transmission of one system (single core). In order to realize this, a half-duplex system to which time-division multiplexing (TDD: Time Division Duplex) is applied, frequency-division multiplexing (FDD: Frequency Division Duplex) or the like is applied.

[Connection and Operation]

A method of frequency-converting an input signal and performing signal transmission is commonly used in broadcasting and radio communications. In these applications, relatively complex transmitters and receivers and the like are used which can deal with problems of how far communication can be attained (problem of S/N with respect to thermal noise), how to cope with reflection and multiple paths, and how to suppress disturbance and interference with other channels, for example.

In contrast, the signal generation section 107 and the signal generation section 207 used in the embodiment are used in the millimeter wave band of a higher frequency band than usable frequencies of complex transmitters and receivers and the like commonly used in broadcasting and radio communication. For this reason, since the wavelength λ thereof is short, frequency reuse is easily made, and signal generation sections suitable for performing communication between many devices arranged in proximity to each other are used.

In the embodiment, unlike a signal interface using existing electric wiring, compatibility can be made flexibly for high speed and high capacity by performing signal transmission in the millimeter wave band, as described above. For example, only signals desired to have a high-speed characteristic and a high-capacity characteristic are set as targets of communication in the millimeter wave band, and depending on a system configuration, the first communication device 100 and the second communication device 200 have, in a part thereof, an interface (connection by a terminal or a connector) using existing electric wiring for low-speed and low-capacity signals and for power supply.

The signal generation section 107 is an example of a signal processing section which performs prescribed signal processing on the basis of the setting values (parameters). In this example, the signal generation section 107 performs the signal processing on an input signal which is input from the LSI functional section 104, and thereby generates a millimeter wave signal. The signal generation section 107 and the signal generation section 207 are connected to the transmission path coupling section 108 through a transmission line such as a microstrip line, a strip line, a coplanar line, or a slot line, for example. The generated millimeter wave signal is supplied to the millimeter wave signal transmission path 9 through the transmission path coupling section 108.

The transmission path coupling section 108 has an antenna structure. The transmission path coupling section 108 implements a function of converting the transmitted millimeter wave signal into electromagnetic waves and sending out the electromagnetic waves. The transmission path coupling section 108 is electromagnetically coupled with the millimeter wave signal transmission path 9. The electromagnetic waves, which are converted by the transmission path coupling section 108, are supplied to one end portion of the millimeter wave signal transmission path 9. The transmission path coupling section 208 on the side of the second communication device 200 is coupled with the other end of the millimeter wave signal transmission path 9. By providing the millimeter wave signal transmission path 9 between the transmission path coupling section 108 on the side of the first communication device 100 and the transmission path coupling section 208 on the side of the second communication device 200, the electromagnetic waves in the millimeter wave band propagate through the millimeter wave signal transmission path 9. The transmission path coupling section 208 receives the electromagnetic waves transmitted to the other end of the millimeter wave signal transmission path 9, converts the electromagnetic waves into a millimeter wave signal, and then supplies the signal to the signal generation section 207 (baseband signal generation section). The signal generation section 207 is an example of a signal processing section which performs prescribed signal processing on the basis of the setting values (parameters). In this example, the signal generation section 207 performs the signal processing on the converted millimeter wave signal, thereby generates an output signal (baseband signal), and then supplies the output signal to the LSI functional section 204. The above description has been made of a case of signal transmission from the first communication device 100 to the second communication device 200. However, in the same manner as described above, considering a case of transmitting a signal from the LSI functional section 204 of the second communication device 200 to the first communication device 100, it is possible to bidirectionally transmit millimeter wave signals.

COMPARATIVE EXAMPLES

Figure 3A:
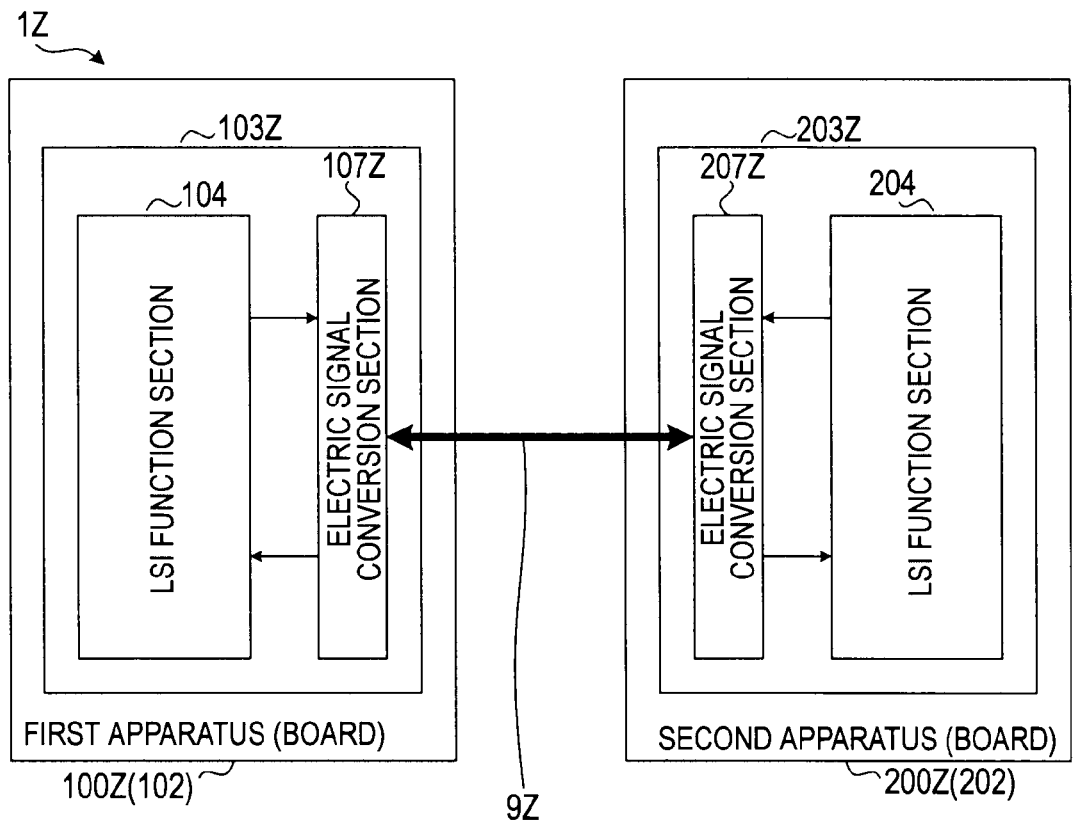
FIGS. 3A and 3B are diagrams illustrating a signal interface of the signal transmission device of a comparative example in view of functional configuration.
Figure 3B:
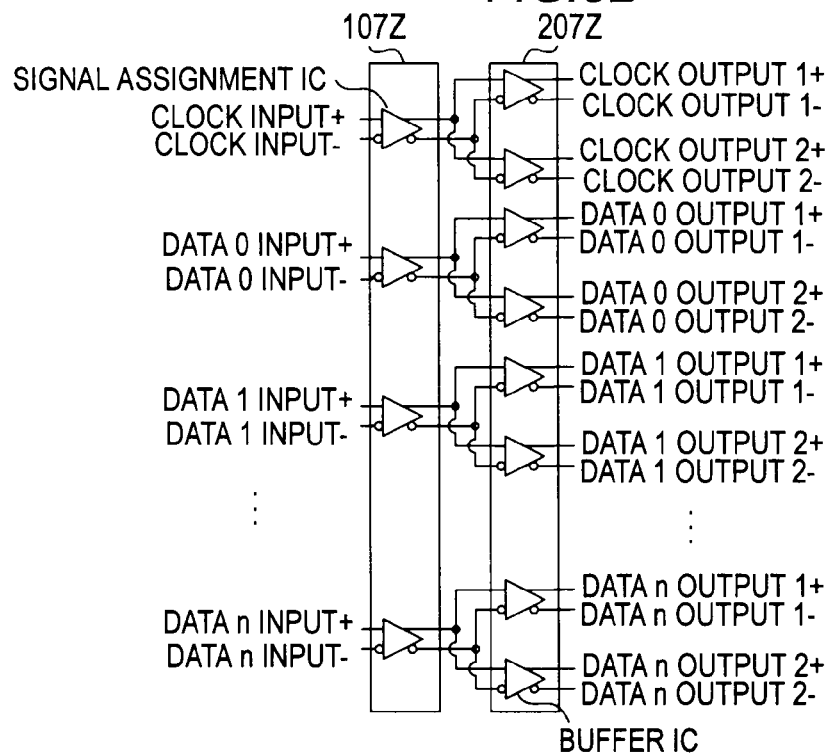

FIGS. 3A and 3B are diagrams illustrating a signal interface of the signal transmission device of a comparative example in view of functional configuration. FIG. 3A shows a brief overview of the whole system. A signal transmission device 1Z of a comparative example is configured such that a first device 100Z and a second device 200Z are coupled together through an electrical interface 9Z so as to perform signal transmission. A semiconductor chip 103Z capable of signal transmission through electric wiring lines is provided in the first device 100Z. Similarly, a semiconductor chip 203Z capable of signal transmission through electric wiring lines is provided in the second device 200Z. In this configuration, the millimeter wave signal transmission path 9 of the first embodiment is replaced by the electrical interface 9Z. In order to perform signal transmission through electric wiring lines, the first device 100Z is provided with an electric signal conversion section 107Z in place of the signal generation section 107 and transmission path coupling section 108. The second device 200Z is provided with an electric signal conversion section 207Z in place of the signal generation section 207 and transmission path coupling section 208. In the first device 100Z, the electric signal conversion section 1072 performs electric signal transmission control on the LSI functional section 104 through the electrical interface 9Z. Other hand, in the second device 200Z, the electric signal conversion section 207Z is accessed through the electrical interface 9Z, and thereby obtains data transmitted from the LSI functional section 104.

For example, in electronic apparatuses using a solid-state imaging device such as a digital camera, the solid-state imaging device is disposed near an optical lens, and in most case, a signal processing circuit out of the solid-state imaging device performs various kinds of signal processing such as image processing of electric signals from the solid-state imaging device, compression processing, and image storing. For example, a technique for high-speed transmission of electric signal between the solid-state imaging device and the signal processing circuit is necessary to cope with an increase in number of pixels and an increase in frame rate. In order to cope therewith, mostly LDVS has been used. In order to accurately transmit the LVDS signal, a matched impedance terminal is necessary. However, since it is difficult to ignore an increase in power consumption, in order to transmit a plurality of LVDS signals necessary to be synchronized, it is necessary for the wiring line lengths of those to be kept equal to each other so as to sufficiently minimize wiring delay. In order to transmit electric signals at a higher speed, for example, the number of LVDS signal lines may be increased. However, in this case, as difficulty in designing a printed wiring board increases, this causes complication of the printed wiring board or cable wiring lines and an increase in number of terminals for the wiring line interconnecting the solid-state imaging device and the signal processing circuit. As a result, a problem arises in view of a decrease in size and reduction in costs. Furthermore, the increase in number of signal lines causes the following new problem. The increase in number of lines causes an increase in costs of cables and connectors.

In contrast, the electric signal conversion sections 107Z and 207Z of the comparative example are replaced by the signal generation sections 107 and 207 and the transmission path coupling sections 108 and 208, thus performing signal transmission by using high-frequency signals (for example, the millimeter wave band) rather than electric wiring lines. The transmission paths of signals are changed from the wiring lines to the electromagnetic wave transmission paths. Thus, since connectors and cables used for the signal transmission using electric wiring lines are not necessary, there is an advantage in reducing costs, and it is not necessary to consider reliability relating to connectors and cables. As a result, there is an advantage in improving reliability of the transmission path. In the case of using connectors and cables, rooms for fitting thereof and time for assembly thereof are necessary. However, by using the high-frequency signal transmission, the rooms for fitting is not necessary, and thus it is possible to decrease a size of apparatus. In addition, the time for assembly can be reduced, and thus it is possible to reduce the time for manufacture thereof.

In particular, in the embodiment, the high-frequency signal waveguide, which is able to transmit electromagnetic waves such as millimeter waves with low loss, is provided in a cradle apparatus, and a portable electronic apparatus 420, which has a transmission path coupling section (coupler) on the high-frequency signal waveguide, is provided, thereby transferring the electromagnetic waves such as millimeter waves through the inside of the high-frequency signal waveguide and performing data transmission. As compared with the connection of the electric wiring lines, in arrangement of the high-frequency signal waveguide and the transmission path coupling section (so called coupler), without specifying pin arrangement or a contact position like a connector of the electric wiring lines, it is possible to allow an error ranging from several millimeters to several centimeters. By electromagnetically coupling the high-frequency signal with the high-frequency signal waveguide through the transmission path coupling section, as compared with general wireless connection including the outdoor wireless communication and the like, since it is possible to reduce loss of electromagnetic waves, it is possible to reduce the electric power of the transmitter, and it is possible to simplify a configuration of the reception side. Therefore, it is possible to reduce the power consumption for the communication function, it is possible to decrease the size for the communication function, and it is possible to reduce costs for the communication function. As compared with general wireless connection including the outdoor wireless communication and the like, it is possible to suppress interference between radio waves from the outside of the apparatus or conversely it is possible to suppress radiation to the outside of the apparatus. Therefore, it is possible to reduce costs and size necessary for the countermeasure of the interference.

<Parameter Setting Function>

Figure 4:
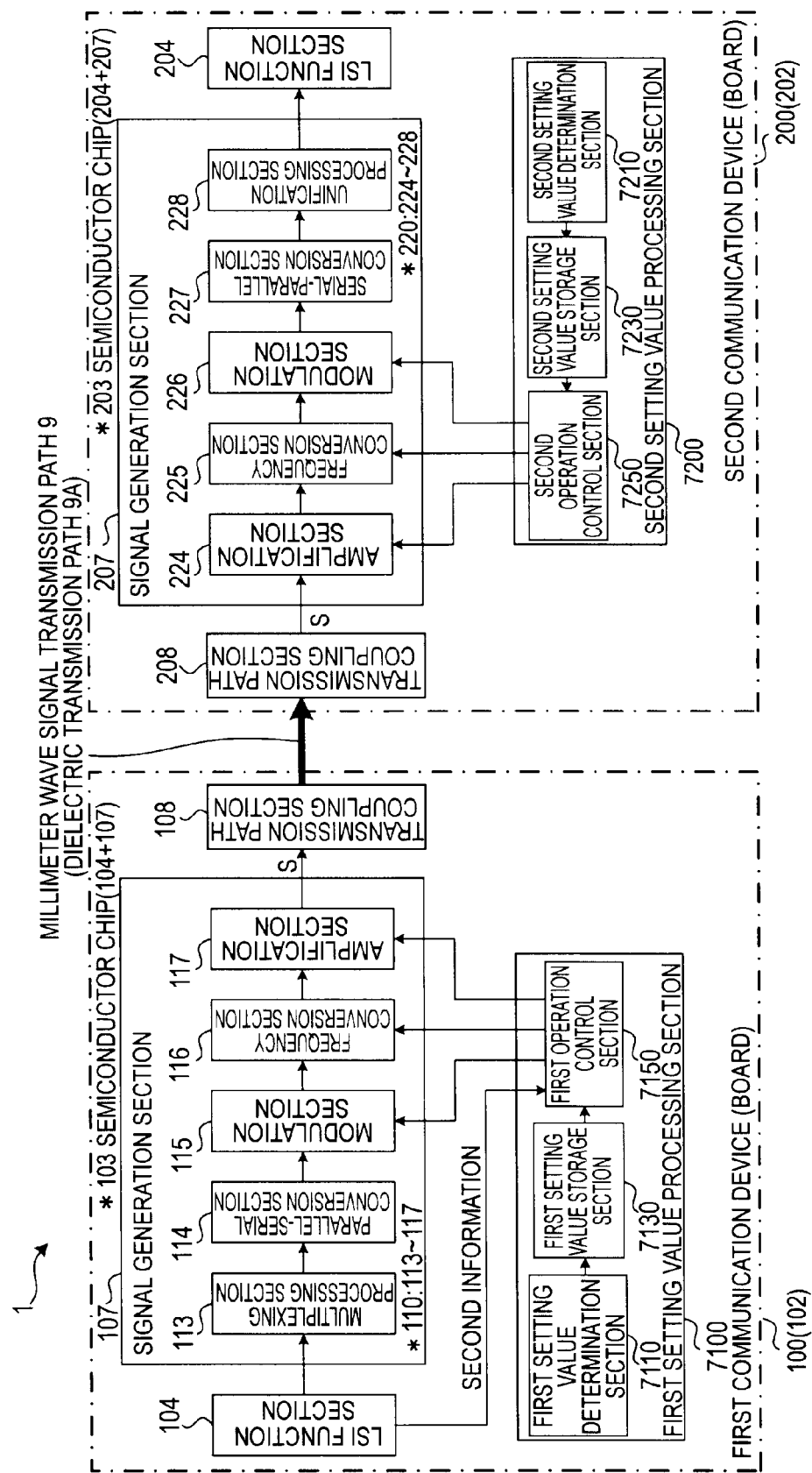
FIG. 4 is a diagram (first example) illustrating a connection relationship between a setting value processing section and a signal generation section.
Figure 5:
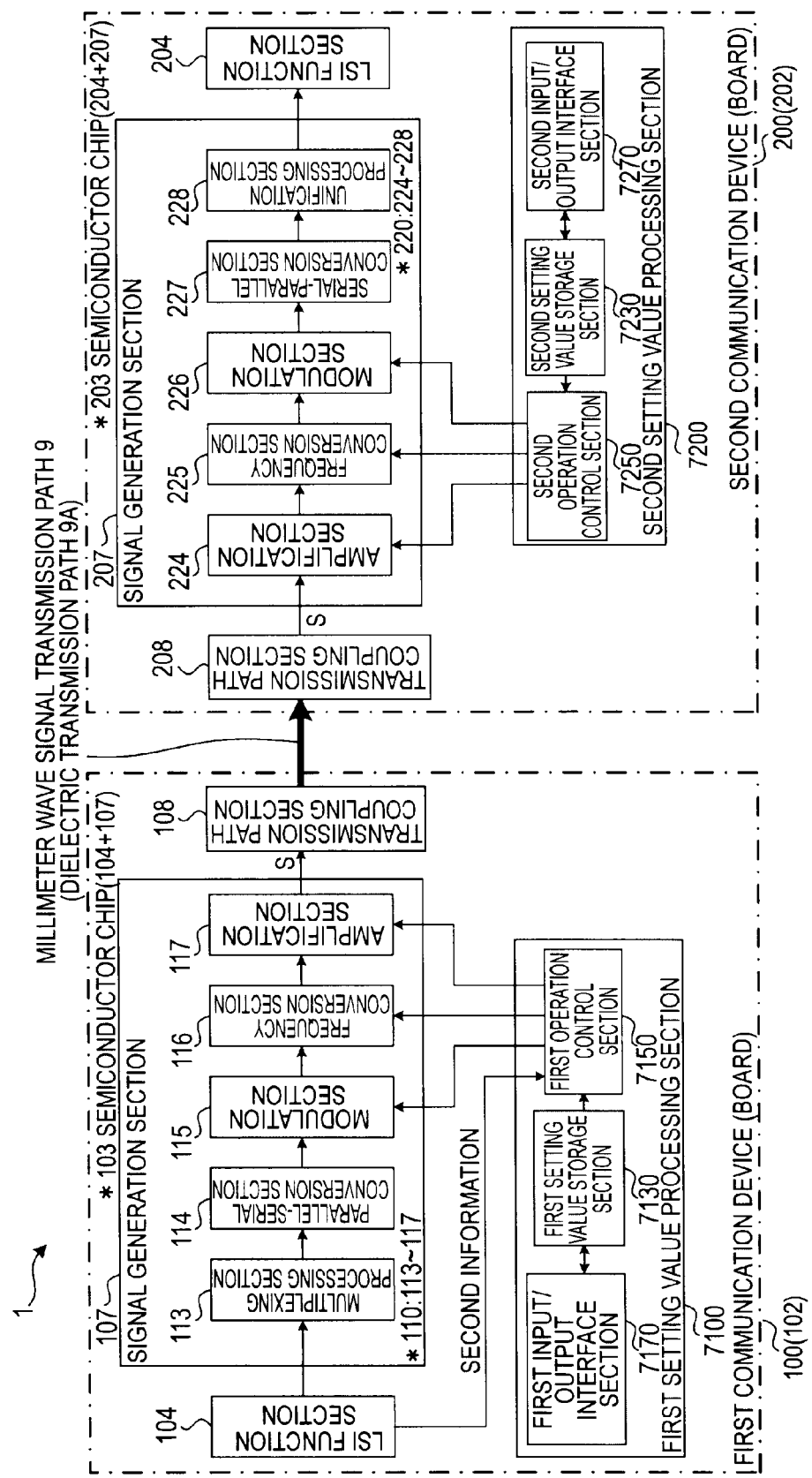
FIG. 5 is a diagram (second example) illustrating a connection relationship between a setting value processing section and a signal generation section.

FIGS. 4 to 6 are diagrams illustrating the parameter setting functions of the first setting value processing section 7100 and the second setting value processing section 7200. Here, FIGS. 4 to 5 are diagrams illustrating a connection relationship between the first setting value processing section 7100 and the signal generation section 107 and a connection relationship between the second setting value processing section 7200 and the signal generation section 207. FIG. 6 is a diagram illustrating a transmission power control function.

In the first example shown in FIG. 4, in the first communication device 100, the first setting value processing section 7100 including a first setting value determination section 7110, a first setting value storage section 7130, and a first operation control section 7150 is provided on the board 102. The first setting value determination section 7110 determines setting values (variables, parameters) for designating operations (that is, all operations of the first communication device 100) of the respective functional sections of the semiconductor chip 103. The processing for determining the setting values is performed, for example, before shipment of products in a factory. The first setting value storage section 7130 stores the setting values which are determined by the first setting value determination section 7110. The first operation control section 7150 operates the respective functional sections (in this example, the modulation section 115, the frequency conversion section 116, the amplification section 117, and the like) of the semiconductor chip 103 on the basis of the setting values which are read from the first setting value storage section 7130. In particular, in the embodiment, the first operation control section 7150 receives an input of the second information, which serves as electric power control information, other than the transmission target signal from the LSI functional section 104. Thus, on the basis of not only the information (such as propagation characteristics) stored in the first setting value storage section 7130 but also the electric power control information (second information), the first operation control section 7150 controls the amplification section 117 so as to thereby set the strength of the high-frequency signal.

In the example shown in the drawing, the first setting value processing section 7100 is provided on the board 102. However, the first setting value processing section 7100 may be mounted on a board 7102 which is different from the board 102 on which the semiconductor chip 103 is mounted. Further, in the example shown in the drawing, the first setting value processing section 7100 is provided out of the semiconductor chip 103. However, the first setting value processing section 7100 may be built in the semiconductor chip 103. In this case, the first setting value processing section 7100 is mounted on the board 102 the same as the board 102 on which the respective functional sections (the modulation section 115, the frequency conversion section 116, the amplification section 117, and the like) as control targets are mounted (not shown in the drawing).

In the second communication device 200, the second setting value processing section 7200 including a second setting value determination section 7210, a second setting value storage section 7230, and a second operation control section 7250 is provided on the board 202. The second setting value determination section 7210 determines setting values (variables, parameters) for designating operations (that is, all operations of the second communication device 200) of the respective functional sections of the semiconductor chip 203. The processing for determining the setting values is performed, for example, before shipment of products in a factory. The second setting value storage section 7230 stores the setting values which are determined by the second setting value determination section 7210. The second operation control section 7250 operates the respective functional sections (in this example, the amplification section 224, the frequency conversion section 225, the demodulation section 226, and the like) of the semiconductor chip 203 on the basis of the setting values which are read from the second setting value storage section 7230.

In the example shown in the drawing, the second setting value processing section 7200 is provided on the board 202. However, the second setting value processing section 7200 may be mounted on a board 7202 which is different from the board 202 on which the semiconductor chip 203 is mounted. Further, in the example shown in the drawing, the second setting value processing section 7200 is provided out of the semiconductor chip 203. However, the second setting value processing section 7200 may be built in the semiconductor chip 203. In this case, the second setting value processing section 7200 is mounted on the board 202 the same as the board 202 on which the respective functional sections (the amplification section 224, the frequency conversion section 225, the demodulation section 226, and the like) as control targets are mounted (not shown in the drawing).

The second example shown in FIG. 5 is characterized in that the setting values determined out of the apparatus are stored. Hereinafter, a description will be given focusing on difference between the first example and the second example. In the second example, instead of the first setting value determination section 7110, a first input/output interface section 7170 is provided, and instead of the second setting value determination section 7210, a second input/output interface section 7270 is provided. Each of the first input/output interface section 7170 and the second input/output interface section 7270 is an example of a setting value receiving section that receives the setting values from the outside. The first input/output interface section 7170 implements a function of interface with the first setting value storage section 7130, stores the setting values, which are obtained from the outside, in the first setting value storage section 7130, and reads out and outputs the setting values stored in the first setting value storage section 7130. The second input/output interface section 7270 implements a function of interface with the second setting value storage section 7230, stores the setting values, which are obtained from the outside, in the second setting value storage section 7230, and reads out and outputs the setting values stored in the second setting value storage section 7230.

In the case of the second example, the setting values are not determined in the first setting value processing section 7100 and the second setting value processing section 7200, but the setting values are determined outside. For example, the setting values may be determined on the basis of design parameters and a state of an actual apparatus, and the setting values may be determined on the basis of an actual operation test of the apparatus. Further, in any case, individual setting values may not be determined for each apparatus, but common setting values may be determined for each apparatus. This case corresponds to the most cases where the setting values are determined on the basis of the design parameters, and also corresponds to the case where the setting values are determined on the basis of the actual operation test of the reference apparatus.

The signal transmission device 1 or the electronic apparatus 8 includes at least one of the transmission-side communication device (actually referred to as a transmission processing section or a transmission section) and the reception-side communication device (actually referred to as a regeneration processing section or a reception section). The transmission processing section converts the transmission target signal into the high-frequency signal, and transmits the signal by using a wireless communication processing technique. The regeneration processing section receives the high-frequency signal which is transmitted from the transmission processing section, and regenerates the transmission target signal. Here, it is assumed that the transmission characteristics between the transmission section and the reception section are given. For example, arrangement positions of the transmission section and the reception section in a single casing may not be changed (communication may be performed in an apparatus), or even when the transmission section and the reception section are respectively disposed in separate casings, the arrangement positions of the transmission section and the reception section in a usage state may be determined in advance (wireless transmission may be performed between apparatuses located at relatively close distance). Similarly to the above case, under environment where a transmission condition is not actually changed (that is, fixed) between transmission and reception, it is possible to know the transmission characteristics between the transmission section and the reception section in advance. In addition, at least one of the preceding stage of the transmission section and the post-stage of the reception section is provided with the signal processing section and the setting value processing section. The signal processing section performs prescribed signal processing on the basis of the setting values. The setting value processing section inputs the setting values for the prescribed signal processing to the signal processing section.

The signal transmission in an apparatus or between apparatuses or setting values corresponding to the transmission characteristics are not limited, but the setting values may include, for example, parameter setting for correcting variation of the circuit element. However, preferably, the setting value processing section inputs the setting values, which are for the prescribed signal processing corresponding to the transmission characteristics between the transmission section and the reception section, to the signal processing section. Under environment where a transmission condition is not actually changed (that is, fixed) between transmission and reception, even when the setting values defining operations of the signal processing section are treated as fixed values, that is, even when the parameter setting is fixed, it is possible to operate the signal processing section without inconvenience. By using prescribed values (that is, the fixed values) as the setting values for signal processing, the parameter setting is not dynamically changed. Therefore, it is possible to remove a parameter calculation circuit, and it is possible to reduce power consumption. In the wireless transmission in an apparatus or between apparatuses located at relatively close distance, the communication environment is fixed, and thus it is possible to determine various circuit parameters depending on communication environment. Under the environment where the transmission condition is fixed, even when the setting values defining operations of the signal processing section are treated as fixed values, that is, even when the parameter setting is fixed, it is possible to operate the signal processing section without inconvenience. For example, before shipment from the factory, optimum parameters are obtained, and the parameters are retained in the apparatus. Thereby, it is possible to remove a parameter calculation circuit, and it is possible to reduce power consumption.

In order to determine various circuit parameters in advance, it is possible to adopt any one of a first method of automatically generating parameters in the apparatus and a second method of using parameters which are generated outside the wireless transmission apparatus (or the electronic apparatus). In order to adopt the first method, it is preferable that the setting value processing section should have a setting value determination section that determines the setting values, a storage section that stores the setting values which are determined by the setting value determination section, and an operation control section that operates the signal processing section on the basis of the setting values which are read from the storage section. In order to adopt the second method, it is preferable that the setting value processing section should have a setting value receiving section that receives the setting values from the outside, a storage section that stores the setting values which are received by the setting value receiving section, and an operation control section that operates the signal processing section on the basis of the setting values which are read from the storage section.

As the parameter setting of the signal processing, there are various items such as gain setting (signal amplitude setting) of the signal amplification circuit (amplitude adjustment section), a phase adjustment amount, and frequency characteristics. However, in the embodiment, attention is focused on, particularly, the transmitted signal strength (that is, transmission power setting). Incidentally, the gain setting is used in transmission power setting, reception level setting which is input to the demodulation functional section, automatic gain control (AGC), and the like. In such a case, the signal processing section has an amplitude adjustment section that performs signal processing of adjusting the magnitude of an input signal and outputting the adjusted signal, and the setting value processing section inputs the setting values, which are for adjusting the magnitude of the input signal, to the amplitude adjustment section.

FIG. 6 shows a configuration of a modulation functional section 8300 which is provided on the transmission side. The signal (a baseband signal: for example, a 12-bit image signal) as a transmission target is converted into a series of high-speed serial data through a parallel-serial conversion section 8114 (corresponding to P-S: parallel-serial conversion section 114), and is supplied to the modulation functional section 8300. The modulation functional section 8300 modulates the signal from the parallel-serial conversion section 8114 into a signal in the millimeter wave band in accordance with a prescribed modulation mode as a modulation signal. As the modulation functional section 8300, it is possible to adopt various circuit configurations in accordance with the modulation mode. However, for example, it suffices for the mode of modulating the amplitude to employ a configuration in which a two-input-type frequency mixing section 8302 (a mixer circuit, a multiplier) and a transmission-side local oscillation section 8304 are provided. The transmission-side local oscillation section 8304 (first carrier signal generation section) generates a carrier signal (modulation carrier signal) for use in modulation. The frequency mixing section 8302 (first frequency conversion section) multiplies (modulates) the carrier in the millimeter wave band generated by the transmission-side local oscillation section 8304 by the signal from a parallel-to-serial conversion section 8114 so as to thereby generate a transmission signal (modulated signal) in the millimeter wave band and supply the transmission signal to an amplification section 8117 (corresponding to the amplification section 117). The transmission signal is amplified by the amplification section 8117 and emitted from an antenna 8136.

[Advantage and Effects]

Here, as shown in FIG. 6, the first setting value processing section 7100, which controls the level of the transmission signal output from the amplification section 8117, is provided on the transmission side. The first setting value processing section 7100 includes an output level DAC 7152 that sets the output level of the amplification section 8117 as the first operation control section 7150. The first setting value processing section 7100 employs the second example, but similarly to the first example, instead of the first input/output interface section 7170, the first setting value determination section 7110 may be provided. The output level DAC 7152 reads the setting values which are stored in the first setting value storage section 7130, and controls the amplification section 8117 on the basis of the setting values, thereby setting the transmission output level to an appropriate value. For example, the first input/output interface section 7170 receives an input such as information representing loss of propagation between communication devices, and the first operation control section 7150 receives an input of the second information. The output level DAC 7152 is able to set the transmission output level on the basis of not only the information representing the propagation loss but also the second information.

Although how to set the transmission output level will be described in detail later, in the embodiment, setting is made such that, particularly, the second information, which is different from the transmission target signal, is represented by the strength of the high-frequency signal, and is transmitted. That is, there is provided a mechanism for controlling the transmission power. However, the purpose thereof is not limited to a purpose of not reaching an excessively large level, a purpose of not reaching an excessively small level, or a purpose of preventing SNR (Signal Noise Ratio: signal-to-noise ratio, S/N) from reaching an excessively small level, and the strength of the high-frequency signal is set to represent the second information. On the basis of the transmission characteristics (communication environment characteristics) such as a transmission distance in the arrangement of the transceiver and the transmission path state, the transmission output level is appropriately controlled, thereby transmitting the second information by using the strength of the high-frequency signal.

It is possible to adopt various methods from the viewpoint of whether fixed setting (so-called pre-set setting) or automatic control is selected as the mechanism for controlling the transmission power, how to determine the setting level, and the like. For example, on the basis of the transmission characteristics between transmission and reception (communication environment), it is possible to adopt a method of performing the pre-set setting of the transmission output level. At this time, as a preferred embodiment, there is provided a transmission characteristic index detection section that detects a characteristic state of transmission between the transmission chip as the transmission apparatus and the reception chip as the reception apparatus. With such a configuration, referring to a transmission characteristic index signal as a detection result thereof, it is possible to perform the pre-set setting of the transmission output level on the transmission chip side. For example, the first setting value determination section 7110 or the second setting value determination section 7210 implements a function of the transmission characteristic index detection section. For example, the transmission characteristic index detection section is provided on the reception chip side (or the transmission characteristic index detection section may not be built in the reception chip), and detects a state of the received radio signal. With such a configuration, referring to the transmission characteristic index signal as a detection result thereof, the transmission output level on the transmission chip side is subjected to the pre-set setting (the determined setting value is stored in the first setting value storage section 7130). This method is not an automatic control method using feedback, but is to refer the reception level of the reception side as a determination index at the time of the pre-set setting of the transmission level. Since the reception level is changed in accordance with transmission characteristics such as a transmission path state and a transmission distance depending on the arrangement of the transceiver, the distance between transmission and reception is not directly determined, but the reception level, in which actual transmission characteristics are reflected, is used as the determination index, thereby controlling the transmission level.

<Signal Processing Module>

FIGS. 7A to 8C are diagrams illustrating configuration examples of the signal processing module which is an example of a module having a communication function. In addition, although not shown in the drawings, as necessary, electrical connection is established, similarly to the related art, through connectors (electric wiring lines) for signals (including the signal for power supply) which are not the targets of the transmission for the high-frequency signal in a radio wave frequency band.

Figure 7A:
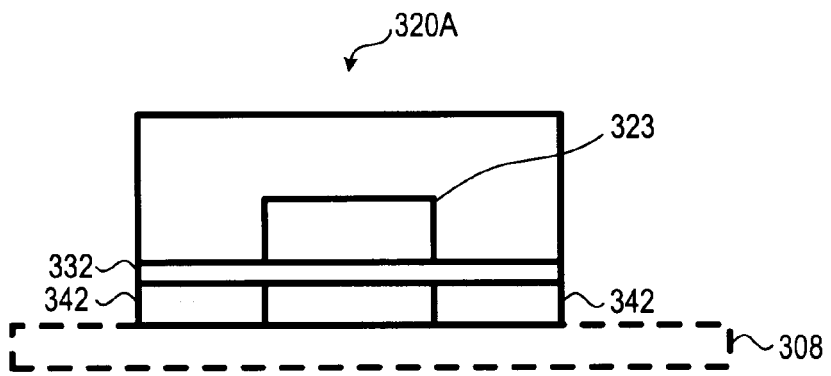
FIGS. 7A to 7D are diagrams (first) illustrating configuration examples of the signal processing module.

In a signal processing module 320A of a first example shown in FIG. 7A, a semiconductor chip 323 (corresponding to the semiconductor chip 103 or the semiconductor chip 203), which has a principal function of the corresponding signal processing module 320A, is disposed on a high-frequency signal waveguide 332. A high-frequency signal coupling structure 342 (corresponding to the transmission path coupling section 108 or the transmission path coupling section 208), which has a function of transferring (coupling) the high-frequency signals (for example, millimeter waves), is provided in the vicinity of the semiconductor chip 323 on the surface of the high-frequency signal waveguide 332 opposite to the semiconductor chip 323. The signal processing module 320A is preferably molded as a whole by using a resin or the like, but this is not indispensable. Incidentally, in the case of molding, preferably, the side (the surface side thereof, on which the high-frequency signal waveguide 308 is provided, indicated by the dashed line in the drawing) of the high-frequency signal waveguide 308 opposite to the semiconductor chip 323 is flat so as to be easily disposed on the high-frequency signal waveguide 308 of an electronic apparatus 300. More preferably, a part of the high-frequency signal coupling structure 342 is exposed such that the high-frequency signal coupling structure 342 is in contact with the high-frequency signal waveguide 308.

It is preferable that the high-frequency signal coupling structure 342 should be able to electromagnetically couple the high-frequency signal with the high-frequency signal waveguide 308 of the electronic apparatus 300. For example, the high-frequency signal coupling structure 342 may employ not only a dielectric material itself but also a transmission line itself such as a microstrip line, a strip line, a coplanar line, or a slot line, but is not limited to those.

Incidentally, when the dielectric material itself is used as the high-frequency signal coupling structure 342, a material quality the same as that of the high-frequency signal waveguide 332 is very appropriate, and if the material quality is different therefrom, a material quality with a dielectric constant the same as that of the different material quality is appropriate. Further, when the dielectric material itself is used as the high-frequency signal coupling structure 342, a material quality the same as that of the high-frequency signal waveguide 332 and that of the high-frequency signal coupling structure 342 is also very appropriate for the high-frequency signal waveguide 308, and if the material quality is different therefrom, a material quality with a dielectric constant the same as that of the different material quality is appropriate. Any case of those is determined in accordance with specifications of the dielectric material such as a quality, a width, and a thickness.

The signal processing module 320A with such a structure may be provided such that the high-frequency signal waveguide 308 is disposed to be opposed to the lower portion of the high-frequency signal coupling structure 342. In this case, the high-frequency signal from the semiconductor chip 323 can be transferred to the high-frequency signal waveguide 308 through the high-frequency signal waveguide 332 and high-frequency signal coupling structure 342. As the high-frequency signal coupling structure 342, the high-frequency transmission path such as a microstrip line or the antenna structure such as a patch antenna may not be employed, and the dielectric material itself may be used. In this case, all of the high-frequency signal waveguide 308, the high-frequency signal waveguide 332, and the high-frequency signal coupling structure 342 are connected with each other through the dielectric material. With an extremely simple configuration in which the transmission path of the high-frequency signal is formed by bring so-call plastic-like materials into contact with each other, it is possible to establish the millimeter wave communication.

Figure 7B:
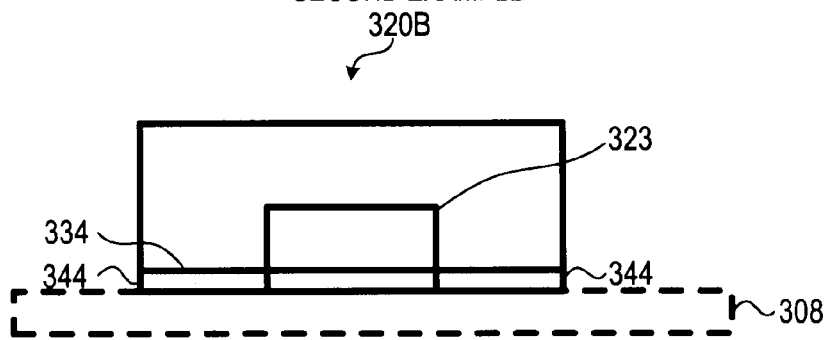

In a signal processing module 320B of a second example shown in FIG. 7B, the semiconductor chip 323, which has a principal function of the corresponding signal processing module 320B, is disposed on a high-frequency signal waveguide 334. A high-frequency signal coupling structure 344 (corresponding to the transmission path coupling section 108 or the transmission path coupling section 208), which has a function of transferring (coupling) the high-frequency signals (for example, electric signals in the millimeter wave band), is formed in the vicinity of the semiconductor chip 323 in the high-frequency signal waveguide 334. It is preferable that the high-frequency signal coupling structure 344 should be able to electromagnetically couple the high-frequency signal with the high-frequency signal waveguide 308 of the electronic apparatus 300. For example, an antenna structure is employed. As the antenna structure, a patch antenna, an inverted F antenna, a Yagi antenna, a probe antenna (such as a dipole antenna), a loop antenna, or an antenna having a small-size aperture coupling element (such as a slot antenna) and the like are employed. Among those, it is preferable to employ a structure having an antenna which can be regarded as a substantially planar antenna.

The signal processing module 320B is preferably molded as a whole by using a resin or the like, but this is not indispensable. Incidentally, in the case of molding, preferably, the side (the surface side thereof on which the high-frequency signal waveguide 308 is provided) of the high-frequency signal waveguide 308 opposite to the semiconductor chip 323 is flat so as to be easily disposed on the high-frequency signal waveguide 308 of an electronic apparatus 300. More preferably, a part of the high-frequency signal coupling structure 344 is exposed. The signal processing module 320B with such a structure may be provided such that the high-frequency signal waveguide 308 is disposed to be opposed to the lower portion of the high-frequency signal coupling structure 344. In this case, the high-frequency signal from the semiconductor chip 323 can be transferred to the high-frequency signal waveguide 308 through the high-frequency signal waveguide 334 and the high-frequency signal coupling structure 344.

Figure 7C:
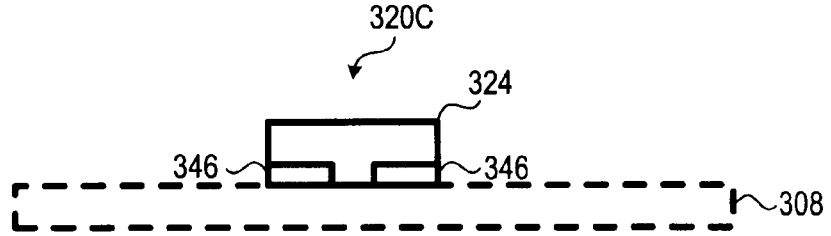

In a signal processing module 320C of a third example shown in FIG. 7C, a semiconductor chip 324 (corresponding to the semiconductor chip 103 or the semiconductor chip 203) has a principal function of the corresponding signal processing module 320C. In the semiconductor chip 324, a high-frequency signal coupling structure 346 (corresponding to the transmission path coupling section 108 or the transmission path coupling section 208), which has a function of transferring (coupling) the high-frequency signals (for example, electric signals in the millimeter wave band), such as an antenna structure is formed. In practice, the signal processing module 320C is formed by the semiconductor chip 324 itself. As the antenna structure of the high-frequency signal coupling structure 346, it is possible to provide a patch antenna, an inverted F antenna, or the like which can be regarded as a substantially planar antenna. However, the antenna structure is not limited to this, and may be a structure having a Yagi antenna, a probe antenna (such as a dipole antenna), a loop antenna, or an antenna having a small-size aperture coupling element (such as a slot antenna) and the like.

The semiconductor chip 324 is preferably molded as a whole by using a resin or the like, but this is not indispensable. Incidentally, in the case of molding, preferably, the surface side thereof, on which the high-frequency signal waveguide 308 is provided, is flat so as to be easily disposed on the high-frequency signal waveguide 308 of an electronic apparatus 300. More preferably, a part of the high-frequency signal coupling structure 346 is exposed. The signal processing module 320C with such a structure may be provided such that the high-frequency signal waveguide 308 is disposed to be opposed to the lower portion of the high-frequency signal coupling structure 346. In this case, the high-frequency signal from the semiconductor chip 324 can be transferred to the high-frequency signal waveguide 308 through the high-frequency signal coupling structure 346.

Figure 7D:
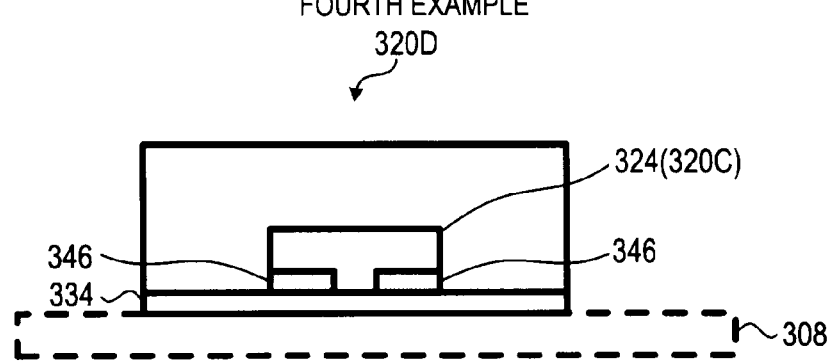

In a signal processing module 320D of a fourth example shown in FIG. 7D, the signal processing module 320C (practically, the semiconductor chip 324) of the third example shown in FIG. 7C is disposed on a high-frequency signal waveguide 334. The signal processing module 320D is preferably molded as a whole by using a resin or the like, but this is not indispensable. Incidentally, in the case of molding, preferably, a part of the high-frequency signal coupling structure 334 is exposed. The signal processing module 320D with such a structure may be provided such that the high-frequency signal waveguide 308 is disposed to be opposed to the lower portion of the high-frequency signal coupling structure 334. In this case, the high-frequency signal from the semiconductor chip 324 can be transferred to the high-frequency signal waveguide 308 through the high-frequency signal waveguide 334.

In a signal processing module 320E of a fifth example shown in FIG. 8A, a semiconductor chip 323 is disposed on a base. The high-frequency signal coupling structure 342, which has a function of transferring (coupling) the high-frequency signals (for example, millimeter waves), is provided in the vicinity of the semiconductor chip 323 on the surface of the base coplanar with the semiconductor chip 323. An arbitrary method may be used for the connection between the semiconductor chip 323 and the high-frequency signal coupling structure 342. The high-frequency signal coupling structure 342 is disposed near the side of the high-frequency signal waveguide 332 (module casing) having a rectangular shape. The signal processing module 320E is preferably molded as a whole by using a resin or the like, but this is not indispensable. Incidentally, in the case of molding, preferably, a part of the high-frequency signal coupling structure 342 is exposed such that the high-frequency signal coupling structure 342 is in direct contact with the high-frequency signal waveguide 308.

In the signal processing module 320E with such a structure, the high-frequency signal waveguide 308 may be provided to be opposed to the high-frequency signal coupling structure 342. In this case, the high-frequency signal from the semiconductor chip 323 can be transferred to the high-frequency signal waveguide 308 through the high-frequency signal coupling structure 342. As the high-frequency signal coupling structure 342, the high-frequency transmission path such as a microstrip line or the antenna structure such as a patch antenna may not be employed, and the dielectric material itself may be used. In this case, all of the high-frequency signal waveguide 308 and the high-frequency signal coupling structure 342 are connected with each other through the dielectric material. With an extremely simple configuration in which the transmission path of the high-frequency signal is formed by bring so-call plastic-like materials into contact with each other, it is possible to establish the millimeter wave communication.

In a signal processing module 320F of a sixth example shown in FIG. 8B, a semiconductor chip 324 (corresponding to the semiconductor chip 103 or the semiconductor chip 203) has a principal function of the corresponding signal processing module 320F. In the semiconductor chip 324, a high-frequency signal coupling structure 346 (corresponding to the transmission path coupling section 108 or the transmission path coupling section 208), which has a function of transferring (coupling) the high-frequency signals (for example, electric signals in the millimeter wave band), such as an antenna structure is formed. In practice, the signal processing module 320F is formed by the semiconductor chip 324 itself. The high-frequency signal coupling structure 346 is disposed near the side of the semiconductor chip 324. As the antenna structure of the high-frequency signal coupling structure 346, it is possible to provide a patch antenna, an inverted F antenna, or the like which can be regarded as a substantially planar antenna. However, the antenna structure is not limited to this, and may be a structure having a Yagi antenna, a probe antenna (such as a dipole antenna), a loop antenna, or an antenna having a small-size aperture coupling element (such as a slot antenna) and the like. The semiconductor chip 324 is preferably molded as a whole by using a resin or the like, but this is not indispensable. Incidentally, in the case of molding, preferably, the surface side thereof to be electromagnetically coupled with the high-frequency signal waveguide 308 is formed to be easily electromagnetically coupled with the high-frequency signal waveguide 308. In the signal processing module 320F with such a structure, the high-frequency signal waveguide 308 may be provided to be opposed to the high-frequency signal coupling structure 346. In this case, the high-frequency signal from the semiconductor chip 324 can be transferred to the high-frequency signal waveguide 308 through the high-frequency signal coupling structure 346.

In a signal processing module 320G of a seventh example shown in FIG. 8C, the signal processing module 320F (practically, the semiconductor chip 324) of the sixth example shown in FIG. 8B is disposed on a base. The signal processing module 320G is preferably molded as a whole by using a resin or the like, but this is not indispensable. Incidentally, in the case of molding, preferably, a part of the high-frequency signal coupling structure 346 is exposed. The signal processing module 320G with such a structure may be provided such that the high-frequency signal waveguide 308 is disposed to be opposed to the high-frequency signal coupling structure 346. In this case, the high-frequency signal from the semiconductor chip 324 can be transferred to the high-frequency signal waveguide 308 through the high-frequency signal coupling structure 346.

In addition, in any one of the fifth to seventh example respectively shown in FIGS. 8A to 8C, in the signal processing module 320, the high-frequency signal coupling structure 342 or the high-frequency signal coupling structure 346 (collectively referred to as a coupler) is disposed near the side of a rectangular member. However, those are just examples, and for example, the coupler may be disposed near an apex of the rectangle. Further, the entire shape of the signal processing module 320 is not limited to the rectangle, and may be formed in a circular shape, a triangular shape, or a hexagonal shape.

<Multiple Transmission: Basics>
[Basic Concept]

In the embodiment, the high-frequency signal waveguide and the plurality of transceivers, which are disposed to be able to be electromagnetically coupled with the high-frequency signal waveguide, constitute the signal transmission device, and the transmission paths are formed between the respective transceivers, thereby performing multiple transmission between the transceivers (performing multiplex transmission). As a basic concept, the embodiment is characterized in that, by using "the high-frequency signal waveguide without work in formation of the transmission path", "transmission system using propagation loss" is implemented. The transceiver broadly corresponds to a semiconductor package, a module, a communication device, or the like.

In recent years, in signal transmission in an electronic apparatus or between electronic apparatuses, there has been demand for a technique of treating large volumes of data or transmitting large volumes of data at a high speed (for example, on the real time basis). Here, as a method for solving problems of LVDS and a method of increasing the number of wiring lines, for example, JP-A-2005-204221 and JP-A-

2005-223411 propose methods of performing transmission by eliminating the electric wiring lines. However, in application of the wireless mode (wireless communication method) used in a general field (out of doors), there are problems to be solved in that, because of effects caused by reflection and the like of a casing and members in the casing, for example, it is difficult to appropriately perform data transmission and the countermeasure for undesired radiation to the electronic members is necessary.

Further, JP-A-2005-204221 or JP-A-2005-223411 proposes a method of performing transmission by eliminating the electric wiring lines. For example, in a technique disclosed in JP-A-2001-060130, a semiconductor (LSI) is configured to include an extremely small number of terminals by wirelessly performing data transmission, and thus the technique contributes to simplification of the whole system or a decrease in size. However, as disclosed in JP-A-2001-060130, in application of the wireless mode (wireless communication method) used in a general field (out of doors) to spatially propagates the high-frequency signals, there are problems to be solved in that, for example, because of effects caused by reflection and the like of a casing and members in the casing, it is difficult to appropriately perform data transmission and the countermeasure for undesired radiation to the electronic members is necessary. Even in the case of performing multiplex transmission, such problems cause a trouble in suppressing interference between the high-frequency signals by effectively separating the transmission paths.

In the technique disclosed in JP-A-11–111890, a via-hole conductor group is arranged on a double-sided conductor board in a certain direction, thereby forming a dielectric waveguide. By providing the waveguide as a high-frequency wiring board such as a semiconductor package using high-frequency signals of microwaves, millimeter waves, and the like, it can be applied to various product specifications so as to reduce product costs. However, in the technique of the above-mentioned publication, in order to form the high-frequency signal waveguide, a special structure like the via-hole conductor group is necessary, and thus there is a difficulty in manufacturing it, and this causes a problem of high costs. Further, the above-mentioned publication does not describe that, since the waveguide is mainly used to connect circuit components, it forms transmission paths between a plurality of transceivers so as to thereby perform multiple transmission. If multiple transmission is performed by adopting the technique of the above-mentioned publication, the structure thereof becomes more complicated, and thus the above-mentioned problems deteriorate.

In the light of the technique disclosed in JP-A-2005-204221 or JP-A-2005-223411, it is preferable to provide a technique capable of implementing high-speed or high-capacity signal transmission with a simple configuration while suppressing effects caused by members and effects on the members. Further, in the light of the technique disclosed in JP-A-2005-204221 or JP-A-2005-223411, it is preferable to adopt a configuration that is capable of avoiding frequency interference and performing multiple transmission at high speed without a special structure when the plurality of transmission paths are formed in the high-frequency signal waveguide. That is, it is preferable to adopt a technique capable of implementing high-speed or high-capacity signal transmission with a simple configuration while suppressing effects caused by members and effects on the members. In addition, it is more preferable to a technique capable of implementing high-speed or high-capacity multiplex transmission with a simple configuration while suppressing effects caused by members and effects on the members.

Accordingly, in one aspect of the embodiment, signal separation is performed by using directivity or polarized waves. For example, the transceiver includes a data transceiver, a high-frequency signal conversion section, and a high-frequency signal input/output section. The high-frequency signal input/output section is formed to correspond to the transmission path. As the high-frequency signal waveguide, for example, a dielectric transmission path made of a dielectric material is employed. The dielectric transmission path is, for example, a plastic plate, and is characterized in that it does not have a special structure for separating the transmission path. The plurality of transceivers are disposed on the high-frequency signal waveguide (for example, the dielectric transmission path), and the high-frequency signal (for example millimeter wave signal) is coupled with the high-frequency signal waveguide through the high-frequency signal input/output section. The plurality of transceivers are disposed on the high-frequency signal waveguide, and the plurality of transmission paths are formed, thereby transmitting and receiving data between the transceivers. At this time, the transmission path is formed between the transceivers in the following manner. That is, first, the transceivers are arranged to be able to perform transmission between the transceivers. For example, basically, because of propagation loss in the transmission path, it is necessary to charge the transceiver with the transmission power or the reception power, and it is necessary to obtain a transmission band corresponding to a desired data transmission rate.

Here, only by arranging the transceivers, it is difficult to obtain favorable transmission characteristics (propagation loss, transmission band). Hence, by contriving a configuration using the antenna directivity of the high-frequency signal input/output section and the like, the arrangement is made to obtain the desired transmission band. For example, the separation is made by using the directivity or the polarized waves of the antenna constituting the high-frequency signal input/output section. The separation may be made by using an antenna (for example, a dipole antenna or a Yagi antenna) having directivity of the horizontal direction with respect to the transceiver as the high-frequency signal input/output section. In this case, the high-frequency signal is transmitted between the transceivers horizontally with respect to the high-frequency signal waveguide. Alternatively, separation may be made by using an antenna (for example, a dipole antenna or a Yagi antenna) having directivity of the vertical direction with respect to the transceiver as the high-frequency signal input/output section. In this case, the high-frequency signal is transmitted between the transceivers vertically with respect to the high-frequency signal waveguide. Further, the separation may be made by combining use of the horizontal direction and the vertical direction.

Furthermore, the signal separation may be made by using the polarized waves. For example, by using linearly polarized waves and circularly polarized waves, it is possible to perform the signal separation. In addition, also in a case of employing linearly polarized waves, by using horizontally polarized waves and vertically polarized waves, it is possible to perform the signal separation. Further, also in a case of employing circularly polarized waves, by using right-hand polarized waves and left-hand polarized waves, it is possible to perform the signal separation. In any of the cases, the signal separation can be made, and thus it is possible to perform multiplex transmission.

Incidentally, in the circularly polarized waves, assuming that the traveling direction thereof is the Z axis, the amplitude of electric field in the X axis direction and the amplitude of electric field in the Y axis direction are phase-shifted from each other by ¼λ (90 degrees). The circularly polarized wave is classified into the right-hand polarized wave and the left-hand polarized wave, depending on whether the phase of the amplitude of electric field in the X axis relative to the amplitude of electric field in the Y axis direction is fast or slow. The right-hand polarized wave and the left-hand polarized wave are used as a pair on the transmission side and the reception side. That is, in a case of using the circularly polarized wave probe for transmitting the right-hand polarized wave to the transmission side, the circularly polarized wave probe for receiving the right-hand polarized wave is used on the reception side. In a case of using the circularly polarized wave probe for transmitting the left-hand polarized wave to the transmission side, the circularly polarized wave probe for receiving the left-hand polarized wave is used on the reception side.

In a case of using two polarized waves of the right-hand circularly polarized wave and the left-hand circularly polarized wave orthogonal to each other (referred to as orthogonally polarized waves), it is possible to perform unidirectional communication of two systems or bidirectional communication without using frequency-division multiplexing and the other multiplexing methods. In addition, sharing of two polarized waves, which transmits (or receives) the right-hand polarized wave and transmits (or receives) the left-hand polarized wave, is possible. By using orthogonally polarized waves (right-hand circularly polarized wave and left-hand circularly polarized wave), even when not using frequency-division multiplexing and the other multiplexing methods, it is possible to transmit a double amount of information while using a same carrier frequency.

Further, in another aspect of the embodiment, through a prescribed transmission system, high-throughput multiple transmission is implemented, and at this time, information (second information) other than the transmission target information is superposed upon a transmission power. By performing transmission with various kinds of transmission powers for which transmitters are prescribed, information other than transmission contents is transferred to the receiver. Thus, the embodiment is characterized in that "information is carried (implicit in) by the transmission power". As for operation, when the high-frequency signal waveguide is disposed, passage characteristics (particularly, propagation loss, a pass band, and the like) of the transmission path are known in advance. Examples of the "information other than transmission contents", which is superposed upon the transmission power, includes various kinds of information such as destination information and frame information. The frame information corresponds to a frame type, an application type, frame length information, and the like.

For example, by setting a reception power setting value for each receiver and adjusting the transmission power so as to make it correspond to the reception power setting value, a function of transmitting the high-frequency signal is set up. By setting a reception power for each receiver, the transmission side performs transmission power control such that the receiver receives the high-frequency signal at the set reception power. In the description, the term "for each receiver" is not limited to the meaning of use of the "respectively individual reception power setting values", but a common reception power setting value may be used in "all" or "some" receivers. When the received high-frequency signal corresponds to a reception power setting value which is set for the receiver itself, the receiver determines that the received high-frequency signal is addressed to the corresponding receiver itself, and thereby performs the reception processing (specifically, demodulation processing). Otherwise, the receiver determines that the signal is addressed to another receiver, and thereby does not perform the reception processing (specifically, demodulation processing). If it is determined that the signal is addressed to another receiver, it is preferable that the receiver should be in a low power consumption state such as a sleep mode.

More preferably, (for example, when the transmission path is not separated by directivity, polarized waves, or the like), by time-division multiplexing, transmission and reception slots are allocated to the plurality of transceivers. As for the high-frequency signal which is transmitted at a transmission slot, it is determined that the high-frequency signal with own reception power setting value is addressed to the corresponding receiver itself, and the signal is received. By time-division multiplexing the data transmission timing of the plurality of transceivers, even then the transmission path is not separated, it is possible to remove the effect of interference.

At specific timing, each receiver makes an attempt to perform reception processing (specifically, demodulation processing) regardless of the reception power. For example, it is preferable that the attempt should be made at the time of starting the transmission/reception processing, the time of restart after stop, and the like. When a transmitter of any side transmits a high-frequency signal, it is determined that the timing is not own transmission timing, and own transmission timing is specified on the basis of the transmission timing of the transmitter and a prescribed transmission order. When a transmitter of any side does not transmit a high-frequency signal, the transmission processing is started first by itself (as a master). At this time, it is preferable that the entire processing should be synchronously performed in a way that, for example, the self-specifying information is carried by the high-frequency signal, or the synchronizing signal for defining the reference timing of the transmission order of the whole system is carried by the high-frequency signal.

When one-to-many transmission is intended to be performed, by allocating a transmission slot only for the transmission, and an attempt for reception may be made. In such a manner, high-speed multiple transmission can be performed between the transceivers through the high-frequency signal waveguide. In addition, by applying frequency-division multiplexing, multiple transmission may be performed. That is, the division is made by using the carrier frequency. For example, the used carrier frequencies are 40, 60, 80, 100, 120 gigahertz, and the like.

[Node Arrangement]

FIGS. 9A to 11 are diagrams illustrating basic concepts of examples of node arrangement. All examples are examples of arrangement of four nodes. At each node, for example, a millimeter wave transceiver using any one of the signal processing modules 320A to 320D is disposed. The high-frequency signal waveguide 308 is disposed to be able to be electromagnetically coupled with the high-frequency signal coupling structure 342 or the like of each node. For example, the circuit board itself, on which the signal processing modules 320 are mounted, may be used as the high-frequency signal waveguide 308. In addition, by using the high-frequency signal waveguide 308 separately from the circuit board, electromagnetic coupling with the high-frequency signal coupling structure 342 or the like of each node may be made.

Figure 9A:
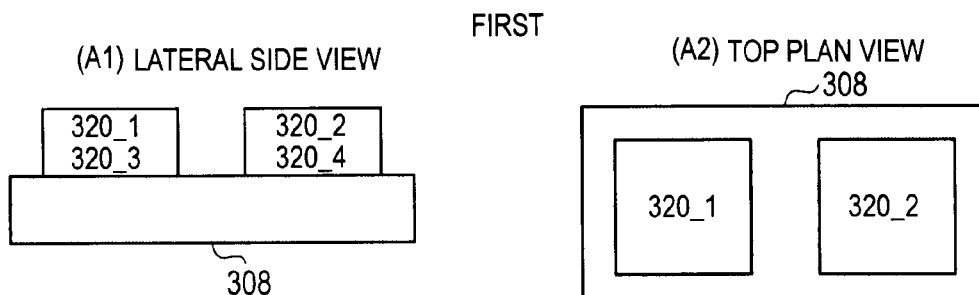
FIGS. 9A to 9C are diagrams (first example) illustrating a basic concept of an example of node arrangement.

For example, in the first example (1) shown in FIG. 9A, for example, the transceivers using any one of the signal processing modules 320A to 320D are arranged on the surface of the plate-like high-frequency signal waveguide 308 (for example, the dielectric transmission path 9A). For example, the case of using the signal processing module 320C of the third example or using the signal processing module 320D of the fourth example is an example which can be applied as an LSI arrangement on the board. In this case, pattern wiring is used for power supply (including a GND pattern) or low-speed and low-capacity signals which are not the targets of the millimeter wave transmission. However, the pattern wiring is not used for high-speed and high-capacity signals serving as targets of the millimeter wave transmission. Further, the circuit board constituting the high-frequency signal waveguide 308 does not have a structure for the millimeter wave transmission. Although not indispensable, group division and the like may be performed by using polarized waves or directivity and loss of the high-frequency signal waveguide 308.

Figure 9B:
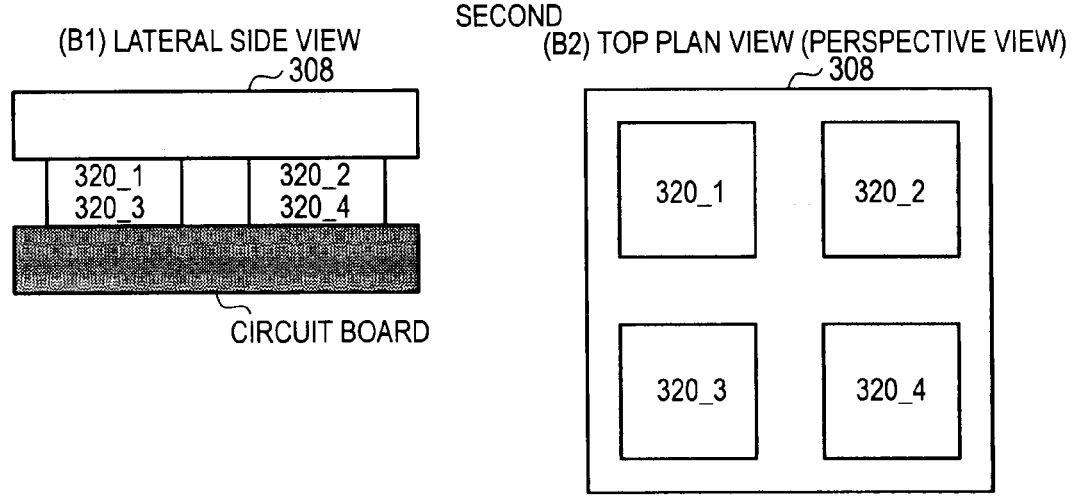

The first example (2) shown in FIG. 9B is an example in which the high-frequency signal waveguide 308 separate from the circuit board is used, where the high-frequency signal waveguide 308 is provided to connect the high-frequency signal coupling structures 342 or the like of the respective signal processing modules 320 mounted on the circuit board.

Figure 9C:
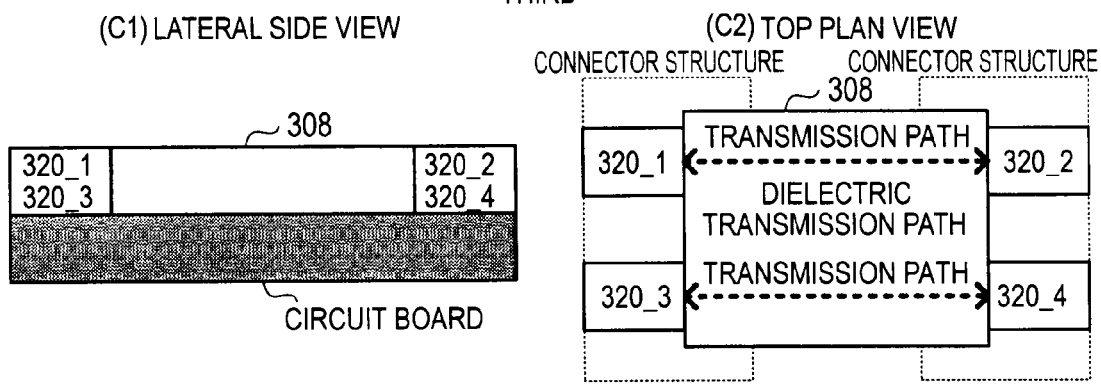

The first example (3) shown in FIG. 9C is an example in which the signal processing modules 320 are disposed on the side surface of the plate-like high-frequency signal waveguide 308 and are arranged in parallel. This configuration is very appropriate for application of a connector which interconnects the boards.

The second example shown in FIGS. 10A and 10B is, as shown in FIG. 10A, an example in which the high-frequency signal is circumferentially transmitted by using the annular high-frequency signal waveguide 308 (waveguide). Since there is no terminal in the high-frequency signal waveguide 308 functioning as a waveguide, the high-frequency signal is transmitted on the circular circumference in a stabilized mode (for example TE). As shown in FIG. 10B, a probe is vertically inserted from the millimeter wave transceiver so as to make waveguide coupling. A gap is provided such that each transceiver has no effect on the transmission characteristics of the high-frequency signal waveguide 308. The second example is a configuration very appropriate to implement a common bus using a prescribed transmission system (time division, arbitration).

The third example shown in FIG. 11 is a configuration in which the transceivers are disposed on the surface or the side surface of the fan-shaped high-frequency signal waveguide 308. The third example is a configuration by which it is possible to keep the transmission distance constant for one-to-many multiple transmission.

<Multiple Transmission: Separation Using Directivity and Polarized Waves>

Figure 12A:
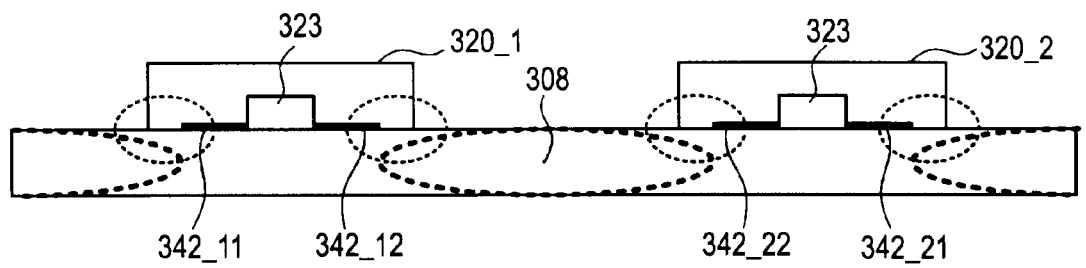
FIGS. 12A and 12B are diagrams (first example) illustrating multiple transmission using directivity.

FIGS. 12A to 18C are diagrams illustrating multiple transmission using directivity, and specifically, diagrams illustrating relationships between directivity of the high-frequency signal coupling structure, electromagnetic coupling with the high-frequency signal waveguide, and transmission direction of the high-frequency signal. Here, FIGS. 12A and 12B are diagrams focusing on the directivity in the horizontal direction on the same plane of the high-frequency signal waveguide. FIGS. 13A and 13B are diagrams focusing on the directivity in the vertical direction on the same plane of the high-frequency signal waveguide. FIGS. 14A to 14C are diagrams focusing on the directivity in the vertical direction on both sides of the high-frequency signal waveguide. FIGS. 15A to 15C are diagrams focusing on the directivity in the horizontal direction on the same plane of the high-frequency signal waveguide and directivity in the vertical direction on both surfaces thereof. FIGS. 16A and 16B are diagrams separation using linearly polarized waves. FIGS. 17A to 17C are diagrams illustrating separation using circularly polarized waves. FIGS. 18A to 18C are diagrams illustrating separation using linearly polarized waves and circularly polarized waves.

[In Same Plane: Horizontal Direction]

Figure 12B:
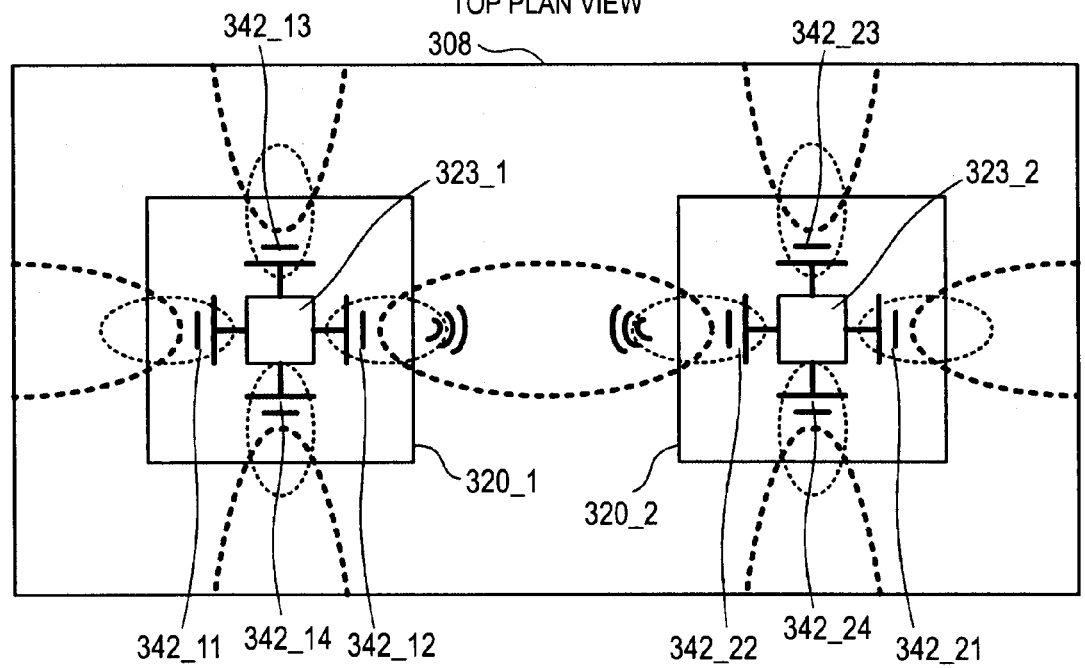

For example, FIGS. 12A and 12B show a case of the directivity in the horizontal direction focusing on the same plane of the high-frequency signal waveguide. The drawings show a configuration in which the transceivers are separated by using antennas (such as rod antennas, dipole antennas, or Yagi antennas) with the directivity in the horizontal direction. In this case, dipole antennas or Yagi antennas are disposed on the plate-like high-frequency signal waveguide 332. For example, the dipole antennas or the Yagi antennas are formed (for example, by a board pattern) on the bottom faces of the transceivers, and are disposed on the plate-like high-frequency signal waveguide 308. The directivity of the corresponding antenna is toward the lengthwise direction of the high-frequency signal waveguide 332, and the radiated high-frequency signal is coupled with the high-frequency signal waveguide 308 in the horizontal direction, and is transferred into the high-frequency signal waveguide 308. The electric power of the high-frequency signal transferred in the horizontal direction in the high-frequency signal waveguide 308 is strong in the traveling direction, and decreases as the distance from the traveling direction increases. Further, as the distance from the transmission path increases, attenuation of the high-frequency signal caused by dielectric loss increases. Accordingly, by using the directivity and the attenuation, it is possible to separate the transmission path into a plurality of paths in the same high-frequency signal waveguide 308. For example, as shown in the drawing, by disposing an antenna in a direction of 90 degrees, it is possible to form transmission paths in four directions.

[In Same Plane: Vertical Direction]

Figure 13A:
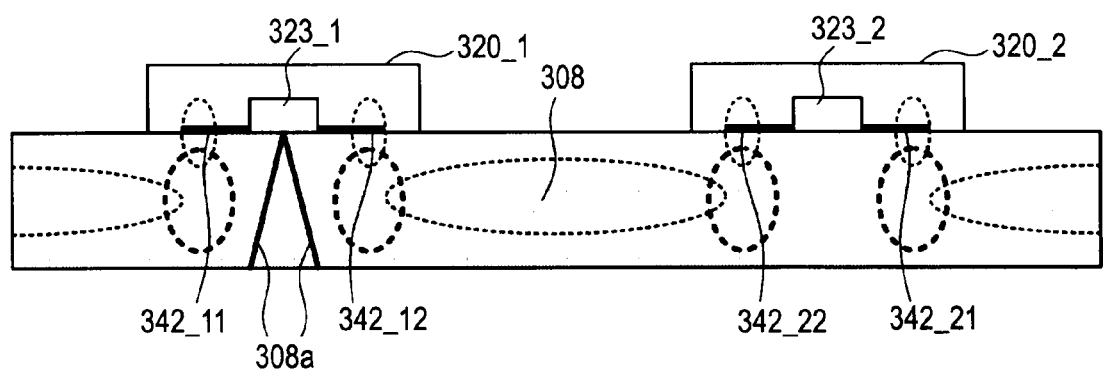
FIGS. 13A and 13B are diagrams (second example) illustrating multiple transmission using directivity.
Figure 13B:
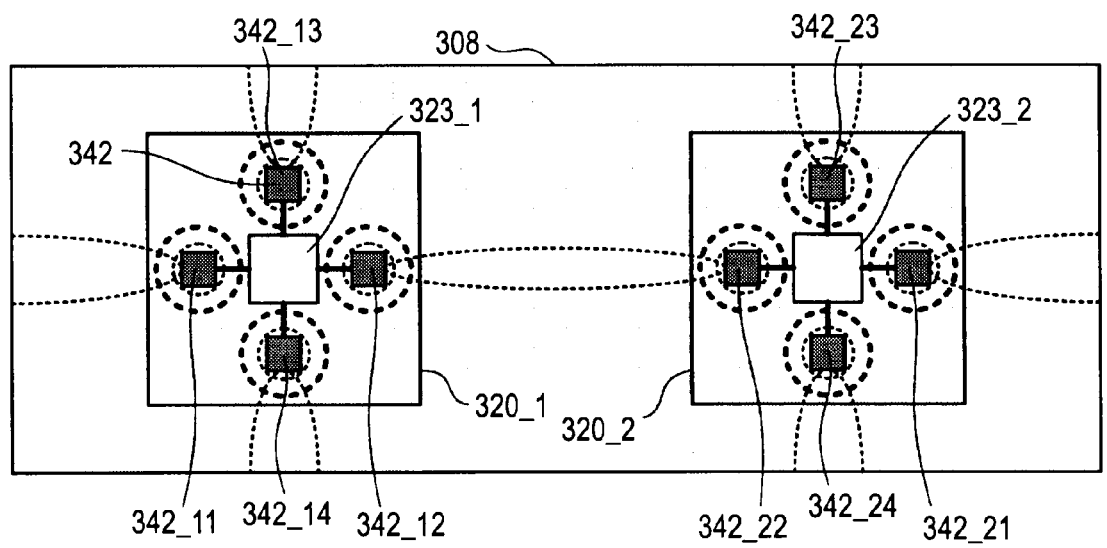

On the other hand, in terms of obtaining electromagnetic coupling of the high-frequency signal between the signal processing module 320 and the high-frequency signal waveguide 308, it can be said that it is preferable to make coupling by using the antennas with the directivity in the vertical direction. FIGS. 13A and 13B show a case of the directivity in the vertical direction focusing on the same plane of the high-frequency signal waveguide. In this case, for example, patch antennas as the high-frequency signal coupling structures 342 or the like are disposed on the plate-like high-frequency signal waveguide 332 (refer to FIG. 7A). The directivity of each patch antenna is toward the vertical direction of the high-frequency signal waveguide 308, and the radiated high-frequency signal is coupled with the high-frequency signal waveguide 308 in the vertical direction (the thickness direction), its direction is changed into the horizontal direction, and the signal is transferred into the high-frequency signal waveguide 308. When the direction is change into the horizontal direction, it is preferable that a member (a direction regulating member 308a), which regulates the direction, should be provided on the high-frequency signal waveguide 308. Comparing with the directivity in the horizontal direction, a degree of the electromagnetic coupling with the high-frequency signal waveguide 308 is superior, but efficiency of transmitting the high-frequency signal in the horizontal direction in the high-frequency signal waveguide 308 is inferior.

[Both Sides of High-Frequency Signal Waveguide: Vertical Direction]

Figure 14A:
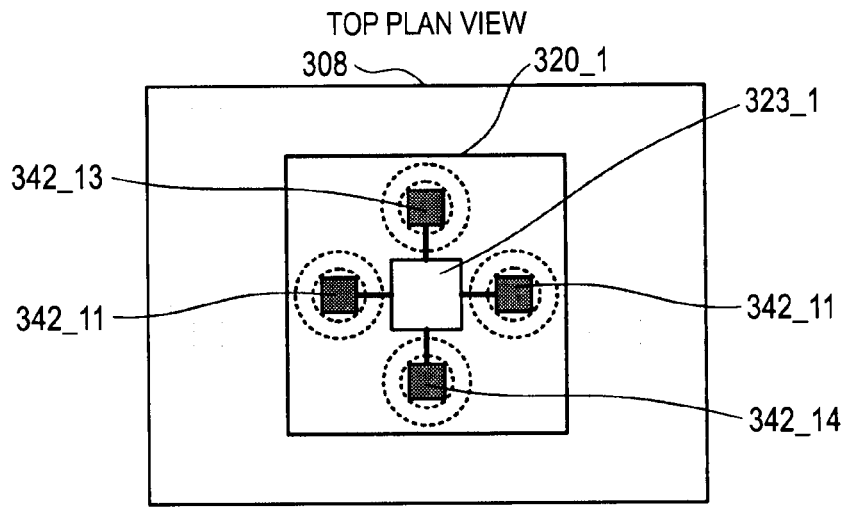
FIGS. 14A to 14C are diagrams (third example) illustrating multiple transmission using directivity.
Figure 14B:
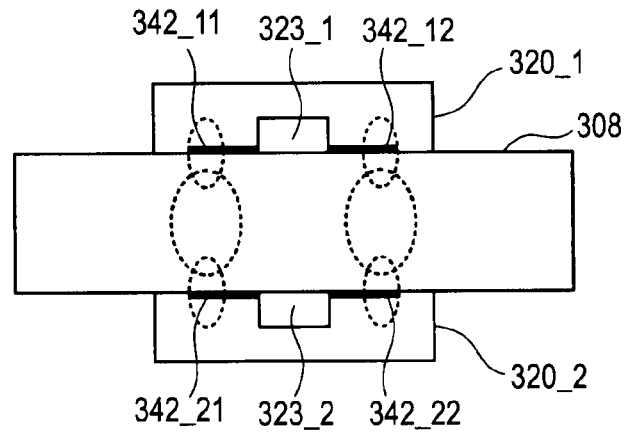
Figure 14C:
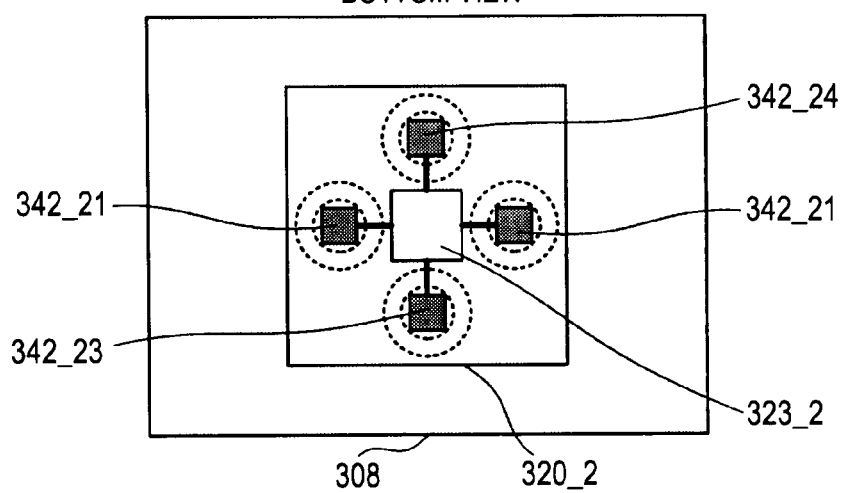

When using the directivity in the vertical direction, coupling of the high-frequency signal on both sides of the high-frequency signal waveguide is appropriately made. For example, FIGS. 14A to 14C show a case of the directivity in the vertical direction focusing on both sides of the high-frequency signal waveguide. The drawings show a configuration in which the transceivers are separated by using antennas (such as patch antennas and slot antennas) with the directivity in the vertical direction. In this case, for example, the patch antennas as the high-frequency signal coupling structures 342 or the like are formed (for example, by a board pattern) on the bottom face of the plate-like high-frequency signal waveguide 332 (refer to FIG. 7A), and are disposed on the plate-like high-frequency signal waveguide 308. The directivity of each patch antenna is toward the vertical direction of the high-frequency signal waveguide 308, and the radiated high-frequency signal is coupled with the high-frequency signal waveguide 308 in the vertical direction (the thickness direction), and is transferred into the high-frequency signal waveguide 308 in the vertical direction (the thickness direction). Similarly to the case of the horizontal direction, by using the directivity and the attenuation (depending on the directivity in a case where the thickness thereof is small), it is possible to separate the transmission path into a plurality of paths in the same high-frequency signal waveguide 308.

[Combination of Horizontal and Vertical Directions]

Figure 15A:
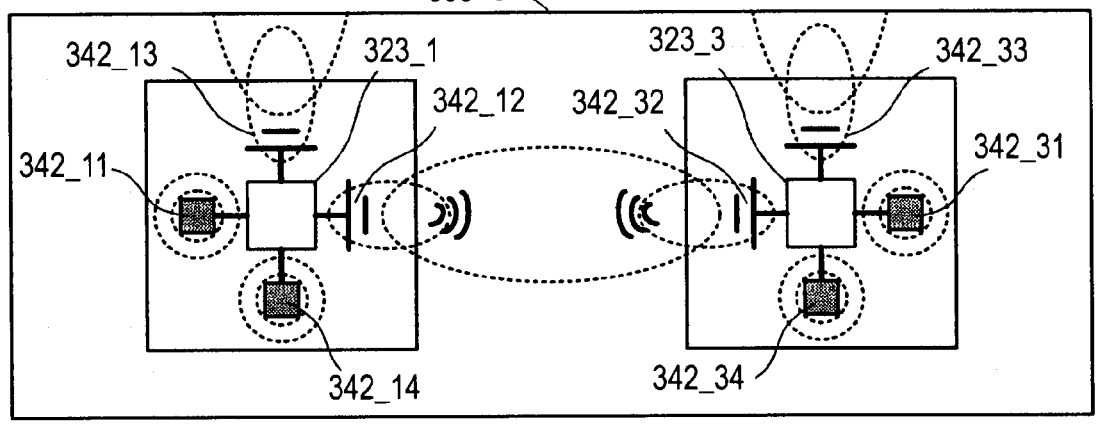
FIGS. 15A to 15C are diagrams (fourth example) illustrating multiple transmission using directivity.
Figure 15B:
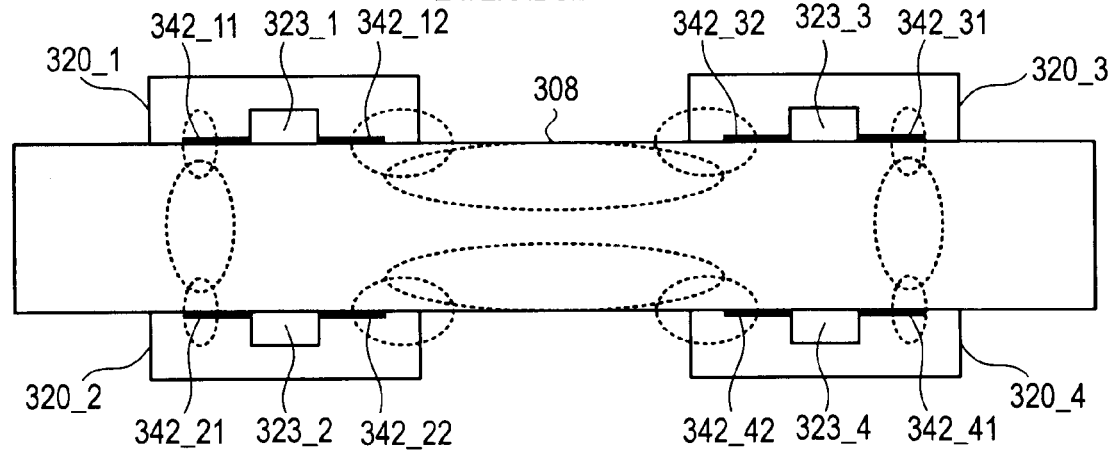
Figure 15C:
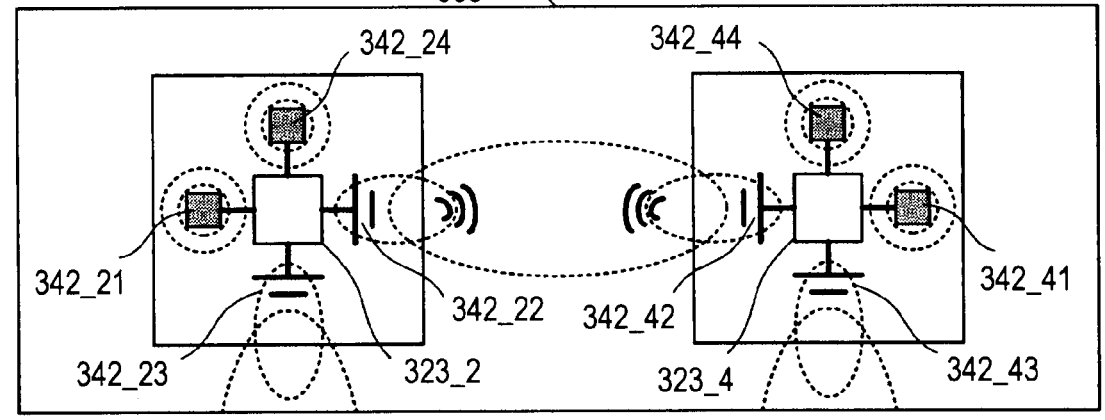

Further, as shown in FIGS. 15A to 15C, the directivity in the horizontal direction and the directivity in the vertical direction can be used in combination. The drawings show a configuration in which the transceivers are separated by using antennas with the directivity in the horizontal direction and using antennas with the directivity in the vertical direction. As for the horizontal direction, dipole antennas or Yagi antennas are formed (for example, by a board pattern) on the bottom faces of the transceivers, and are disposed on the plate-like high-frequency signal waveguide 308. As for the vertical direction, for example, the patch antennas are formed (for example, by a board pattern) on the bottom face of the plate-like high-frequency signal waveguide 332, and are disposed on the plate-like high-frequency signal waveguide 308. In such a manner, the transmission paths in the horizontal direction and the transmission paths in the vertical direction can be formed by using the single high-frequency signal waveguide 308.

[Polarized Waves: Linearly Polarized Waves (Horizontally Polarized Wave and Vertically Polarized Wave)]

Figure 16A:
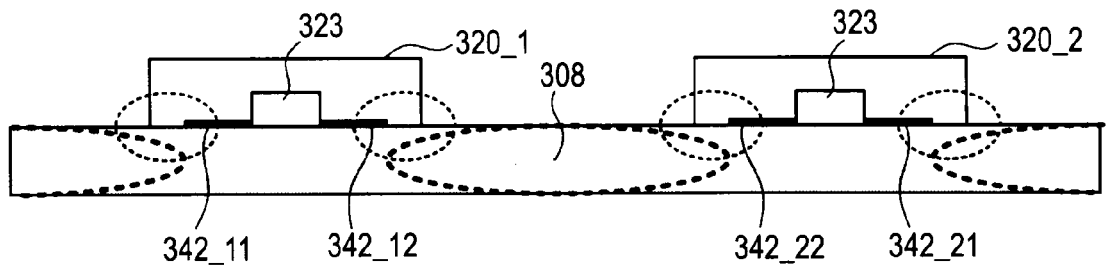
FIGS. 16A and 16B are diagrams illustrating separation using linearly polarized waves.
Figure 16B:
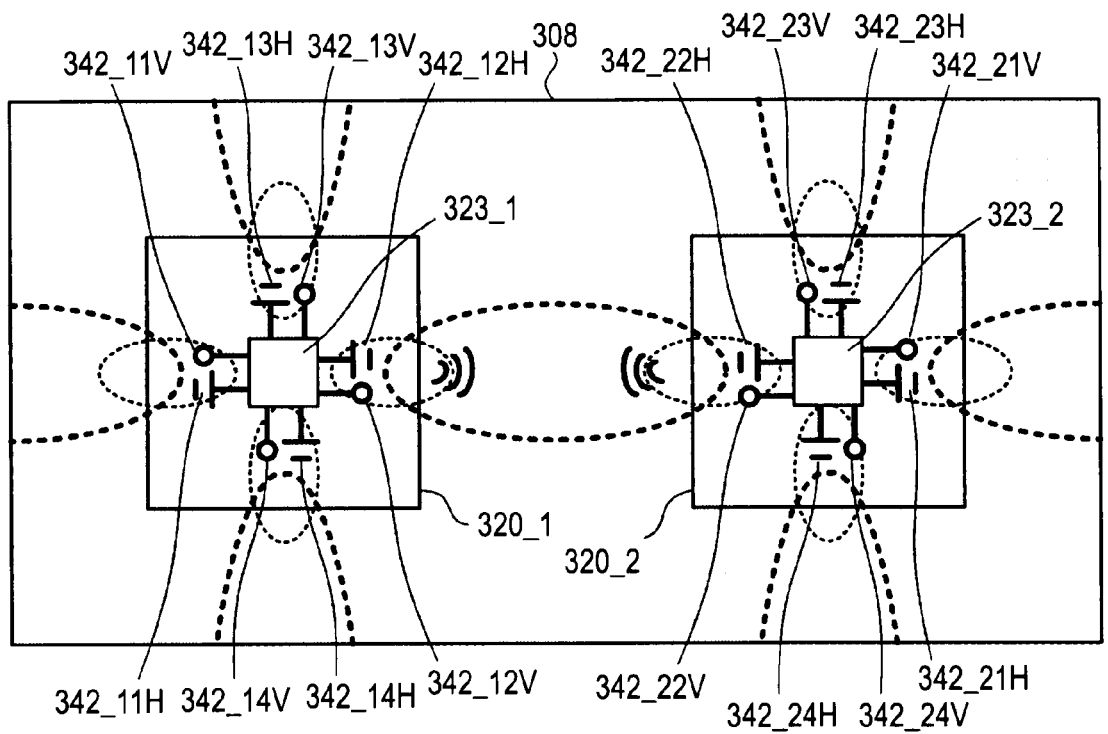

FIGS. 16A and 16B are diagrams illustrating multiple transmission using the linearly polarized waves. Here, the drawings show modified examples of FIGS. 12A and 12B, and the configuration thereof can be also applied to the examples of FIGS. 13A to 15C. In the examples of FIGS. 12A to 15C, the description thereof was given under a premise that the polarized waves are untouched, that is, the polarized waves are all the same. However, for example, even by using the linearly polarized waves, it is possible to perform the signal separation. By using the signal separation using the polarized waves in combination with the signal separation using the directivity, it is possible to separates the transmission path into a plurality of paths in the same high-frequency signal waveguide 308. For example, in the drawing, the tail of the reference sign "H" of the high-frequency signal coupling structure 342 represents the horizontally polarized wave, and the tail "V" represents the vertically polarized wave. In such a manner, for each transmission path which is formed by using directivity, it is possible to transmit further two types of high-frequency signals.

[Polarized Waves: Circularly Polarized Waves (Right-Hand Polarized Wave and Left-Hand Polarized Wave)]

Figure 17A:
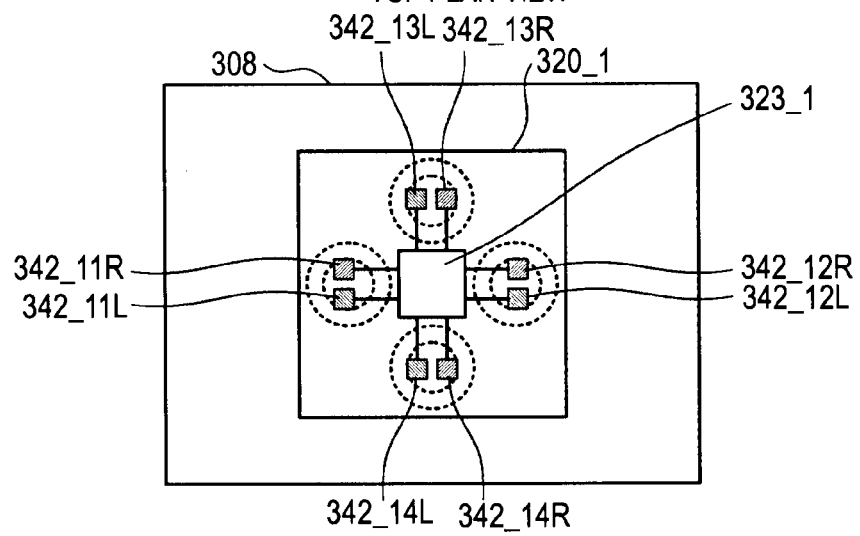
FIGS. 17A to 17C are diagrams illustrating separation using circularly polarized waves.
Figure 17B:
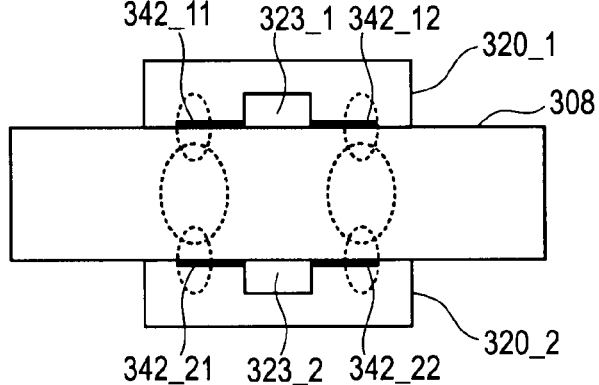
Figure 17C:
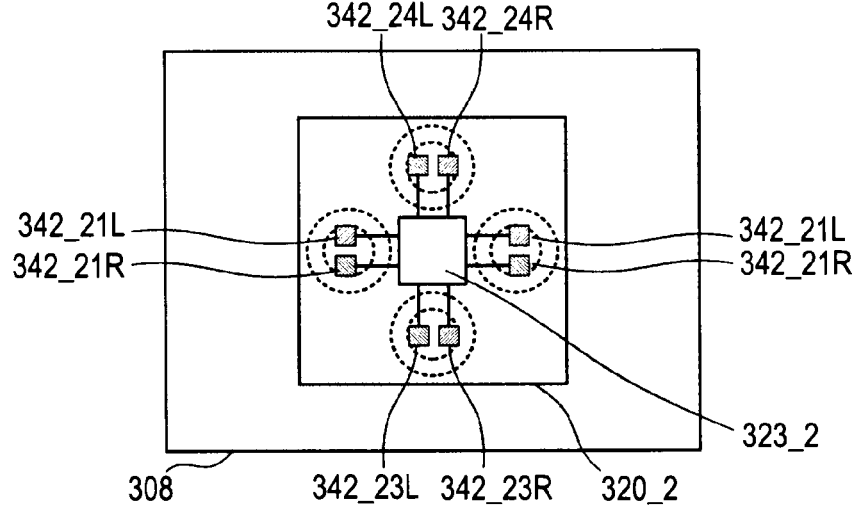

FIGS. 17A to 17C are diagrams illustrating multiple transmission using the circularly polarized waves. Here, the drawings show modified examples of FIGS. 14A to 14C, and the configuration thereof can be also applied to the examples of FIGS. 12A to 13B and 15A to 15C. In the examples of FIGS. 12A to 15C, the description thereof was given under a premise that the polarized waves are untouched, that is, the polarized waves are all the same. However, for example, even by using the circularly polarized waves, it is possible to perform the signal separation. By using the signal separation using the polarized waves in combination with the signal separation using the directivity, it is possible to separates the transmission path into a plurality of paths in the same high-frequency signal waveguide 308. For example, in the drawing, the tail of the reference sign "L" of the high-frequency signal coupling structure 342 represents the left-hand polarized wave, and the tail "R" represents the right-hand polarized wave. In such a manner, for each transmission path which is formed by using directivity, it is possible to transmit further two types of high-frequency signals.

<Polarized Waves: Linearly Polarized Wave+Circularly Polarized Wave>

FIGS. 18A to 18C are diagrams illustrating multiple transmission using the linearly polarized wave and the circularly polarized waves. Here, the drawings show modified examples of FIGS. 12A and 12B, and the configuration thereof can be also applied to the examples of FIGS. 13A to 15C. By combining the linearly polarized waves shown in FIGS. 16A and 16B and the circularly polarized waves shown in FIGS. 17A to 17C, more many types of the high-frequency signals can be transmitted. For example, by combining any one (the horizontally polarized wave in the drawing) of the horizontally polarized wave and the vertically polarized wave and any one (the right-hand polarized wave in the drawing) of the right-hand polarized wave and the left-hand polarized wave, for each transmission path which is formed by using directivity, it is possible to transmit two types of high-frequency signals. Although not shown in the drawing, by combining the horizontally polarized wave and the vertically polarized wave and the right-hand polarized wave and the left-hand polarized wave, for each transmission path which is formed by using directivity, it is possible to transmit further four types of high-frequency signals.

<Multiple Transmission: Information Superposition on Transmission Power>

[Principle of Information Superposition Using Electric Power Strength]

Figure 19A:
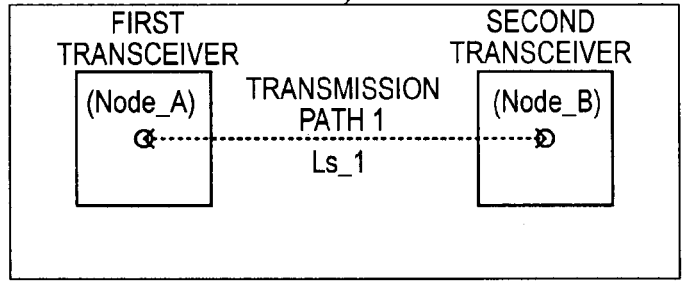
FIGS. 19A to 19C are diagrams illustrating a principle of information superposition using an electric power strength.
Figure 19B:
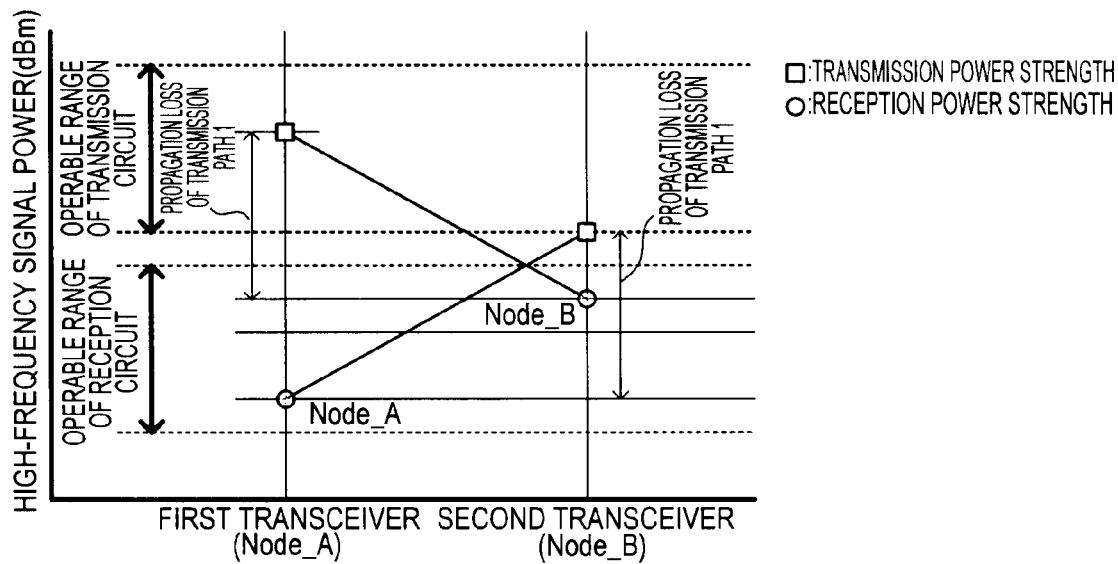
Figure 19C:
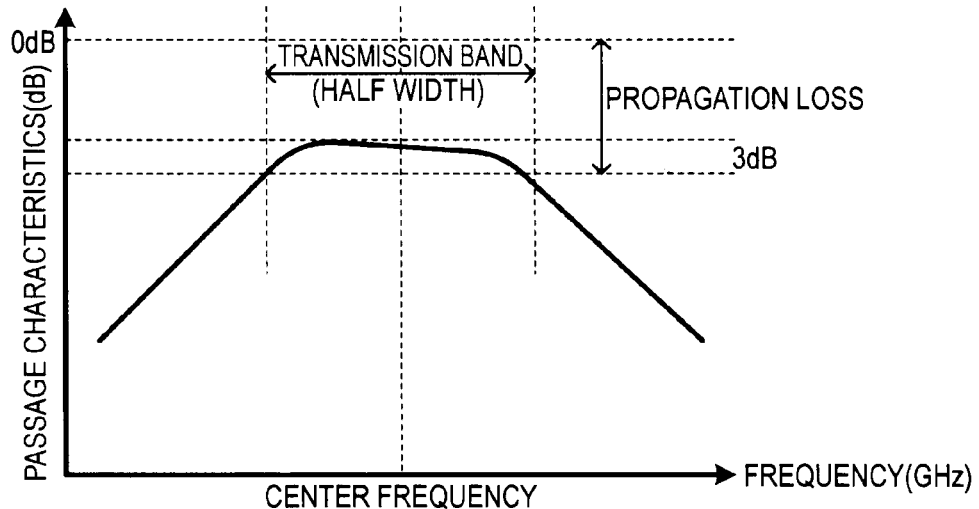

FIGS. 19A to 19C are diagrams illustrating a principle of information superposition using an electric power strength. From the drawings, a relationship between node arrangement and propagation loss in two-point transmission is understood.

As shown in FIG. 19A, the high-frequency signal waveguide 308 is present between two communication devices (Node_A and Node_B). For example, the two communication devices (Node_A and Node_B) are disposed on the surface of the plate-like high-frequency signal waveguide 308, and thus the high-frequency signal can be transmitted through the high-frequency signal waveguide 308. Contrary to the general wireless transmission greatly affected by fading and the like, the high-frequency signal waveguide 308 is characterized in that the transmission path can be estimated as a "fixed loss", and this feature is used. That is, it can be said that the system is "a transmission system using propagation loss which can be defined". The loss (propagation loss), which is caused by the high-frequency signal waveguide 308 in the signal transmission (transmission path 1) between the two communication devices (Node_A and Node_B), is represented by Ls_1.

The transmission power of the transmitter and the propagation loss Ls_1 of the transmission path defines the reception power of the receiver. In order to perform transmission such that the reception level is an operable range of the reception circuit, as shown in FIG. 19B, as for the propagation loss Ls_1, it is necessary for the transmission power and the reception power to satisfy a feature of a transceiving circuit. When the high-frequency signal radiated from the transmitter is received by the receiver, the signal is attenuated by an amount of the propagation loss Ls_1. Further, as shown in FIG. 19C, it is necessary to obtain the transmission band corresponding to the desired data transmission rate. For example, the transmission band is defined by a half width. The propagation loss Ls_1 is defined to range from a planar portion in the passage characteristics to a portion of the transmission band (half width) which is lowered by 3 decibels therefrom. On the basis of this, the transmitter estimates the amount of the propagation loss Ls_1 such that the reception power strength (reception level) is in an operable range of the receiver, and sets the transmission power strength (transmission level). By sharing use of the transmission power value in the operable range, the information different from the transmission data is superposed upon the transmission power, that is, the second information different from the transmission target signal is represented by the strength of the high-frequency signal, and is transmitted.

<Multiple Transmission: Specific Application Example>

Hereinafter, focusing on the case of applying the information superposition on the transmission power, a description will be given of a specific application example of the multiple transmission of the embodiment. In addition, in the following description, in order to facilitate understanding, an example of the millimeter wave transmission (simply referred to as "three-point transmission") between three nodes (transceiver: Node_A, Node_B, and Node_C) will be given. In each communication device, the propagation loss of the transmission path relative to the other transmission party is given.

[Three-Point Transmission]

Figure 20A:
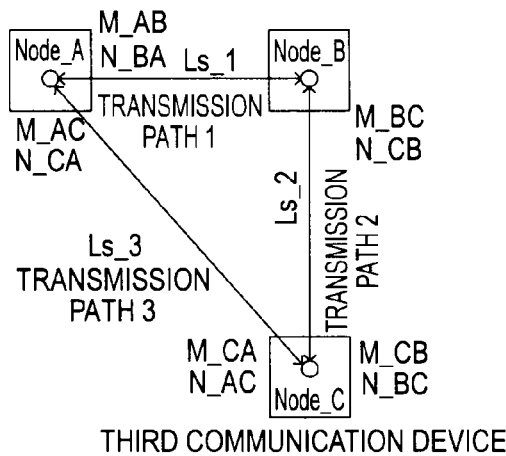
FIGS. 20A and 20B are diagrams illustrating a relationship between node arrangement and propagation loss in three-point transmission.
Figure 20B:
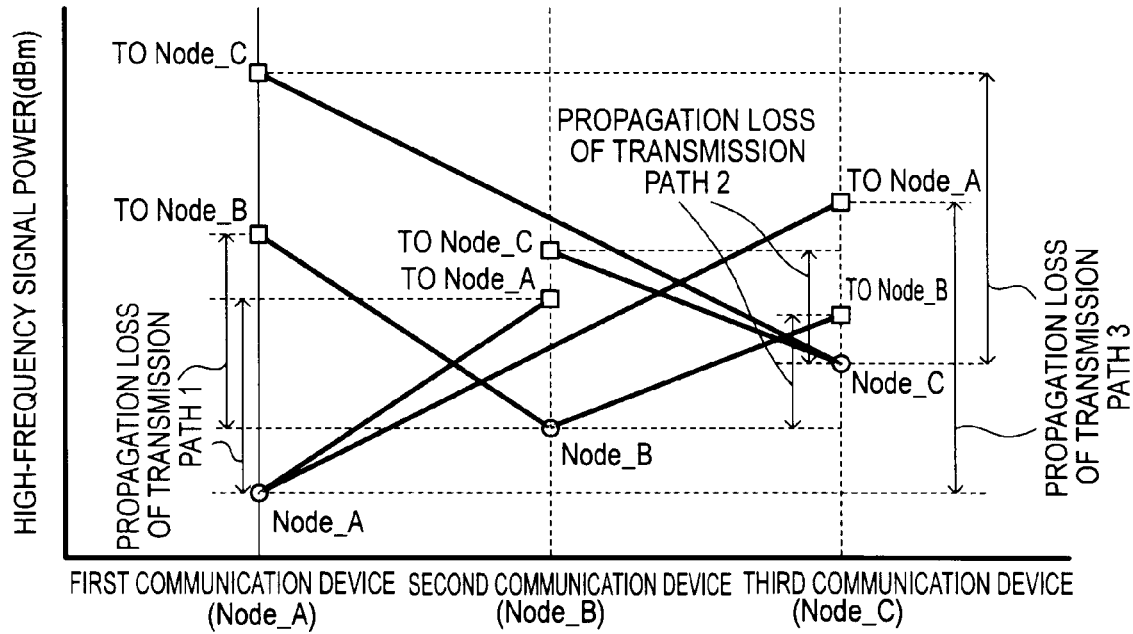

FIGS. 20A and 20B are diagrams illustrating a relationship between the node arrangement and the propagation loss in the three-point transmission. In the three-point transmission of the embodiment, as shown in FIG. 20A, the first communication device (transceiver) is disposed at the first node (Node_A), the second communication device (transceiver) is disposed at the second node (Node_B), and the third communication device (transceiver) is disposed at the third node (Node_C). The transmission path between the first node (Node_A) and the second node (Node_B) is represented by the transmission path 1, and the propagation loss in the transmission path 1 is represented by the first propagation loss (Ls_1). The transmission path between the second node (Node_B) and the third node (Node_C) is represented by the transmission path 2, and the propagation loss in the transmission path 2 is presented by the second propagation loss (Ls_2). The transmission path between the first node (Node_A) and the third node (Node_C) is represented by the transmission path 3, and the propagation loss of the transmission path 3 is represented by the third propagation loss (Ls_3). As the high-frequency signal transmitted between the nodes, for example, the millimeter wave band (millimeter wave signal) is used. The transmission power strength (transmission level) from the transmission node cc (the transmission function portion of the communication device) to the reception node β (the reception function portion of the communication device) is represented by $M\_\alpha\beta$ ($\alpha$ and $\beta$ are at any of A, B, and C, $\alpha \neq \beta$). In addition, the reception power strength (reception level) at the reception node β3, at which the high-frequency signal is received from the transmission node a, is represented by $N\_\alpha\beta$ ($\alpha$ and $\beta$ are at any of A, B, and C, $\alpha \neq \beta$).

In this case, a relationship between the transmission power strength and the reception power strength is shown by the level diagram in FIG. 20B. In addition, FIG. 20B shows a case where, in order to correspond to Examples 1 and 2 to be described later, the transmission power strength at each transmission node is set such that the reception power strength at a certain reception node is equal to a constant value. The reception power strength $N\_\alpha\beta$ at the reception node β, at which the high-frequency signal received from the transmission node α, is equal to "the transmission power strength at the first node—the propagation loss of the transmission path 1". Thus, this represented by "$N\_\alpha\beta = M\_\alpha\beta - Ls\_\gamma$". For example, when the high-frequency signal is transmitted from the first node (Node_A) to the second node (Node_B), the reception power strength N_12 at the second node (Node_B) is represented by "M_12-Ls_1". In addition, when the high-frequency signal is transmitted from the first node (Node_A) to the third node (Node_C), the reception power strength N_13 at the third node (Node_C) is represented by "M_13-Ls_3". When the high-frequency signal is transmitted from the second node (Node_B) to the first node (Node_A), the reception power strength N_21 at the first node (Node_A) is represented by "M_21-Ls_1". In addition, when the high-frequency signal is transmitted from the second node (Node_B) to the third node (Node_C), the reception power strength N_23 at the third node (Node_C) is represented by "M_23-Ls_2". When the high-frequency signal is transmitted from the third node (Node_C) to the first node (Node_A), the reception power strength N_31 at the first node (Node_A) is represented by "M_31-Ls_3". In addition, when the high-frequency signal is transmitted from the third node (Node_C) to the second node (Node_B), the reception power strength N_32 at the second node (Node_B) is represented by "M_32-Ls_2".

Example 1

Example 1 is characterized in that the destination information is sent by using the transmission power. Specifically, this example is characterized in that, by fixedly giving the reception power setting value X to each communication device (Node_A, Node_B, and Node_C, the transmission power strength at each transmission node is controlled such that the reception power strength for the transmission target (reception node) is equal to a predetermined reception power setting value X. In other words, this example shows a system in which the transmission target (reception node) is specified by controlling the transmission power and sending out the high-frequency signal (for example, millimeter waves) such that the reception power strength is equal to a predetermined value. In addition, this example is characterized in that the information (that is, the destination information) for specifying the reception node is superposed upon the transmission power strength (or the reception power strength). The transmitter (transmission-side communication device) sets the strength of the high-frequency signal on the basis of the propagation loss with the communication device of the destination (on reception side). Specifically, a value, which is obtained by adding the amount of the propagation loss to the reception power setting value X, is set as the transmission power strength. In particular, this example is characterized to be different from Example 2 to be described later in the following point: by fixedly giving an individual reception power setting value X to each node, each node compares the reception level with the reception power setting value X which is set for itself, and if the difference is in a certain range, it is determined that the reception signal is addressed to the corresponding node itself.

[Transmission Power Setting]

Figure 21A:
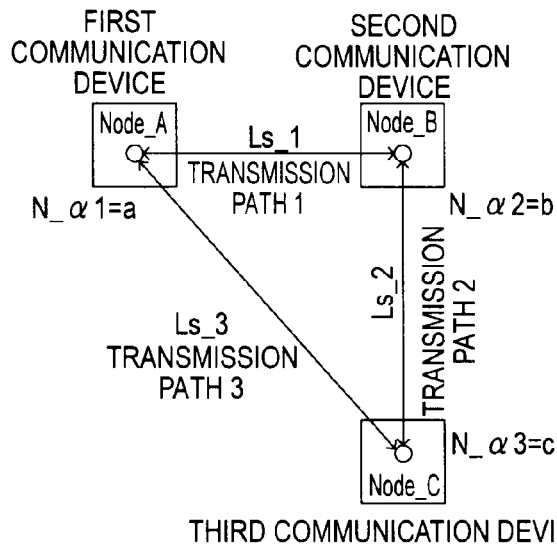
FIGS. 21A to 21C are diagrams illustrating a relationship between node arrangement and propagation loss in three-point transmission of Example 1.
Figure 21B:
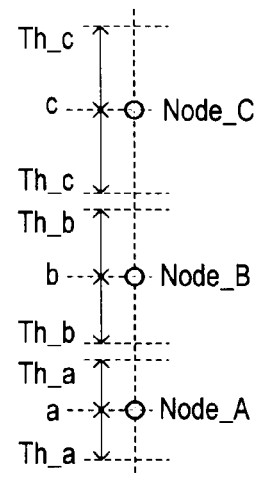
Figure 21C:
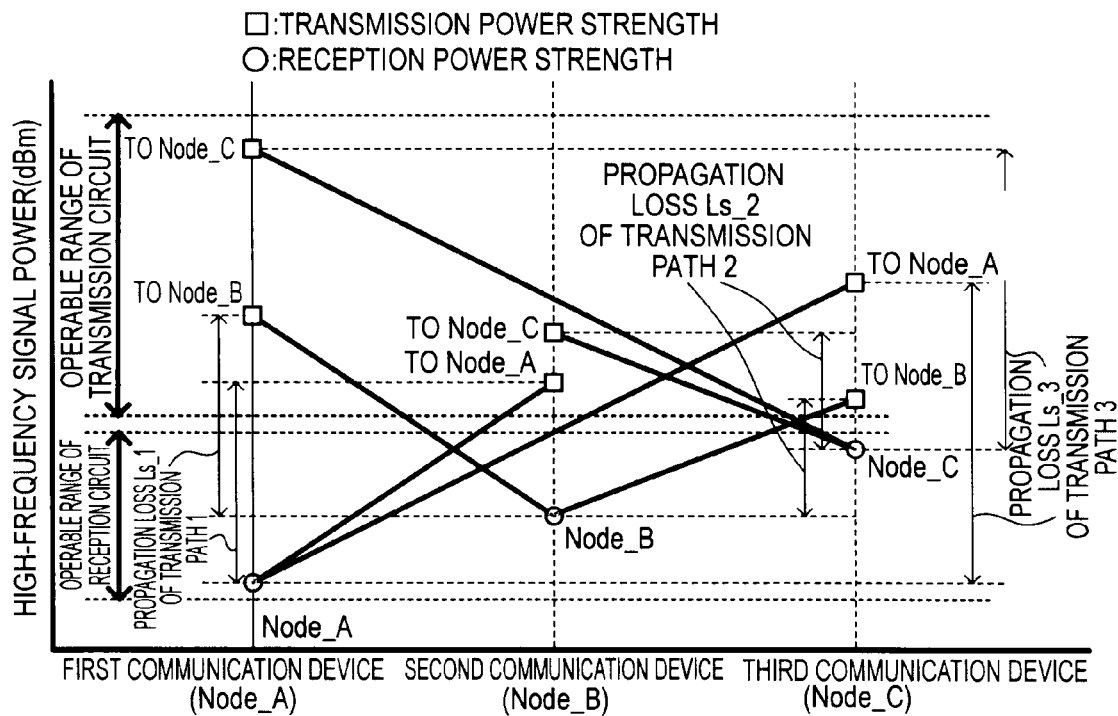

FIGS. 21A to 21C are diagrams illustrating a relationship between node arrangement and propagation loss in three-point transmission of Example 1. For example, a fixed reception power setting value is set for each reception node. The transmission node controls the transmission power so as to make it correspond to the reception power setting value, and transmits the high-frequency signal (for example, the millimeter wave signal). The carrier frequencies used by the respective transmission nodes are the same. In this case, time-division multiplexing is performed such that the respective transmission signals do not interfere with each other.

For example, the transmission slots are allocated to three communication devices (refer to FIGS. 22 to 24 to be described later). In the case of communication in the electronic apparatus or in the case of communication between apparatuses located at a relatively close distance in which the communication target can be specified, slot numbers can be allocated in advance. For example, in N-point transmission, the number of slots per one frame interval is represented by N. One frame interval is a total number of slots (in this example, 3 slots). Time information such as a slot size and a frame interval can be given, and it can be also given that slots are allocated in order of A→B→C. The three communication devices perform transmission processing at the time slots which are allocated to themselves. At this time, preferably, it is preferable to perform the transmission processing by synchronizing each transmission node. Hence, the transmission node of any side is set as a master, and the others are set as slaves, and a synchronizing signal for signal processing is generated (regenerated) by for example a phase synchronizing circuit or the like on the basis of the reference signal for synchronization superposed on the high-frequency signal which is sent from the transmission node of the master, whereby it is preferable to perform processing in synchronization with the regenerated synchronizing signal.

The reception node receives the leading portion of the slot of the high-frequency signal which is sent at each transmission slot, determines the reception level, determines that the signal is addressed to the corresponding node itself if the signal is the high-frequency signal with own reception power setting value X, and perform the reception processing (demodulation processing). Although not indispensable, as a result of the reception of the leading portion of the slot, when it is determined that the high-frequency signal is not addressed to the corresponding node itself, at the corresponding slot, the node may be in a power save mode without continuing the reception operation. In addition, in a case wherein one-to-many communication is intended to be performed (typically in a case where broadcast is intended to be performed), it is preferable to provide a slot for broadcast and make an attempt to perform reception at a certain power in the interval thereof.

In the example shown in FIG. 21A, as the reception power setting value $X\_\gamma$ ($\gamma$ is at any of A, B, and C), a reception level a ($=X\_A$) is fixedly given to the first node (Node_A), a reception level b ($=X\_B$>reception level a) is fixedly given to the second millimeter wave transceiver (Node_B), and a reception level c ($=X\_C$>reception level b) is fixedly given to the third millimeter wave transceiver (Node_C). Further, assuming that respective lower-limit and upper-limit threshold values are the same, a threshold value $Th\_\gamma$ ($\gamma$ is at any of A, B, and C) is set. In addition, it is not necessary that the lower-limit threshold value is the same as the upper-limit threshold value, and those may be different from each other. When the reception level $N\_\alpha 1$ is within the range of reception level a±threshold value Th_A, the first millimeter wave transceiver (Node_A) determines that the reception signal of the corresponding time slot is a high-frequency signal addressed to the corresponding transceiver itself. When the reception level $N\_\alpha 2$ is within the range of reception level b±threshold value Th_B, the second millimeter wave transceiver (Node_B) determines that the reception signal of the corresponding time slot is a high-frequency signal addressed to the corresponding transceiver itself. When the reception level $N\_\alpha 3$ is within the range of reception level c±threshold value Th_C, the third millimeter wave transceiver (Node_C) determines that the reception signal of the corresponding time slot is a high-frequency signal addressed to the corresponding transceiver itself.

It is preferable that it should not be erroneously determined that a high-frequency signal addressed to another reception node is a high-frequency signal addressed to the corresponding node itself. Hence, in the case of the above example, as shown in FIG. 21B, it is preferable to satisfy the following expression "(reception level a+threshold value Th_A)<(reception level b−threshold value Th_B)" and "(reception level b+threshold value Th_B)<(reception level c−threshold value Th_C)".

For example, the first propagation loss Ls_1 is "2", the second propagation loss Ls_2 is "4", and the third propagation loss Ls_3 is "6". The reception level a is "10", the reception level b is "11", and the reception level c is "12". That is, the reception power setting value $N\_\alpha 1$ given to the first reception node is "10", the reception power setting value $N\_\alpha 2$ given to the second reception node is "11", and the reception power setting value $N\_\alpha 3$ given to the third reception node is "12". In this case, the relationship between the transmission power strength and the reception power strength can be represented by the level diagram shown in FIG. 21C. That is, it is preferable that the transmission power strength M_12 at the first node (Node_A) at the time of transmitting the high-frequency signal from the first node (Node_A) to the second node (Node_B) should be within the threshold value Th_B with reference to "N_12+Ls_1=11+2=13". It is preferable that the transmission power strength M_13 at the first node (Node_A) at the time of transmitting the high-frequency signal from the first node (Node_A) to the third node (Node_C) should be within the threshold value Th_C with reference to "N_13+Ls_3=12+6=18". It is preferable that the transmission power strength M_21 at the second node (Node_B) at the time of transmitting the high-frequency signal from the second node (Node_B) to the first node (Node_A) should be within the threshold value Th_A with reference to "N_21+Ls_1=10+2=12". It is preferable that the transmission power strength M_23 at the second node (Node_B) at the time of transmitting the high-frequency signal from the second node (Node_B) to the third node (Node_C) should be within the threshold value Th_C with reference to "N_23+Ls_2=12+4=16". It is preferable that the transmission power strength M_31 at the third node (Node_C) at the time of transmitting the high-frequency signal from the third node (Node_C) to the first node (Node_A) should be within the threshold value Th_A with reference to "N_31+Ls_3=10+6=16". It is preferable that the transmission power strength M_32 at the third node (Node_C) at the time of transmitting from the third node (Node_C) the high-frequency signal to the second node (Node_B) should be within the threshold value Th_B with reference to "N_32+Ls_2=11+4=15".

[Operation Sequence: Transmission Start Time]

Figure 22:
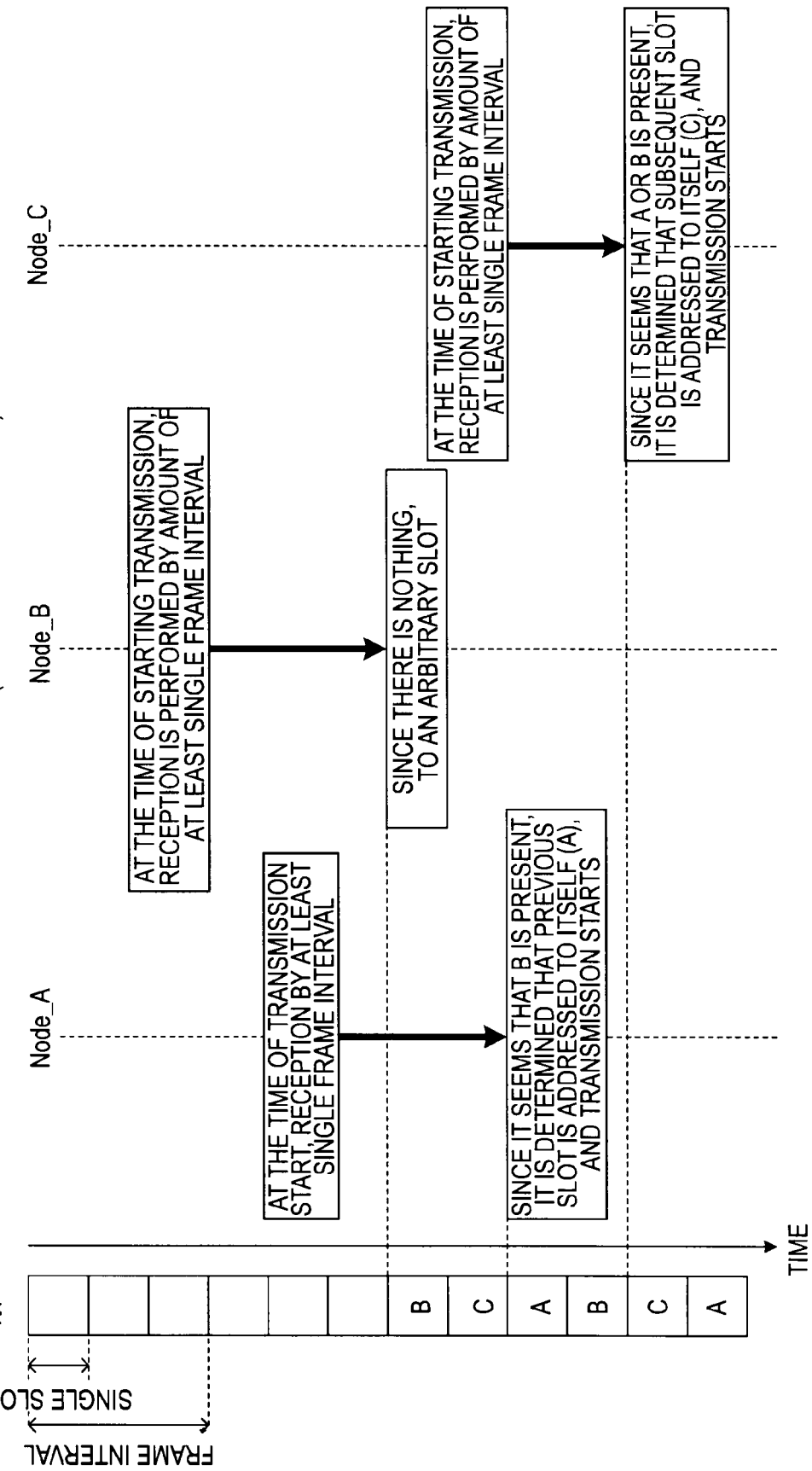
FIG. 22 is a diagram illustrating a first operation sequence at the time of starting transmission processing of the multiple transmission in Example 1.

FIG. 22 is a diagram illustrating a first operation sequence at the time of starting transmission processing of the multiple transmission in Example 1. As described above, the number of slots per one frame interval is set to 3, and slot allocation is performed in order of A→B→C. At the time of starting transmission, each communication device performs reception processing corresponding to at least an amount of one frame interval. Then, the communication device of any side, which intends to start transmission processing, starts the transmission processing at an arbitrary slot. At the beginning, there is nothing, and thus it is possible to start the transmission processing at an arbitrary slot. For example, the second node (Node_B) is set as a master, and starts the transmission processing first at an arbitrary slot. In this case, the arbitrary transmission slot is a time slot B for the second node (Node_B).

At this time, the second node (Node_B) sends out the high-frequency signal with master information representing itself carried by the signal. That is, the master node, which starts the transmission processing first, converts the transmission target signal including the self-specifying master information into a high-frequency signal, and starts the transmission processing. As the master information, for example, transmitter information (Transmitter Address) is used. Each of other nodes specifies the node, which starts the transmission processing first, on the basis of the received master information, and specifies a transmission slot, which is allocated to itself, on the basis of the master information. That is, the nodes other than the master node specify the own transmission processing timing on the basis of the received master information, and start the transmission processing.

For example, when the second node (Node_B) is set as a master and starts transmission processing first at an arbitrary slot, it is the basic that transmission is performed after the transmission slot of the first node (Node_A), but there is nothing, and thus the transmission processing is started at an arbitrary slot. The first node (Node_A) and third node (Node_C), which receive the high-frequency signal at this time, is able to specify that the corresponding slot is the time slot B for the second node (Node_B). On the basis of this, the third node (Node_C) is able to perform transmission processing by using the transmission slot subsequent to the time slot B as the time slot C for itself. In addition, the first node (Node_A) is able to perform transmission processing by using the transmission slot previous to the time slot B as the time slot A for itself. Further, the second node (Node_B) is able to perform transmission processing by using the transmission slot subsequent to the time slot A as the time slot B for itself. For example, the first node (Node_A) determines that, as it seems that the second node (Node_B) is present, the slot previous thereto belongs to itself A, and starts transmission. The third node (Node_C) determines that, as it seems that the first node (Node_A) or the second node (Node_B) is present, the slot subsequent thereto belongs to itself C, and starts transmission. Without using the synchronizing signal, the master node, which starts transmission processing first, is able to perform processing which is practically synchronized with sending of self-specifying information.

When each communication device separately controls processing cycle, shift, which can be caused in each processing cycle, is likely to exceed a prescribed range. In order to solve the problem, it is preferable that the master node (in the example, the second node (Node_B)) should transmit the master information for each constant cycle (not limited to each transmission processing).

[Transmission Start Time: First Modified Example]

Instead of converting the transmission target signal, which includes self-specifying master information, into a high-frequency signal, and starting the transmission processing, the master node, which starts the transmission processing first, may convert the transmission target signal, which includes the synchronizing signal defining the entire processing timing, into a high-frequency signal, and may start the processing. For example, the synchronizing signal, which defines the timing of the leading portion of the frame interval, is carried by the high-frequency signal, and is sent. Then, the second node (Node_B) performs transmission after the transmission slot of the first node (Node_A), and starts the transmission processing at a slot (that is, opens the time slot A for the first node (Node_A)) subsequent by one slot to the synchronizing signal. The other nodes set the synchronizing signal as a trigger, and perform transmission processing at own slot timing. In such a manner, it is possible to prevent mismatch from occurring at a time slot which is used by each node. Even in this case, when each communication device separately controls processing cycle, shift, which can be caused in each processing cycle, is likely to exceed a prescribed range. In order to solve the problem, it is preferable that the master node (in the example, the second node (Node_B)) should transmit the master information for each constant cycle (not limited to each transmission processing).

[Transmission Start Time: Second Modified Example]

The master node may not convert the transmission target signal, which includes self-specifying master information or the synchronizing signal defining the entire processing timing, into a high-frequency signal, and may not start the transmission processing. Instead, by providing a control section that controls the entire processing timing, each communication device may perform processing on the basis of control of the control section. In this case, the control section notifies a time point, at which the transmission processing of the corresponding communication device is possible, to each communication device. The communication device performs the transmission processing at the time point at which the notified transmission processing is possible.

[Transmission and Reception Processing]

Figure 24:
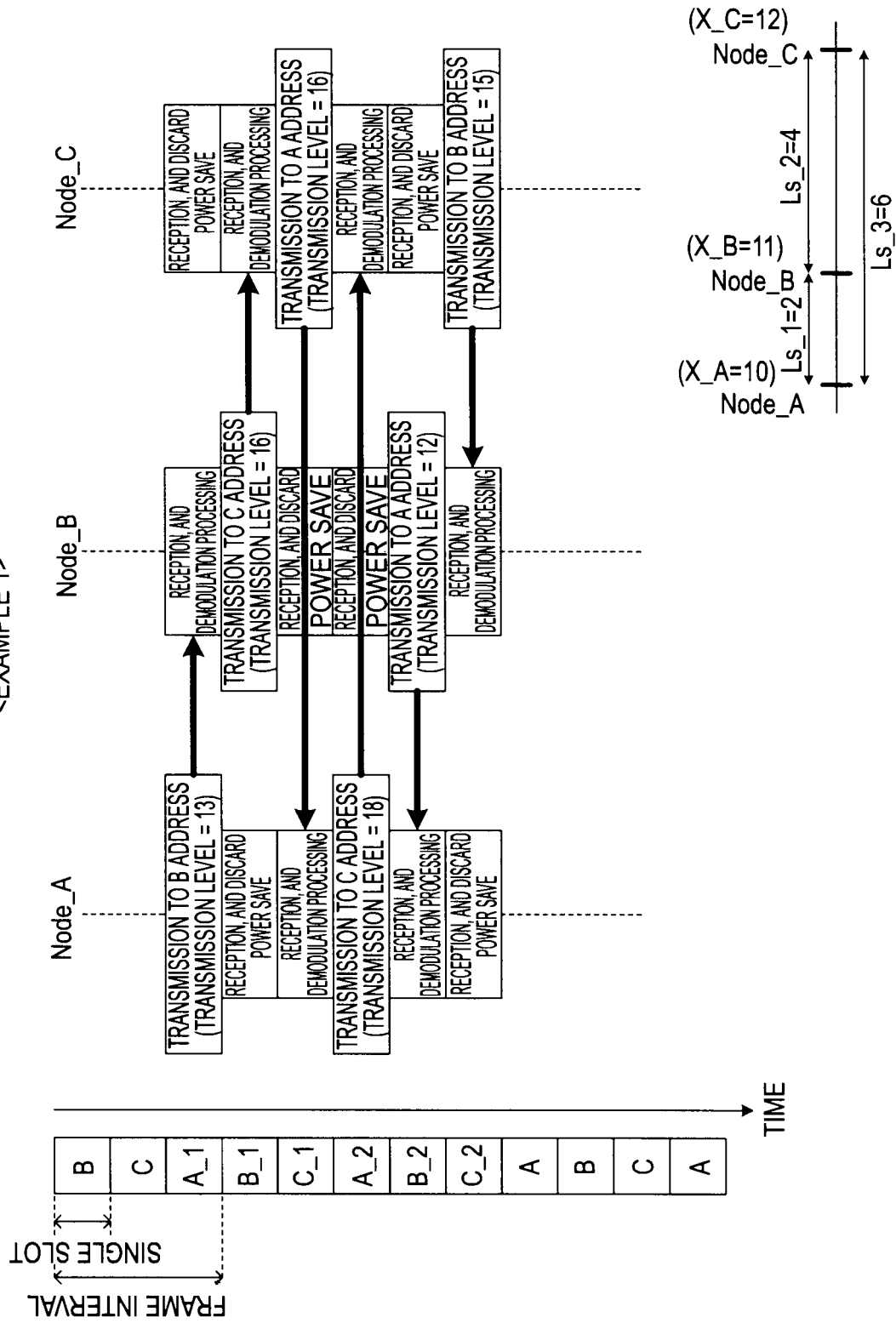
FIG. 24 is a diagram illustrating an operation sequence in transmission/reception processing of the multiple transmission in Example 1.

FIGS. 23A to 24 are diagrams illustrating operations in the transmission/reception processing in Example 1. Here, FIGS. 23A and 23B are diagrams illustrating access control in Example 1. FIG. 24 is a diagram illustrating an operation sequence in transmission/reception processing of the multiple transmission in Example 1.

As shown in FIG. 23A, the numerical example is the same as the above-mentioned examples. The first node (Node_A) sets the transmission power strength so as to make it correspond to the reception power setting value of the reception node of the transmission target, at a time slot (A_n in FIG. 23B or 24: n is an integer) which is allocated to itself, thereby performing transmission processing. Incidentally, it is given that the transmission authority is given to each node in an order of precedence (A→B→C). Each transmission node sets the transmission power strength so as to make it correspond to the reception power setting value of the reception node of the transmission target at a time slot, which is allocated to itself, in each frame interval, thereby performing the transmission processing. Each reception node determines, on the basis of the strength of the received high-frequency signal, whether or not the signal is addressed to the corresponding node itself. If the signal is addressed to the corresponding node itself, the reception node receives the signal, and performs demodulation processing, but if the signal is not addressed to the corresponding node itself, the node discards the signal. Preferably, when receiving a high-frequency signal inappropriate for the received signal strength information which is prescribed for the corresponding communication device itself, the node is in a low power consumption state for a certain period of time.

For example, in the first frame interval, first, at the time slot A_1, the first node (Node_A) sends out a high-frequency signal at the transmission power strength M_12 (=11+2=13) such that it is appropriate for the first propagation loss Ls_1 (=2) between the first node (Node_A) and the second node (Node_B) and the reception power setting value X_B (=reception level b=11) for the second node (Node_B). Thereby, the reception power strength N_12 of the second node (Node_B) is "M_12-Ls_1=13-2=11". Thus, the second node (Node_B) determines that the high-frequency signal received at the time slot A_1 is addressed to the corresponding node itself, and performs the reception processing (demodulation processing). At this time, the reception power strength N_13 of the third node (Node_C) is "M_12-Ls_3=13-6=7". Thus, the third node (Node_C) determines that the high-frequency signal received at the time slot A_1 is not addressed to the corresponding node itself, and is in a power save mode without continuing the reception operation.

Next, at the time slot B_1, the second node (Node_B) sends out a high-frequency signal at the transmission power strength M_23 (=12+4=16) such that it is appropriate for the second propagation loss Ls_2 (=4) between the second node (Node_B) and the third node (Node_C) and the reception power setting value X_C (=reception level c 12) for the third node (Node_C). Thereby, the reception power strength N_23 of the third node (Node_C) is "M_23-Ls_2=16-4=12". Thus, the third node (Node_C) determines that the high-frequency signal received at the time slot B_1 is addressed to the corresponding node itself, and performs the reception processing (demodulation processing). At this time, the reception power strength N_21 of the first node (Node_A) is "M_23-Ls_1=16-2=14". Thus, the first node (Node_A) determines that the high-frequency signal received at the time slot B_1 is not addressed to the corresponding node itself, and is in a power save mode without continuing the reception operation.

Next, at the time slot C_1, the third node (Node_C) sends out a high-frequency signal at the transmission power strength M_31 (=10+6=16) such that it is appropriate for the third propagation loss Ls_3 (=6) between the third node (Node_C) and the first node (Node_A) and the reception power setting value X_A (=reception level a=10) for the first node (Node_A). Thereby, the reception power strength N_31 of the first node (Node_A) is "M_31-Ls_3=16-6=10". Thus, the first node (Node_A) determines that the high-frequency signal received at the time slot C_1 is addressed to the corresponding node itself, and performs the reception processing (demodulation processing). At this time, the reception power strength N_32 of the second node (Node_B) is "M_31-Ls_2=16-4=12". Thus, the second node (Node_B) determines that the high-frequency signal received at the time slot C_1 is not addressed to the corresponding node itself, and is in a power save mode without continuing the reception operation.

Further, in the second frame interval, first, at the time slot A_2, the first node (Node_A) sends out a high-frequency signal at the transmission power strength M_13 (=12+6=18) such that it is appropriate for the third propagation loss Ls_3 (=6) between the first node (Node_A) and the third node (Node_C) and the reception power setting value X_C (=reception level c=12) for the third node (Node_C). Thereby, the reception power strength N_13 of the third node (Node_C) is "M_13-Ls_3=18-6=12". Thus, the third node (Node_C) determines that the high-frequency signal received at the time slot A_2 is addressed to the corresponding node itself, and performs the reception processing (demodulation processing). At this time, the reception power strength N_12 of the second node (Node_B) is "M_13-Ls_1=18-2=16". Thus, the second node (Node_B) determines that the high-frequency signal received at the time slot A_2 is not addressed to the corresponding node itself, and is in a power save mode without continuing the reception operation.

Next, at the time slot B_2, the second node (Node_B) sends out a high-frequency signal at the transmission power strength M_21 (=10+2=12) such that it is appropriate for the first propagation loss Ls_1 (=2) between the second node (Node_B) and the first node (Node_C) and the reception power setting value X_A (=reception level a=10) for the first node (Node_A). Thereby, the reception power strength N_21 of the first node (Node_A) is "M_21-Ls_1=12-2=10". Thus, the first node (Node_A) determines that the high-frequency signal received at the time slot B_2 is addressed to the corresponding node itself, and performs the reception processing (demodulation processing). At this time, the reception power strength N_23 of the third node (Node_C) is "M_21-Ls_2=12-4=8". Thus, the third node (Node_C) determines that the high-frequency signal received at the time slot B_2 is not addressed to the corresponding node itself, and is in a power save mode without continuing the reception operation.

Next, at the time slot C_2, the third node (Node_C) sends out a high-frequency signal at the transmission power strength M_32 (=11+4=15) such that it is appropriate for the second propagation loss Ls_2 (=4) between the third node (Node_C) and the second node (Node_B) and the reception power setting value X_B (=reception level b=11) for the second node (Node_B). Thereby, the reception power strength N_32 of the second node (Node_C) is "M_32-Ls_2=15-4=11". Thus, the second node (Node_B) determines that the high-frequency signal received at the time slot C_2 is addressed to the corresponding node itself, and performs the reception processing (demodulation processing). At this time, the reception power strength N_31 of the first node (Node_A) is "M_32-Ls_3=15-6=9". Thus, the first node (Node_A) determines that the high-frequency signal received at the time slot C_2 is not addressed to the corresponding node itself, and is in a power save mode without continuing the reception operation.

According to the multiple transmission processing of Example 1 mentioned above, in the high-frequency signal waveguide, by efficiently separating the transmission path, interference of the high-frequency signals is suppressed. As a result, it is possible to perform one-to-many or many-to-many signal transmission. Since a special configuration is not provided in the high-frequency signal waveguide, it is possible to implement the transmission path by using a low-cost material and a low-cost configuration method. In particular, in Example 1, it is not necessary to add the destination header (information) which is necessary for normal multiple access, and thus it is possible to obtain an effect to improve a throughput.

Example 2

Example 2 is characterized in that, by fixedly giving the reception power setting value X to each communication device (Node_A, Node_B, and Node_C), the transmission power strength at each transmission node is controlled such that the reception power strength for the transmission target (reception node) is equal to a predetermined reception power setting value X. In other words, this example shows a system in which the transmission target (reception node) is specified by controlling the transmission power and sending out the high-frequency signal (for example, millimeter waves) such that the reception power strength is equal to a predetermined value. In addition, this example is characterized in that the information for specifying the reception node is superposed upon the transmission power strength (or the reception power strength). In particular, this example is characterized to be different from Example 1 mentioned above in the following point: by fixedly giving a common reception power setting value to each node, each node compares the reception level with the reception power setting value X which is set for itself, and if the difference is in a certain range, it is determined that the reception signal is addressed to the corresponding node itself.

[Transmission Power Setting]

Figure 25A:
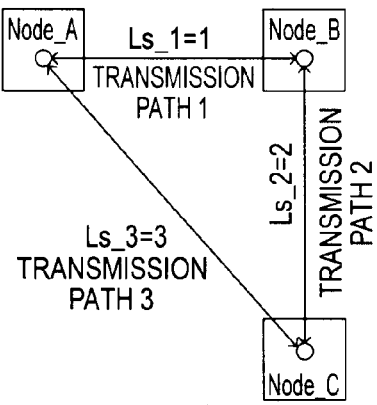
FIGS. 25A and 25B diagrams illustrating a relationship between node arrangement and propagation loss in three-point transmission of Example 2.
Figure 25B:
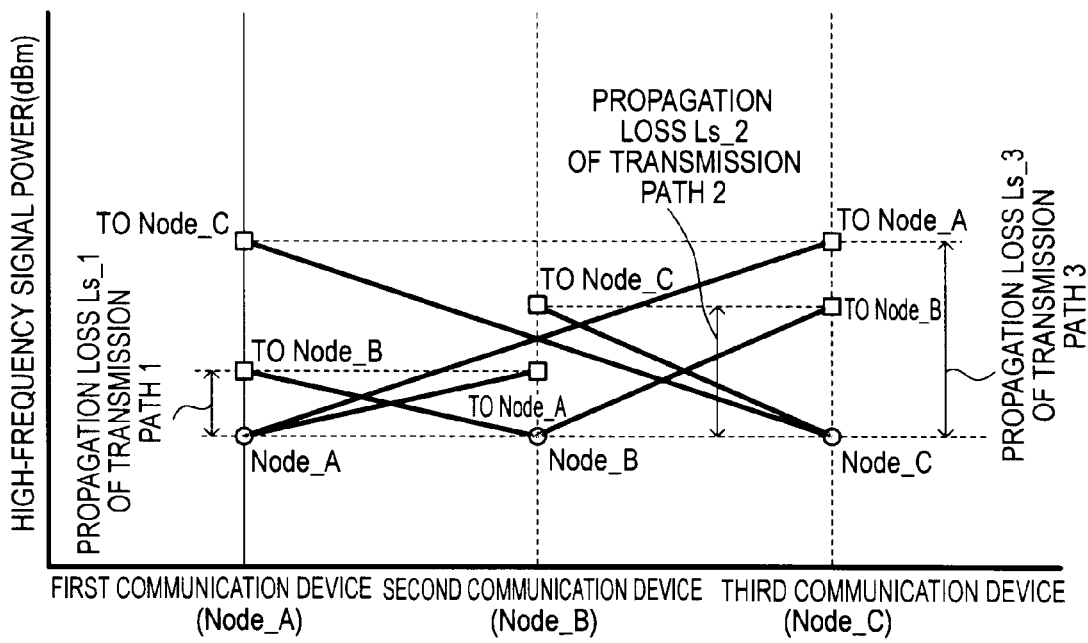

FIGS. 25A and 25B are diagrams illustrating a relationship between node arrangement and propagation loss in three-point transmission of Example 2. For example, as shown in FIG. 25A, the first propagation loss Ls_1 is "1", the second propagation loss Ls_2 is "2", and the third propagation loss Ls_3 is "3". The reception power setting value X is "10". In this case, the relationship between the transmission power strength and the reception power strength can be represented by the level diagram shown in FIG. 25B. That is, it is preferable that the transmission power strength M_12 at the first node (Node_A) at the time of transmitting the high-frequency signal from the first node (Node_A) to the second node (Node_B) should be within the threshold value Th_B with reference to "N_12+Ls_1=10+1=11". It is preferable that the transmission power strength M_13 at the first node (Node_A) at the time of transmitting the high-frequency signal from the first node (Node_A) to the third node (Node_C) should be within the threshold value Th_C with reference to "N_13+Ls_3=10+3=13". It is preferable that the transmission power strength M_21 at the second node (Node_B) at the time of transmitting the high-frequency signal from the second node (Node_B) to the first node (Node_A) should be within the threshold value Th_A with reference to "N_21+Ls_1=10+1=11". It is preferable that the transmission power strength M_23 at the second node (Node_B) at the time of transmitting the high-frequency signal from the second node (Node_B) to the third node (Node_C) should be within the threshold value Th_C with reference to "N_23+Ls_2=10+2=12". It is preferable that the transmission power strength M_31 at the third node (Node_C) at the time of transmitting the high-frequency signal from the third node (Node_C) to the first node (Node_A) should be within the threshold value Th_A with reference to "N_31+Ls_3=10+3=13". It is preferable that the transmission power strength M_32 at the third node (Node_C) at the time of transmitting from the third node (Node_C) the high-frequency signal to the second node (Node_B) should be within the threshold value Th_B with reference to "N_32+Ls_2=10+2=12".

[Transmission and Reception Processing]

FIGS. 26A to 27 are diagrams illustrating operations in the transmission/reception processing in Example 2. Here, FIGS. 26A and 26B are diagrams illustrating access control in Example 2. FIG. 27 is a diagram illustrating an operation sequence in transmission/reception processing of the multiple transmission in Example 2.

Similarly to Example 1, each transmission node sets the transmission power strength so as to make it correspond to the reception power setting value of the reception node of the transmission target, at a time slot which is allocated to itself, thereby performing transmission processing. Each reception node determines, on the basis of the strength of the received high-frequency signal, whether or not the signal is addressed to the corresponding node itself. If the signal is addressed to the corresponding node itself, the reception node receives the signal, and performs demodulation processing, but if the signal is not addressed to the corresponding node itself, the node discards the signal.

For example, in the first frame interval, first, at the time slot A_1, the first node (Node_A) sends out a high-frequency signal at the transmission power strength M_12 (=10+1=11) such that it is appropriate for the first propagation loss Ls_1 (=1) between the first node (Node_A) and the second node (Node_B) and the reception power setting value X (=10). Thereby, the reception power strength N_12 of the second node (Node_B) is "M_12-Ls_1=11-1=10". Thus, the second node (Node_B) determines that the high-frequency signal received at the time slot A_1 is addressed to the corresponding node itself, and performs the reception processing (demodulation processing). At this time, the reception power strength N_13 of the third node (Node_C) is "M_12-Ls_3=11-3=8". Thus, the third node (Node_C) determines that the high-frequency signal received at the time slot A_1 is not addressed to the corresponding node itself, and is in a power save mode without continuing the reception operation.

Next, at the time slot B_1, the second node (Node_B) sends out a high-frequency signal at the transmission power strength M_23 (=10+2=12) such that it is appropriate for the second propagation loss Ls_2 (=2) between the second node (Node_B) and the third node (Node_C) and the reception power setting value X (=10). Thereby, the reception power strength N_23 of the third node (Node_C) is "M_23-Ls_2=12-2=10". Thus, the third node (Node_C) determines that the high-frequency signal received at the time slot B_1 is addressed to the corresponding node itself, and performs the reception processing (demodulation processing). At this time, the reception power strength N_21 of the first node (Node_A) is "M_23-Ls_1=12-1=11". Thus, the first node (Node_A) determines that the high-frequency signal received at the time slot B_1 is not addressed to the corresponding node itself, and is in a power save mode without continuing the reception operation.

Next, at the time slot C_1, the third node (Node_C) sends out a high-frequency signal at the transmission power strength M_31 (=10+3=13) such that it is appropriate for the third propagation loss Ls_3 (=3) between the third node (Node_C) and the first node (Node_A) and the reception power setting value X (=10). Thereby, the reception power strength N_31 of the first node (Node_A) is "M_31-Ls_3=13-3=10". Thus, the first node (Node_A) determines that the high-frequency signal received at the time slot C_1 is addressed to the corresponding node itself, and performs the reception processing (demodulation processing). At this time, the reception power strength N_32 of the second node (Node_B) is "M_31-Ls_2=13-2=11". Thus, the second node (Node_B) determines that the high-frequency signal received at the time slot C_1 is not addressed to the corresponding node itself, and is in a power save mode without continuing the reception operation.

Further, in the second frame interval, first, at the time slot A_2, the first node (Node_A) sends out a high-frequency signal at the transmission power strength M_13 (=10+3=13) such that it is appropriate for the third propagation loss Ls_3 (=3) between the first node (Node_A) and the third node (Node_C) and the reception power setting value X (=10). Thereby, the reception power strength N_13 of the third node (Node_C) is "M_13-Ls_3=13-3=10". Thus, the third node (Node_C) determines that the high-frequency signal received at the time slot A_2 is addressed to the corresponding node itself, and performs the reception processing (demodulation processing). At this time, the reception power strength N_12 of the second node (Node_B) is "M_13-Ls_1=13−1=12". Thus, the second node (Node_B) determines that the high-frequency signal received at the time slot A_2 is not addressed to the corresponding node itself, and is in a power save mode without continuing the reception operation.

Next, at the time slot B_2, the second node (Node_B) sends out a high-frequency signal at the transmission power strength M_21 (=10+1=11) such that it is appropriate for the first propagation loss Ls_1 (=1) between the second node (Node_B) and the first node (Node_C) and the reception power setting value X (=10). Thereby, the reception power strength N_21 of the first node (Node_A) is "M_21-Ls_1=11−1=10". Thus, the first node (Node_A) determines that the high-frequency signal received at the time slot B_2 is addressed to the corresponding node itself, and performs the reception processing (demodulation processing). At this time, the reception power strength N_23 of the third node (Node_C) is "M_21-Ls_2=11−2=9". Thus, the third node (Node_C) determines that the high-frequency signal received at the time slot B_2 is not addressed to the corresponding node itself, and is in a power save mode without continuing the reception operation.

Next, at the time slot C_2, the third node (Node_C) sends out a high-frequency signal at the transmission power strength M_32 (=10+2=12) such that it is appropriate for the second propagation loss Ls_2 (=2) between the third node (Node_C) and the second node (Node_B) and the reception power setting value X (=10). Thereby, the reception power strength N_32 of the second node (Node_B) is "M_32-Ls_2=12−2=10". Thus, the second node (Node_B) determines that the high-frequency signal received at the time slot C_2 is addressed to the corresponding node itself, and performs the reception processing (demodulation processing). At this time, the reception power strength N_31 of the first node (Node_A) is "M_32-Ls_3=12−3=9". Thus, the first node (Node_A) determines that the high-frequency signal received at the time slot C_2 is not addressed to the corresponding node itself, and is in a power save mode without continuing the reception operation.

According to the multiple transmission processing of Example 2 mentioned above, in the high-frequency signal waveguide, by efficiently separating the transmission path, interference of the high-frequency signals is suppressed. As a result, it is possible to perform one-to-many or many-to-many signal transmission. Since a special configuration is not provided in the high-frequency signal waveguide, it is possible to implement the transmission path by using a low-cost material and a low-cost configuration method. In particular, also in Example 2, it is not necessary to add the destination header (information) which is necessary for normal multiple access, and thus it is possible to obtain an effect to improve a throughput.

Comparing Example 2 with Example 1, this example is generalized so as to cope with variation in the reception power (=reception sensitivity), and thus Example 1 is favorable.

Modified Example

Example 1 and Example 2 may be combined. In this case, for example, the level A is set as each reception power strength of the A group formed of the three signal processing modules 320, and the level B (#A) is set as each reception power strength of the B group formed of three signal processing modules 320.

Example 3

FIGS. 28A to 28C are diagrams illustrating three-point transmission (multiple transmission) of Example 3. Example 3 is characterized in that the frame information is sent by using the transmission power. The frame information corresponds to, for example, information and the like of "control information interval" in packet communication. For example, FIG. 28A is a diagram illustrating a frame configuration example in the packet communication.

In the frame configuration, the transmission authority can be sequentially allocated, all terminals in the network make attempts to receive signals through a waveguide. In addition, FIG. 28A, as shown in FIG. 28C, unlike Example 1 and Example 2, the destination information is stored in the header.

As shown in FIG. 28B, in the packet communication in the related art, information representing whether the corresponding packet is a control information packet or a payload packet is included in the "control information interval". In the control information packet, there is a payload interval, and for example, transmission rate information, security, a network ID number, time information, and the like are recorded in the payload interval.

In this case, when Example 3 is applied, as shown in FIG. 28C, by changing the transmission power of each packet, it is not necessary to transmit the information of the "control information interval" in the related art. Normally, the control information is allocated after the destination information, and finally, the data contents are allocated. In Example 3, by using the transmission power, the control information is sent, and thus it is possible to delete the control information in the frame configuration.

Modified Example

Example 3 and Example 1 may be combined. Example 3 and Example 2 may be combined. Example 3, Example 1, and Example 2 may be combined. In such cases, from additional information, it is possible to delete the destination information.

Example 4

FIGS. 29A to 30C are diagrams illustrating Example 4. Here, FIGS. 29A and 29B diagrams illustrating three-point transmission (multiple transmission) of Example 4. FIGS. 30A to 30C are diagrams illustrating a method of specifying a frame length on the basis of a reception level.

Example 4 is characterized in that the frame length information is sent by using the transmission power. For example, the long frame increases the transmission power (transmission power strength) and sends out a high-frequency signal, and the short frame decreases the transmission power (transmission power strength) and sends out a high-frequency signal. Specifically, by quantizing the power information and defining several patterns of frame lengths, it is possible to vary the length of the transmission time of each node, and thus it is possible to deal with traffic amounts different between nodes.

Figures 29A, 29B:
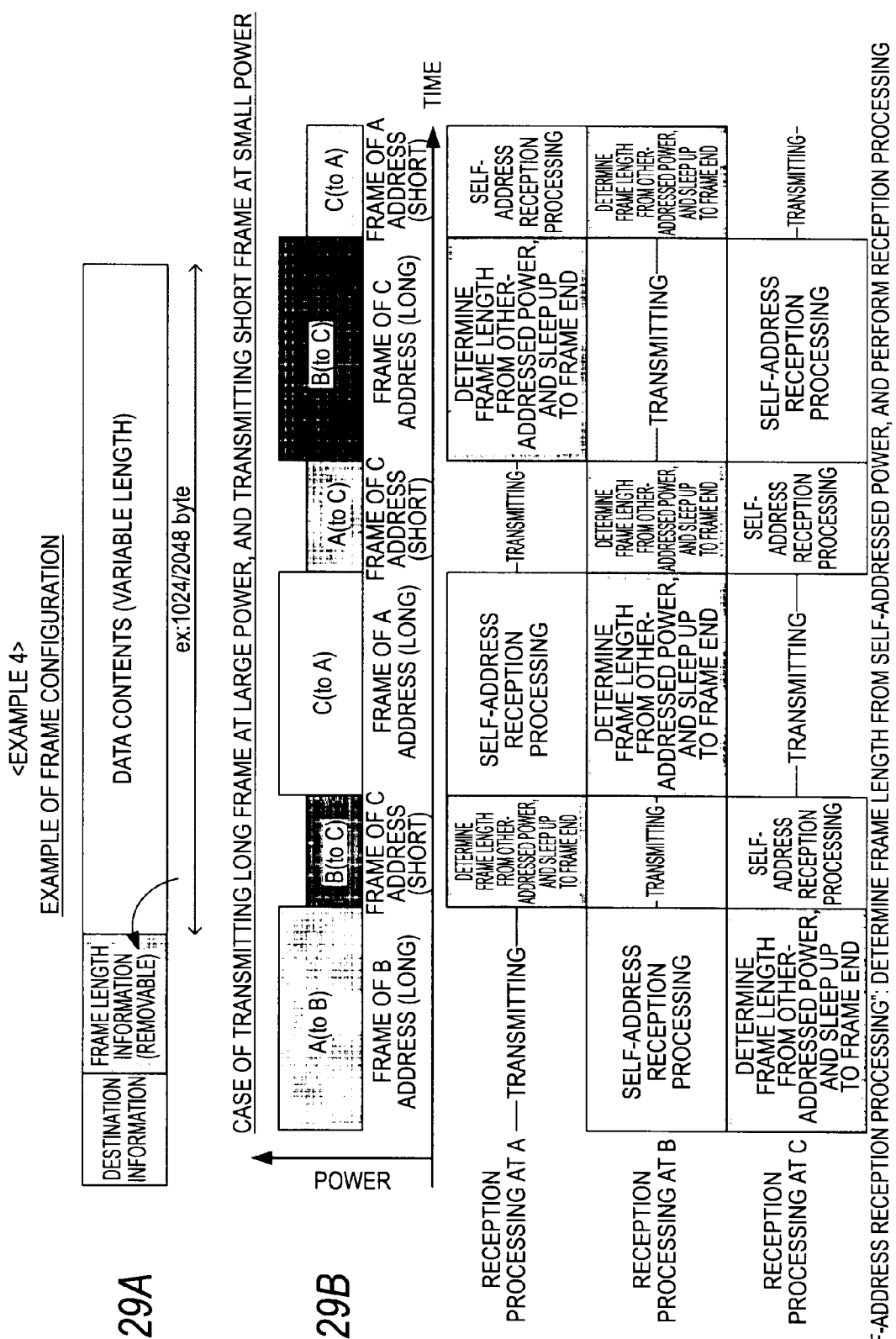
FIGS. 29A and 29B are diagrams illustrating three-point transmission of Example 4.

FIG. 29A is a diagram illustrating a frame configuration example. In the frame configuration, the transmission authority can be sequentially allocated, and each transmission frame length (in particular, the length of data contents) is variable.

All terminals in the network make attempts to receive signals through a waveguide. In addition, as shown in the drawings, unlike Example 1 and Example 2, the destination information is stored in the header. Normally, the frame length information is allocated after the destination information, and finally, the data contents (variable length) are allocated. In Example 4, by using the transmission power, the frame length information is sent, and thus it is possible to delete the frame length information in the frame configuration.

FIG. 29B is a diagram illustrating operations in the transmission/reception processing in Example 4. The upper portion of the drawing shows a condition of the transmission processing at each node. The lower portion of the drawing shows a condition of the reception processing at each node. The transmission node controls the transmission power so as to make it correspond to the frame length, and transmits the high-frequency signal (for example, the millimeter wave signal). For example, at the long frame, the transmission power strength is set to be large, and at the short frame, the transmission power strength is set to be small. In the example shown in the drawing, the frequency signal is sent out in order of A (long frame addressed to B)→B (short frame addressed to C)→C (long frame addressed to A)→A (short frame addressed to C)→B (long frame addressed to C)→C (short frame addressed to A).

The reception node determines the reception level of the high-frequency signal which is transmitted from the transmission node, and specifies the frame length on the basis of the reception level. Further, the reception node determines the frame length on the basis of the reception level of the high-frequency signal addressed to another node, and is held (Sleep) until the corresponding frame ends. For example, in FIGS. 30A to 30C, FIG. 30A shows an example of the frame length, FIG. 30B shows an example of power setting at the time of transmission, and FIG. 30C shows a determination example of the long frame and the short frame at the time of reception. Incidentally, FIG. 30C is based on the transmission loss shown in FIGS. 30A, 30B, and 25A.

In the transmission node, as shown in FIG. 30B, the transmission power is set on the basis of the corresponding portions of the destination and the frame length, and the high-frequency signal is transmitted. In each reception node which receives the high-frequency signal, it is determined whether the transmission node performs transmission with the long frame length or performs transmission with the short frame length, on the basis of the reception power (the threshold value thereof) of the leading portion of the reception frame. Here, in the term "the leading portion of the reception frame", it is considered that, if the reception frame is not addressed to the corresponding reception node itself, the node shifts to the power save mode for a certain period of time.

For example, the reception node determines whether or not the reception frame is addressed to the corresponding node itself, on the basis of the destination information which is stored in the frame information. If the frame is a self-addressed frame, the node determines the frame length on the basis of the reception power of the self-addressed frame in the table shown in FIG. 30B, and performs reception processing on the basis of the determined frame length. In contrast, if the frame is an other-node-addressed frame, the node determines the frame length on the basis of the reception powers of the frames addressed to other nodes (others) in the table shown in FIG. 30B, and is set to the power save state only for a predetermined period of time corresponding to the determined frame length. In the term "the predetermined period of time corresponding to the frame length", it is considered that it is necessary to activate the reception circuit before the predetermined period of time so as to receive "the leading portion of the reception frame" at timing (an interval between frames) at which the reception has to be made next time.

In addition, such processing in the case of the other-node-addressed frame is to perform the power save mode. Hence, in the other cases, the processing of determining the frame length and the processing of shifting the node to the power save mode and reactivating the node are not necessary, and it is preferable to keep the node active. In terms of reduction in power consumption, similarly to this example, it is preferable to cause the node to be in the power save mode. Further, for example, it may be possible to adopt a configuration in which the node, which receives the other-node-addressed frame, receives notification of the determination result of the frame length from the node which receives the self-addressed frame. However, it is herein assumed that an auxiliary signal other than the packet transmission is basically not used.

For example, focusing on third row from the bottom of the table of FIG. 30B, in the case of "A to B (Frame (long))" the third node (Node_C) as another node receives the high-frequency signal with the signal power 9 (12-3), and in the case of "A to B (Frame (short))", the node receives the high-frequency signal with the signal power 3 (6-3). Here, when the third node (Node_C) has an ability to receive the signal with a signal power ranging from 3 to 14, in the third node (Node_C), it is possible to estimate the length (long or short) of the frame sent from the first node (Node_A) to the second node (Node_B). Thus, it is possible to put the reception circuit to sleep until the last end of the individually defined frame length (refer to an example of the frame length).

Modified Example

Example 4 and Example 1 may be combined. Example 4 and Example 2 may be combined. Example 4, Example 1, and Example 2 may be combined. Example 4 and Example 3 may be combined. In such cases, from additional information, it is possible to delete the destination information and the frame information.

Although the technology disclosed in the present specification has been hitherto described with reference to the embodiments, the technical scope of the entries of appended claims is not limited to the embodiments. The embodiments may be modified into various modifications and variations without departing from the technical scope of the technology disclosed in the specification. Thus, the modifications and the variations are involved in the technical scope of the technology disclosed in the specification. The embodiments does not limit the techniques relating to the appended claims, and it should not be understood that all combinations of the features described in the embodiments are indispensable for means for solving the problems targeted by the technology disclosed in the specification. The above-described embodiment includes techniques of various steps, whereby it may be possible to derive various technologies through appropriate combinations of a plurality of elements disclosed therein. Even when several elements are removed from the entire elements described in the embodiments, it may be possible to derive a configuration, in which the several elements are removed, as a technology disclosed in the specification insofar as it is possible to obtain effects coping with the problems intended to be solved by the technology disclosed in the specification.

For example, in the above description of the embodiment, the technology can be applied to the signal transmission in an apparatus or between apparatuses located at a relative close distance. However, in principle, the signal separation using the directivity or the polarized waves and the transmission of the second information (information other than the transmission target signal) using the transmission power can be applied to general field communication. Note that, when the relative positions of the transceivers are unspecified, it is difficult to apply the technology. The reason is that the directivity or the polarized waves are set in accordance with the other party, but if the relative positions of the transceivers are unspecified, the setting is difficult. Further, in the transmission of the second information using the transmission power, in consideration of the propagation loss between transmission and reception, it is necessary (preferable) to perform strength setting, but if the relative positions of the transceivers are unspecified, the setting is difficult. In terms of the above description, it is preferable that the technology described by the embodiments should be applied to the signal transmission in an apparatus or between apparatuses located at a relative close distance.

The present disclosure contains subject matter related to that disclosed in Japanese Priority Patent Application JP 2011-077376 filed in the Japan Patent Office on Mar. 31, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A signal transmission system comprising:
   a first communication device that transmits first information, and
   a second communication device that receives the first information, wherein
   the first communication device and the second communication device are stationary devices located within the signal transmission system,
   at the time of transmitting the first information, the first communication device controls a strength of a transmission signal thereof on the basis of destination information of the second communication device,
   the second communication device stores signal strength information, which specifies the strength of the transmission signal addressed to the second communication device for determining if the transmission signal is addressed to the second communication device,
   the second communication device identifies a strength of the transmission signal received by the second communication device,
   the second communication device determines the transmission signal is addressed to the second communication device or not by determining if the identified strength of the transmission signal received by the second communication device corresponds with the signal strength information or not,
   the second communication device performs demodulation processing of the transmission signal in a case that the second communication device determines the transmission signal is addressed to the second communication device by determining the identified strength of the transmission signal received by the second communication device corresponds with the signal strength information, and
   the second communication device does not perform demodulation processing of the transmission signal in a case that the second communication device determines the transmission signal is not addressed to the second communication device by determining the identified strength of the transmission signal received by the second communication device does not correspond with the signal strength information.

2. The signal transmission system according to claim 1,
   wherein the communication device transmits second information in addition to the first information, and
   wherein the first information includes attribute information of the second information.

3. The signal transmission system according to claim 1,
   wherein the first communication device sets the strength of the transmission signal on the basis of given propagation characteristics between the first communication device and the second communication device.

4. The signal transmission system according to claim 1, wherein transmission processing timing of the first communication device is defined in advance.

5. The signal transmission system according to claim 4,
   wherein the first communication device starts transmission processing of a transmission target signal including master information which specifies the first communication device when receiving no signal from the second communication device, and
   wherein the second communication device specifies own transmission processing timing on the basis of the received master information, and starts the transmission processing.

6. The signal transmission system according to claim 5,
   wherein a main part of a communication packet formed of the main part and an additional information part includes any one of the transmission target signal and control information,
   wherein the destination information includes information for distinguishing the transmission target signal from the control information, and
   wherein a strength of a high-frequency signal at a time of transmitting the transmission target signal is set to be different from a strength of the high-frequency signal at a time of transmitting the control information.

7. The signal transmission system according to claim 1, wherein the destination information is at least a part of additional information of a normal communication packet formed of a main part corresponding to a transmission target signal and an additional information part.

8. The signal transmission system according to claim 7, wherein a part of the normal communication packet corresponding to the destination information is removed from the part of the additional information.

9. The signal transmission system according to claim 7, wherein the signal strength information of the first communication device and the second communication device are different from each other.

10. The signal transmission system according to claim 7, wherein the first communication device and the second communication device have the same signal strength information.

11. The signal transmission system according to claim 7, wherein the second communication device is in a low power consumption state for a certain period of time when the second communication device receives a signal with a strength which is different from the strength specified in the signal strength information of the second communication device.

12. The signal transmission system according to claim 1, wherein the first communication device transmits the first information via millimeter waves signal waveguide.

13. The signal transmission system according to claim 1,
   wherein the second communication device discards the transmission signal in a case that the second communication device determines the transmission signal is not addressed to the second communication device by determining the identified strength of the transmission signal received by the second communication device does not correspond with the signal strength information.

14. An electronic system comprising:
first circuitry that performs transmission processing of first information;
second circuitry that receives the first information; and
a signal waveguide that transmits a signal from the first circuitry to the second circuitry; wherein
the first circuitry and the second circuitry are stationary circuitry located within the electronic system,
at the time of transmitting the first information, the first circuitry controls a strength of a transmission signal thereof on the basis of destination information of the second communication device,
the second circuitry stores signal strength information, which specifies the strength of the transmission signal addressed to the second circuitry for determining if the transmission signal is addressed to the second circuitry,
the second circuitry identifies a strength of the transmission signal received by the second circuitry,
the second circuitry determines the transmission signal is addressed to the second circuitry or not by determining if the identified strength of the transmission signal received by the second circuitry corresponds with the signal strength information or not,
the second circuitry performs demodulation processing of the transmission signal in a case that the second circuitry determines the transmission signal is addressed to the second circuitry by determining the identified strength of the transmission signal received by the second circuitry corresponds with the signal strength information, and
the second circuitry does not perform demodulation processing of the transmission signal in a case that the second circuitry determines the transmission signal is not addressed to the second circuitry by determining the identified strength of the transmission signal received by the second circuitry does not correspond with the signal strength information.

15. The electronic system according to claim 14,
wherein the first circuitry includes information on propagation characteristics between the first circuitry and the second circuitry, and
wherein the first circuitry controls the strength of the transmission signal on the basis of the propagation characteristics.

16. A signal transmission method comprising:
transmitting first information to a second communication device by a first communication device, the first communication device and the second communication device being stationary devices located within a signal transmission system,
at the time of transmitting the first information, controlling, by the first communication device, a strength of a transmission signal thereof on the basis of destination information of the second communication device,
the second communication device storing signal strength information, which specifies the strength of the transmission signal addressed to the second communication device for determining if the transmission signal is addressed to the second communication device,
identifying, by the second communication device, a strength of the transmission signal received,
determining, by the second communication device, the transmission signal is addressed to the second communication device or not by determining if the identified strength of the transmission signal received by the second communication device corresponds with the signal strength information or not,
performing, by the second communication device, demodulation processing of the transmission signal in a case that the second communication device determines the transmission signal is addressed to the second communication device by determining, by the second communication device, the identified strength of the transmission signal received by the second communication device corresponds with the signal strength information, and
not performing, by the second communication device, demodulation processing of the transmission signal in a case that the second communication device determines the transmission signal is not addressed to the second communication device by determining, by the second communication device, the identified strength of the transmission signal received by the second communication device does not correspond with the signal strength information.

17. A signal transmission system comprising:
a first communication device that transmits first information and second information, and
a second communication device that receives the first information and the second information, wherein
the first communication device and the second communication device are stationary devices located within the signal transmission system,
at the time of transmitting the first information, the first communication device controls a strength of a first transmission signal of the first information on the basis of destination information of the second communication device, and the first communication device transmits the first transmission signal with a first strength,
at the time of transmitting the second information, the first communication device controls a strength of a second transmission signal of the second information on the basis of destination information of a third communication device, and the first communication device transmits the second transmission signal with a second strength,
the second communication device stores signal strength information, which specifies the strength of the transmission signal addressed to the second communication device for determining if the transmission signal is addressed to the second communication device,
the second communication device identifies a strength of the first transmission signal received by the second communication device,
the second communication device identifies a strength of the second transmission signal received by the second communication device,
the second communication device determines if the identified strength of the first transmission signal received by the second communication device and the identified strength of the second transmission signal received by the second communication device correspond with the received signal strength information,
the second communication device performs demodulation processing of the first transmission signal based on a determination that the strength of the first transmission signal received by the second communication device corresponds with the signal strength information, and
the second communication device does not perform demodulation processing of the second transmission signal based on a determination that the strength of the second transmission signal received by the second communication device does not correspond with the signal strength information.

* * * * *